US006973467B1

(12) United States Patent
Furusho

(10) Patent No.: US 6,973,467 B1
(45) Date of Patent: Dec. 6, 2005

(54) TABLE FORMAT DATA PRESENTING METHOD, INSERTING METHOD, DELETING METHOD, AND UPDATING METHOD

(75) Inventor: Shinji Furusho, Yokohama (JP)

(73) Assignee: Turbo Data Laboratory Inc., Tokyo (JP)

( * ) Notice: Subject to any disclaimer, the term of this patent is extended or adjusted under 35 U.S.C. 154(b) by 472 days.

(21) Appl. No.: 10/048,231

(22) PCT Filed: Jul. 31, 2000

(86) PCT No.: PCT/JP00/05135

§ 371 (c)(1),
(2), (4) Date: Jan. 28, 2002

(87) PCT Pub. No.: WO01/09764

PCT Pub. Date: Feb. 8, 2001

(30) Foreign Application Priority Data

Jul. 29, 1999 (JP) ................................ 11/215450

(51) Int. Cl.[7] .............................................. G06F 17/30
(52) U.S. Cl. ............................... 707/205; 707/2; 707/3; 707/101; 709/104; 709/201; 717/119; 717/151
(58) Field of Search ................................ 707/1, 3, 101, 707/205; 717/150, 154, 160, 119, 151, 161; 709/104, 200, 201, 205

(56) References Cited

U.S. PATENT DOCUMENTS

| 5,485,619 | A | * | 1/1996 | Lai et al. ..................... 717/150 |
| 5,579,494 | A | * | 11/1996 | Zaiki .......................... 712/241 |
| 5,640,336 | A | * | 6/1997 | Dworkin et al. ............. 708/620 |
| 5,687,377 | A | * | 11/1997 | Pasquariello ................. 717/139 |
| 5,721,928 | A | * | 2/1998 | Umehara et al. ............. 717/149 |
| 5,748,965 | A | * | 5/1998 | Isozaki ....................... 717/151 |
| 5,781,777 | A | * | 7/1998 | Sato et al. ................... 717/160 |
| 5,805,887 | A | * | 9/1998 | Wang .......................... 717/100 |
| 6,002,881 | A | * | 12/1999 | York et al. .................... 712/34 |
| 6,055,627 | A | * | 4/2000 | Kyushima et al. ........... 712/233 |
| 6,460,176 | B1 | * | 10/2002 | Suehiro et al. .............. 717/119 |

OTHER PUBLICATIONS

Unoki, "Sybase IQ, The Approach to the Data Warehouse by the Original Data Structure", Technical Research Report of the Institute of Electronics, Information and Communication Engineers (AI97-42), vol. 97, No. 415, Dec. 2, 1997, pp. 51-56.

(Continued)

*Primary Examiner*—Charles Rones
*Assistant Examiner*—Jacques Veillard
(74) *Attorney, Agent, or Firm*—Griffin & Szipl, P.C.

(57) ABSTRACT

A method to perform the insertion, deletion and updating of data in table-format data quickly and appropriately. A CPU 12 accepts a record number as a subscript, generates a subscript conversion array for giving an offset value corresponding to the range of the subscript in question, identifies the insertion position which indicates the position of the field value to be inserted, and, in the subscript conversion array, gives an offset value that defines the range of the corresponding subscript and also identifies the end of the array, and in the subscript conversion array, gives an offset value that increments the corresponding range of subscripts and also decrements the accepted subscript, and places the field value to be inserted at the stipulated end position, such that an offset value according to the range of subscripts within the subscript conversion array is given as the subscript.

27 Claims, 51 Drawing Sheets

OTHER PUBLICATIONS

Tanaka et al., "Drill-Through for Implementing Hybrid OLAP Solution", Technical Research Report of Information Processing Society of Japan (IPSJ), vol. 98, No. 57, Jul. 8, 1998, pp. 157-164 (98-DBS-116-21).

Sakai et al., "Storing a Large Time Sequenced Data Within Disks", Technical Research Report of the Institute of Electronics, Information and Communication Engineers (AI97-49), vol. 97, No. 416, Dec. 3, 1997, pp. 25-30.

* cited by examiner

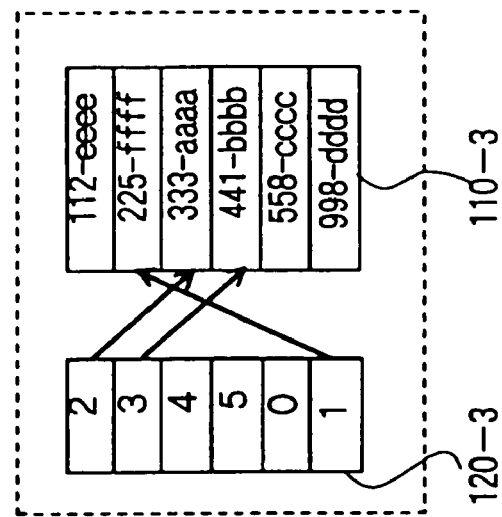
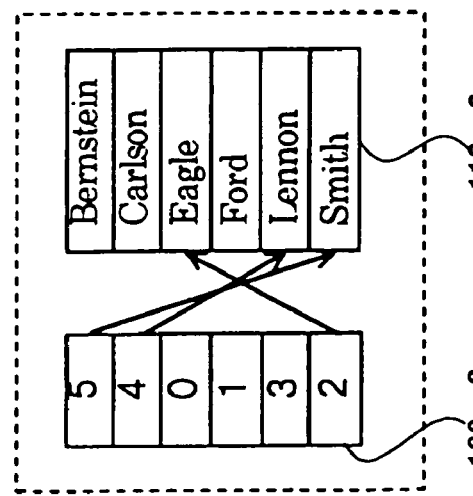
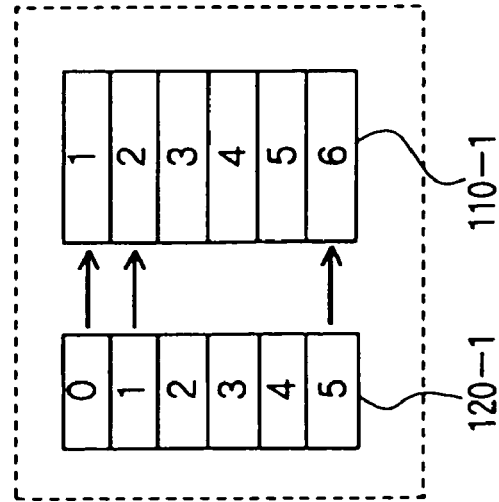

FIG. 4A
| Record No. | Sex | Age | Occupation |
|---|---|---|---|
| 0 | Female | 1 8 | Programmer |
| 1 | Male | 2 1 | Student |
| 2 | Female | 3 1 | Teacher |
| ⋮ | ⋮ | ⋮ | ⋮ |
| 999999 | Female | 1 6 | Student |
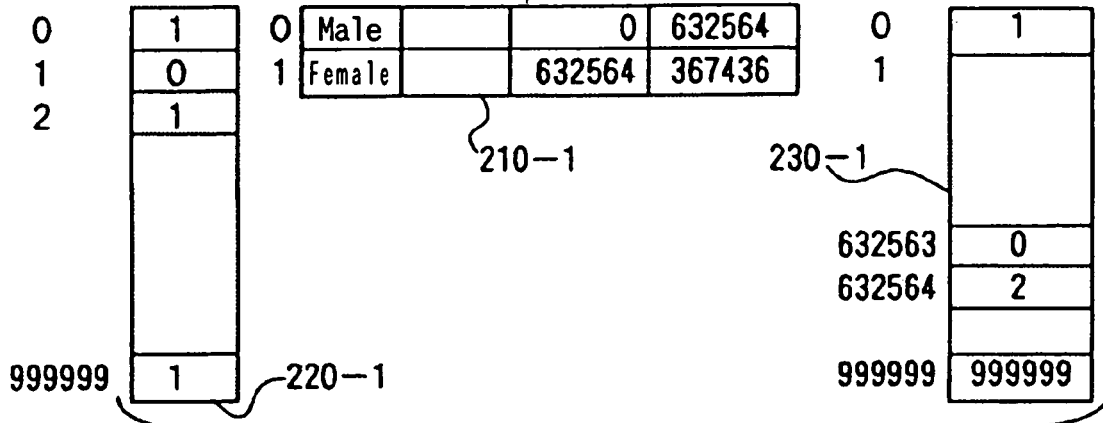
FIG. 4B
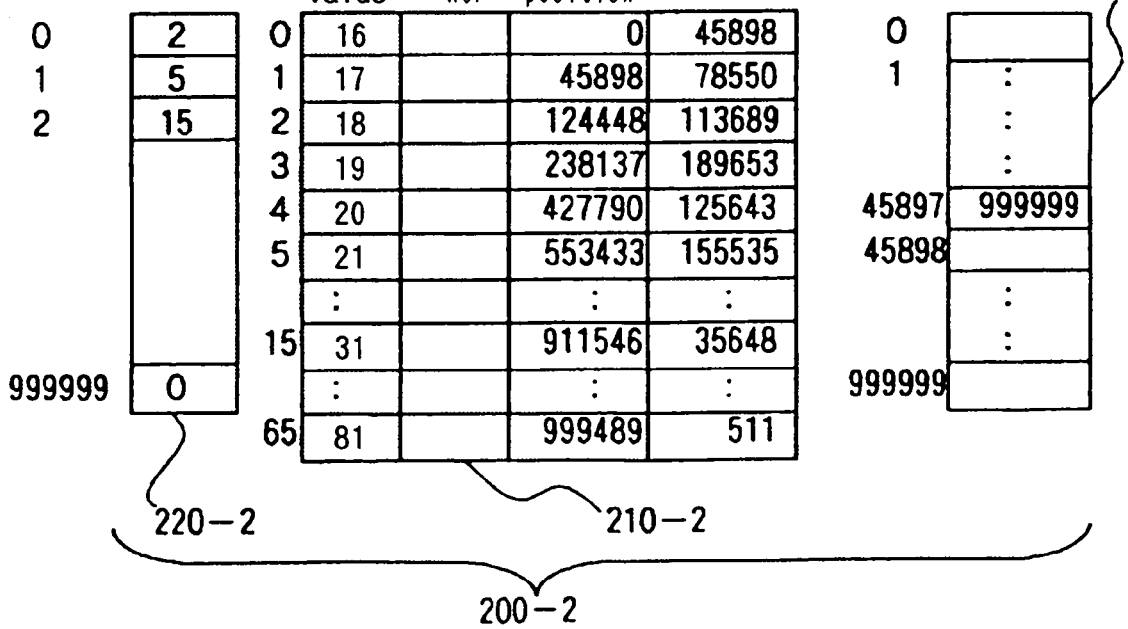
FIG. 4C

FIG. 7A

| | | |
|---|---|---|
| 0 | | Female |
| | | 1 8 |
| | | Programmer |
| 1 | | Male |
| | | 2 1 |
| | | Student |
| 2 | | Female |
| | | 3 1 |
| | | Teacher |
| | | |
| 999999 | | Female |
| | | 1 6 |
| | | Student |

FIG. 7B

| | | |
|---|---|---|
| 0 | | Female |
| 1 | | Male |
| 2 | | Female |
| : | | : |
| : | | : |
| 999999 | | Female |
| 0 | | 1 8 |
| 1 | | 2 1 |
| 2 | | 3 1 |
| : | | : |
| : | | : |
| 999999 | | 1 6 |
| 0 | | Programmer |
| 1 | | Student |
| 2 | | Teacher |
| : | | : |
| : | | : |
| 999999 | | Student |

Example of converting both subscripts and values

Example of converting subscripts only

Example of converting values only

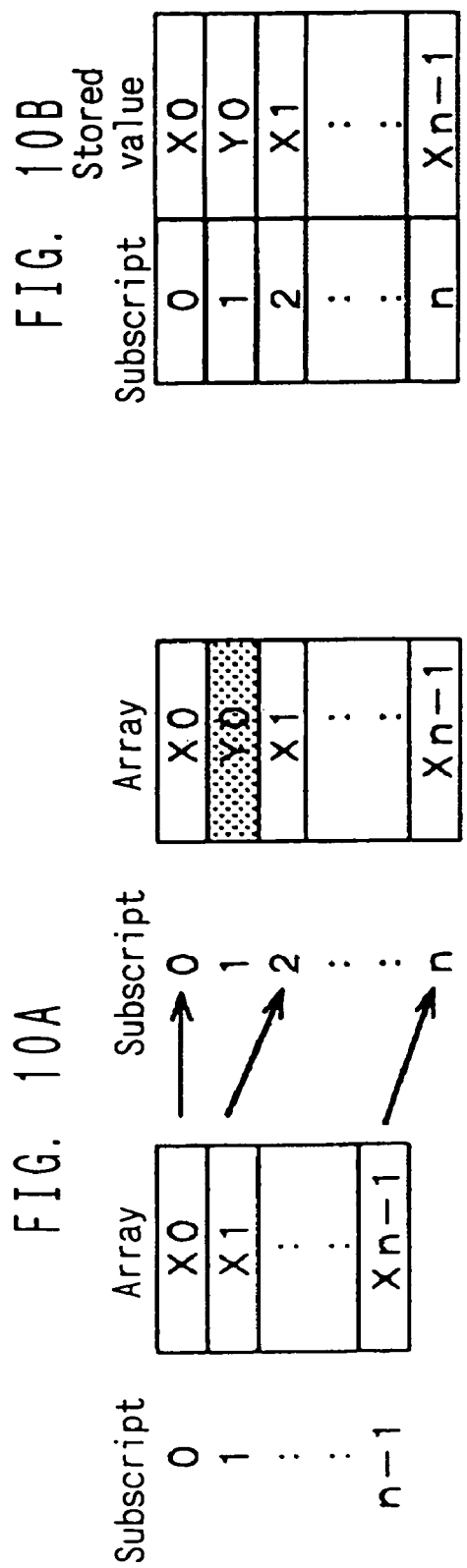
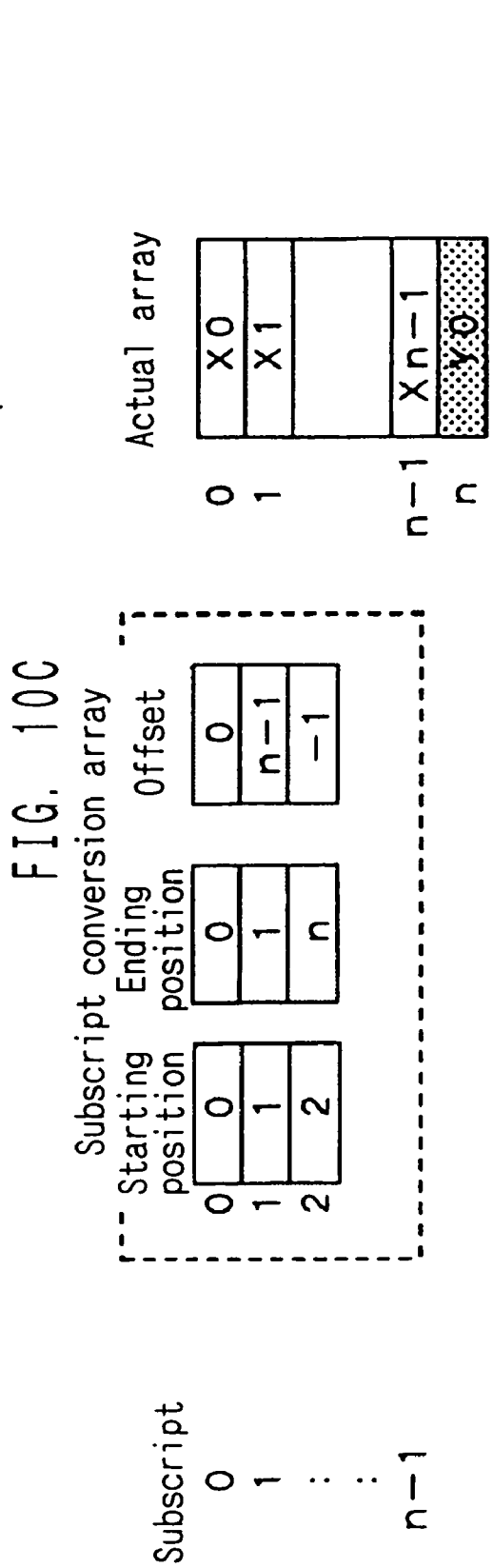
FIG. 10A
FIG. 10B Logical relationship between subscripts and stored values
FIG. 10C
Insertion of an element into an array of size "n"

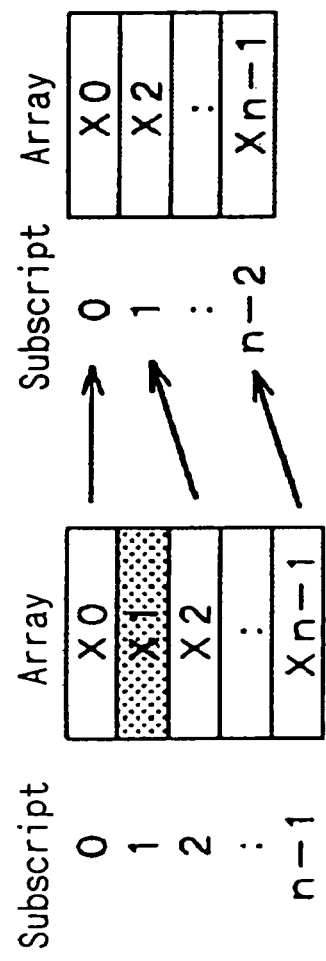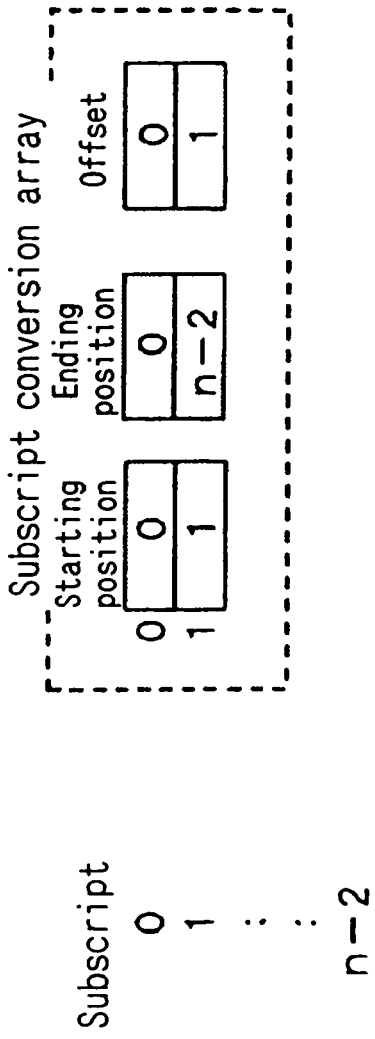

FIG. 16A
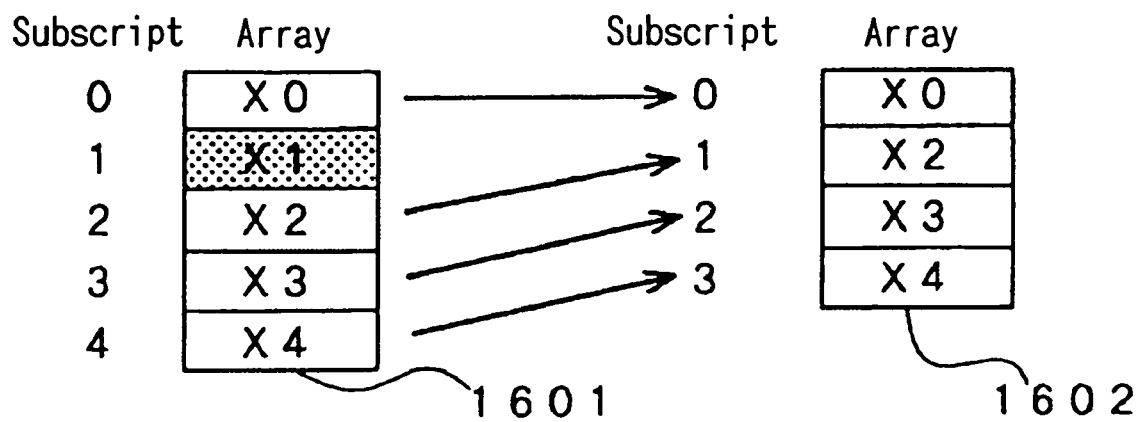
FIG. 16B
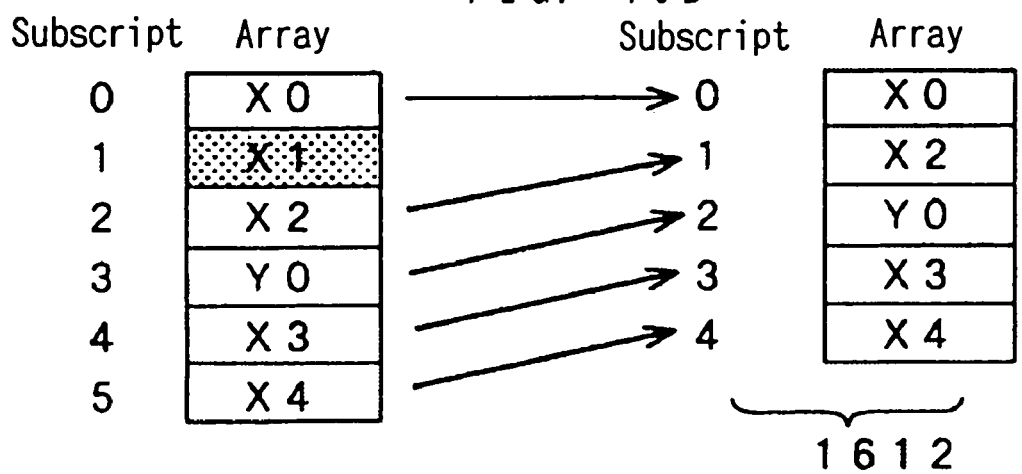
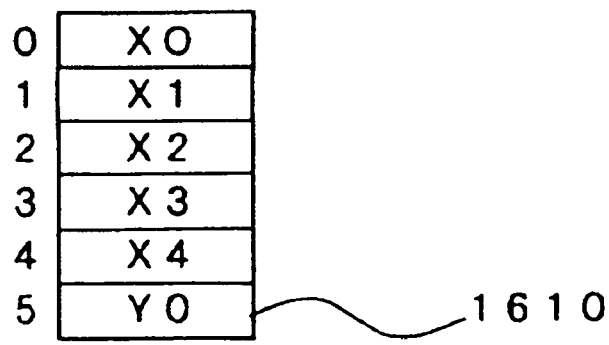

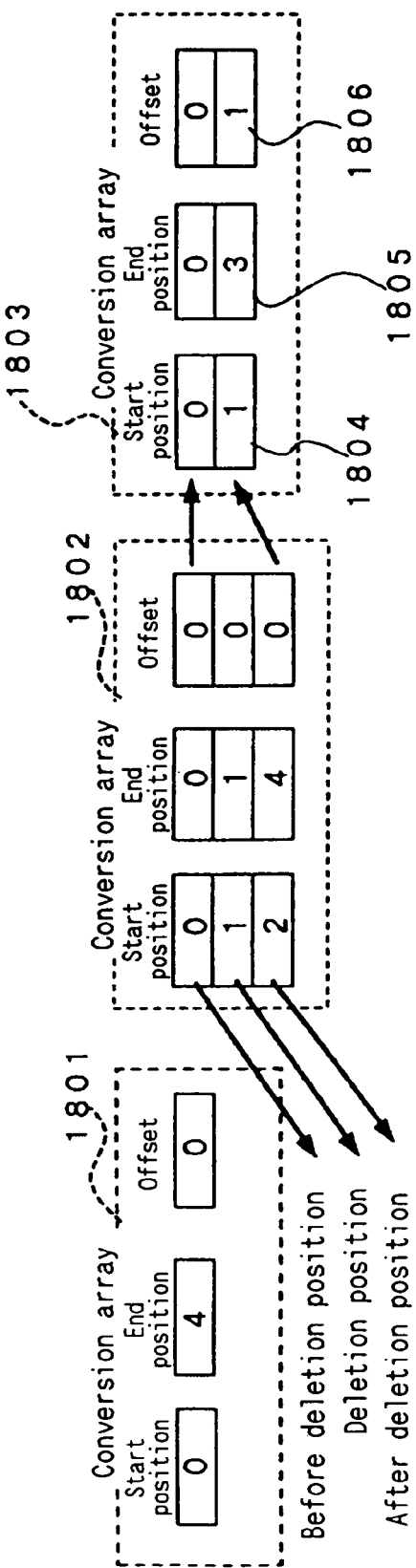
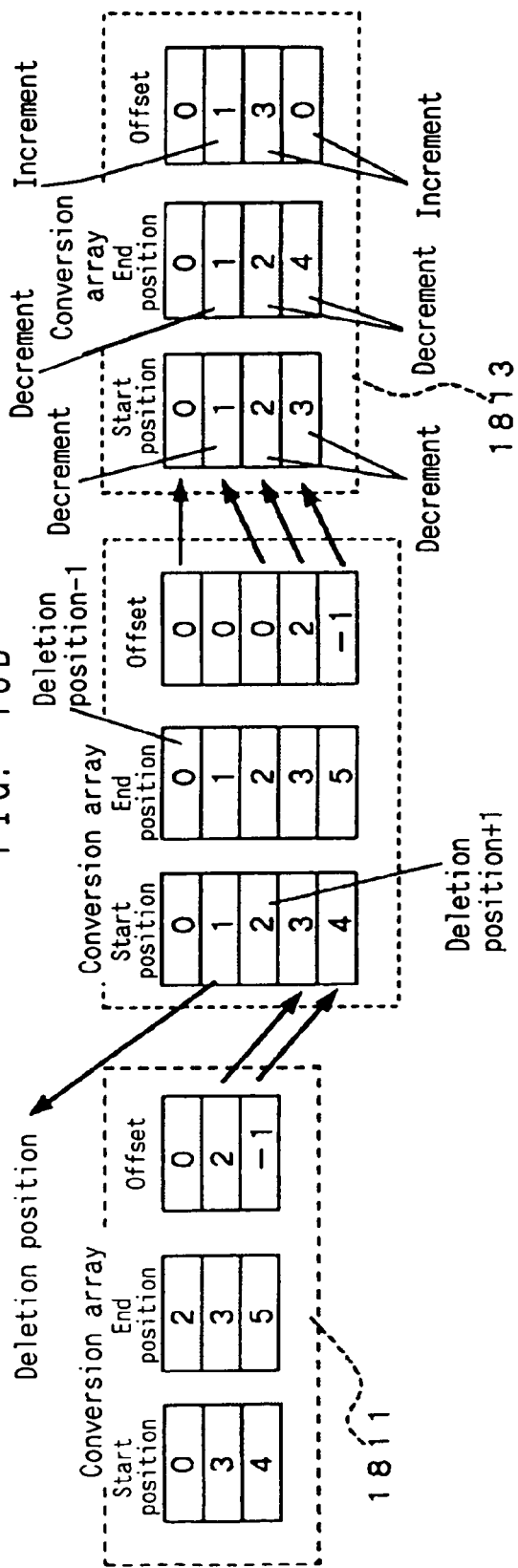
FIG. 18A
FIG. 18B (End position only; logic: $\leq$)

(Start position only; logic: $\geq$)

Increment values of 1 or more in the array.

Becomes the maximum possible value of the elements

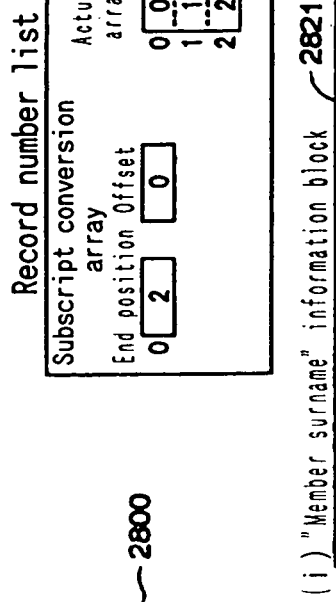
FIG. 28A
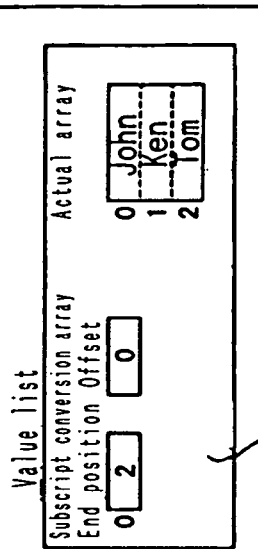
FIG. 28B
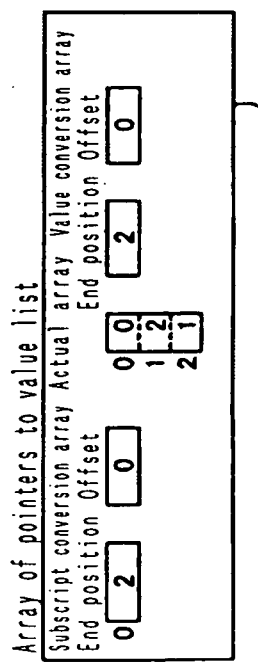
FIG. 28C (i) "Member surname" information block
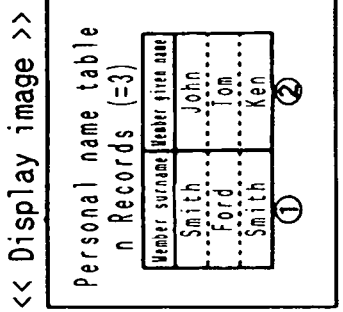
FIG. 28D (ii) "Member given name" information block << Display image >>

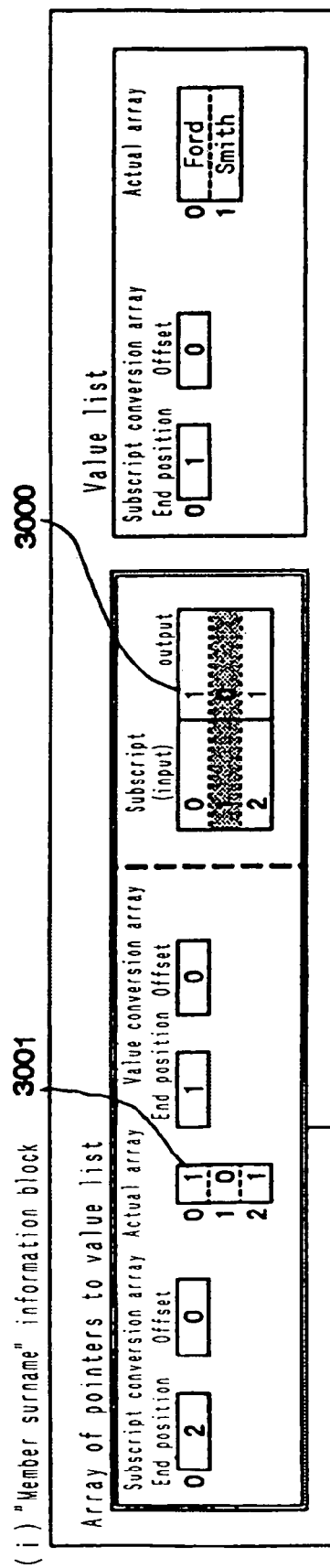

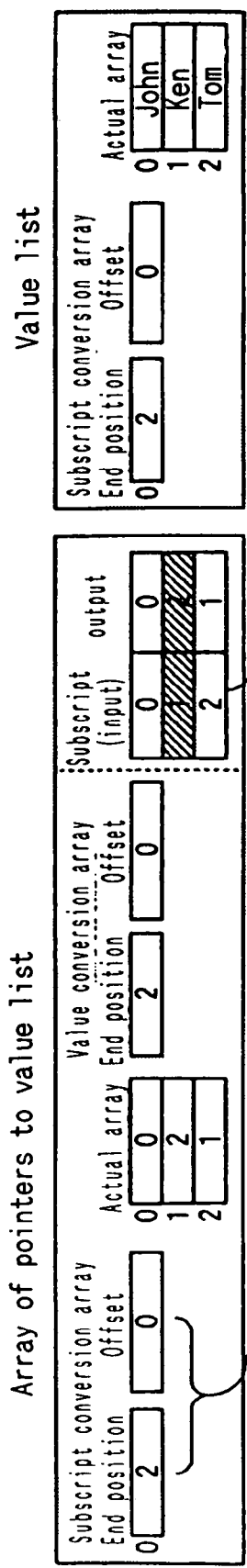
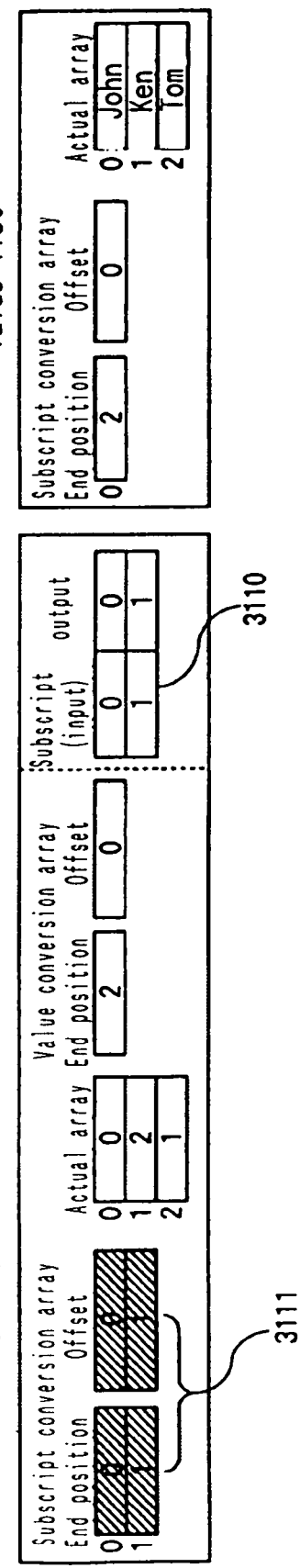
FIG. 31A
FIG. 31B

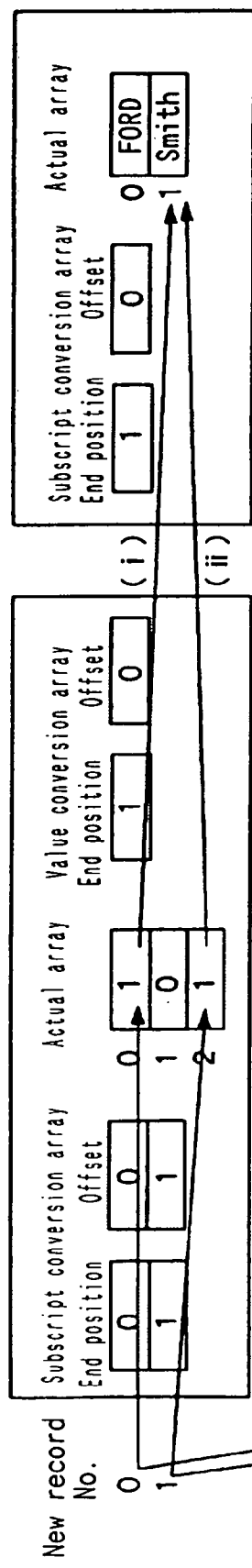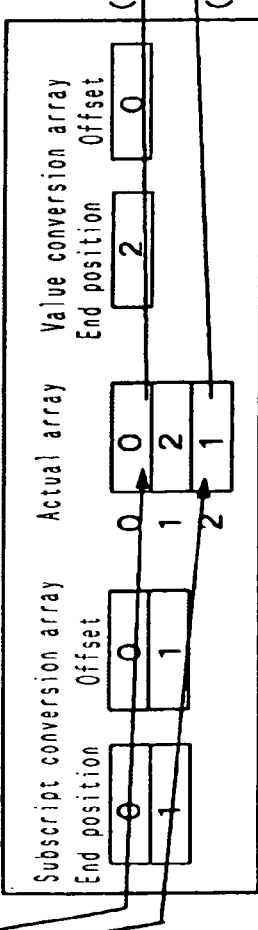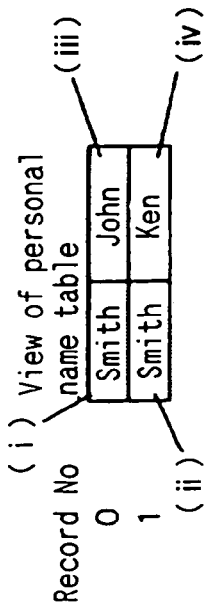
FIG. 32

FIG. 33A

<< Display image >>

Personal name table
n Records (n=3)

| Member surname | Member given name |
|---|---|
| Smith | Johk |
| Smith | Ken |
| (i) | (ii) |

Personal name table
n Records (n=3)

| Member surname | Member given name |
|---|---|
| Smith | Johk |
| Ford | Jonny |
| Smith | Ken |
| (i) | (ii) |

Inserted record

FIG. 34

Record number list (before insertion)

| Subscript conversion array | Actual array |
| End position Offset | |
| 0 | 1 | 0 | 0 |
| | | | 1 |

(i) "Member surname" information block (before insertion)

Array of pointers to value list

| Subscript conversion array | Actual array | Value conversion array |
| End position Offset | | End position Offset |
| 0 | 1 | 0 | 0 | 0 | 0 | 0 |
| | | | 1 | 0 | | |

Value list — Actual array
| End position Offset | |
| 0 | 0 | 0 | 0 | Smith |

(Alphabetical order overall)

(ii) "Member given name" information block (before insertion)

Array of pointers to value list

| Subscript conversion array | Actual array | Value conversion array |
| End position Offset | | End position Offset |
| 0 | 1 | 0 | 0 | 1 | 0 | 0 |
| | | | 1 | 1 | | |

Value list — Actual array
| End position Offset | |
| 0 | 1 | 0 | 0 | John |
| | | | 1 | Ken |

(Alphabetical order overall)

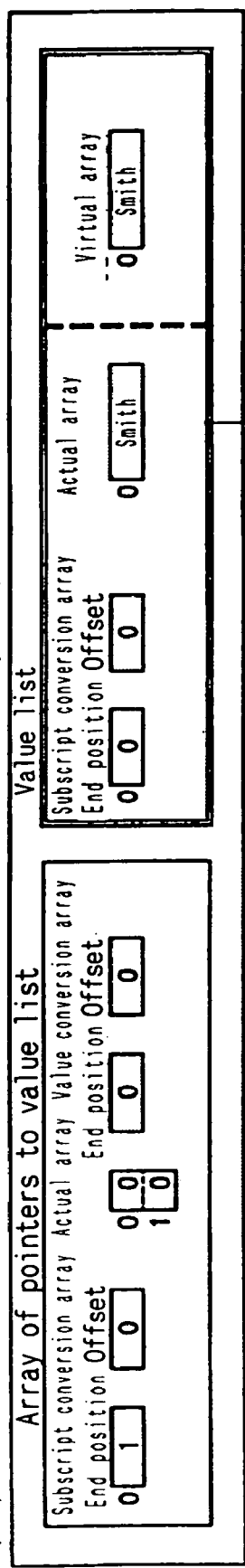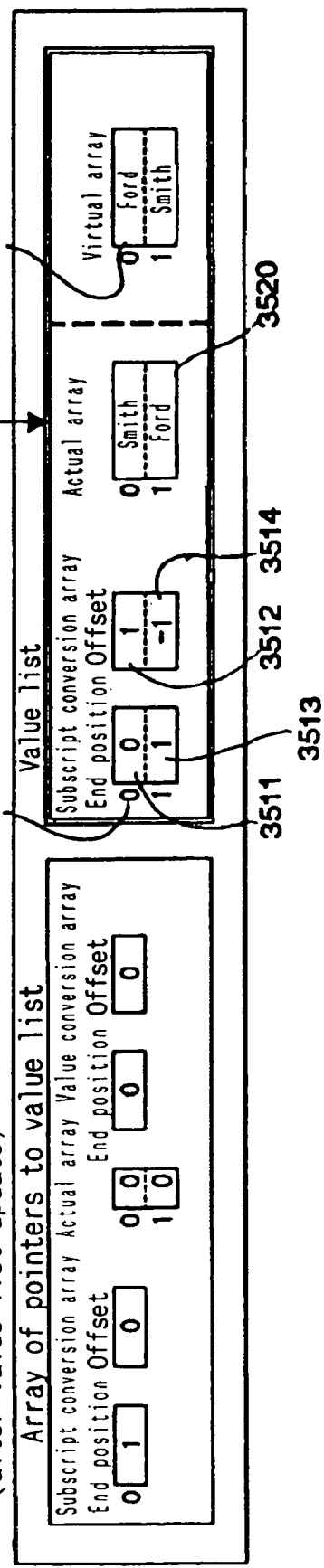
FIG. 35A / FIG. 35B

FIG. 36A (ii) "Member given name" information block (before value list update)

FIG. 36B (ii) "Member given name" information block (before value list update)

(i) "Member surname" information block (after update 1 of array of pointers to value list)

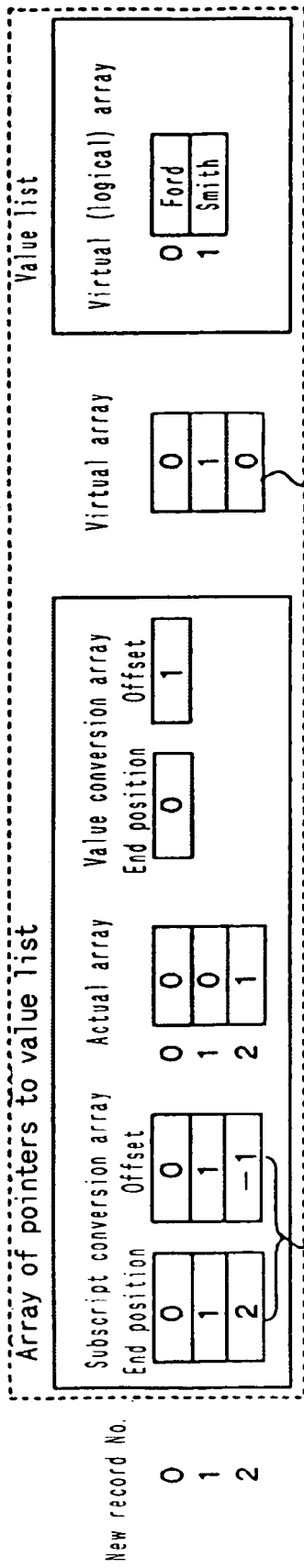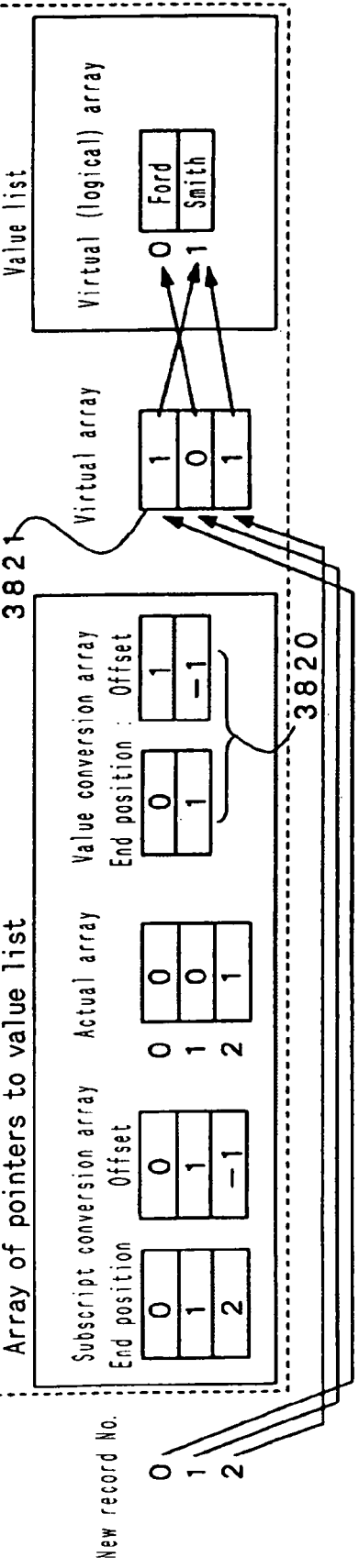
FIG. 38A
FIG. 38B (ii) "Member given name" information block (after completion of update 1 of array of pointers to value list)

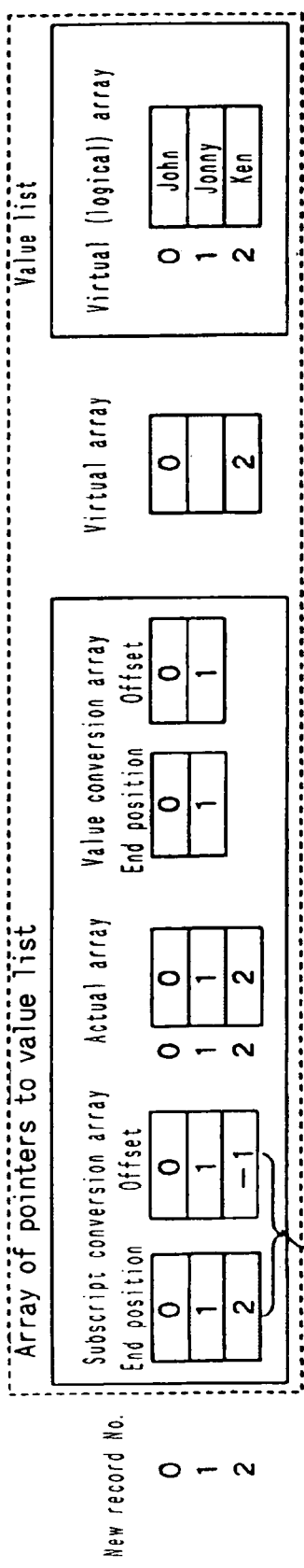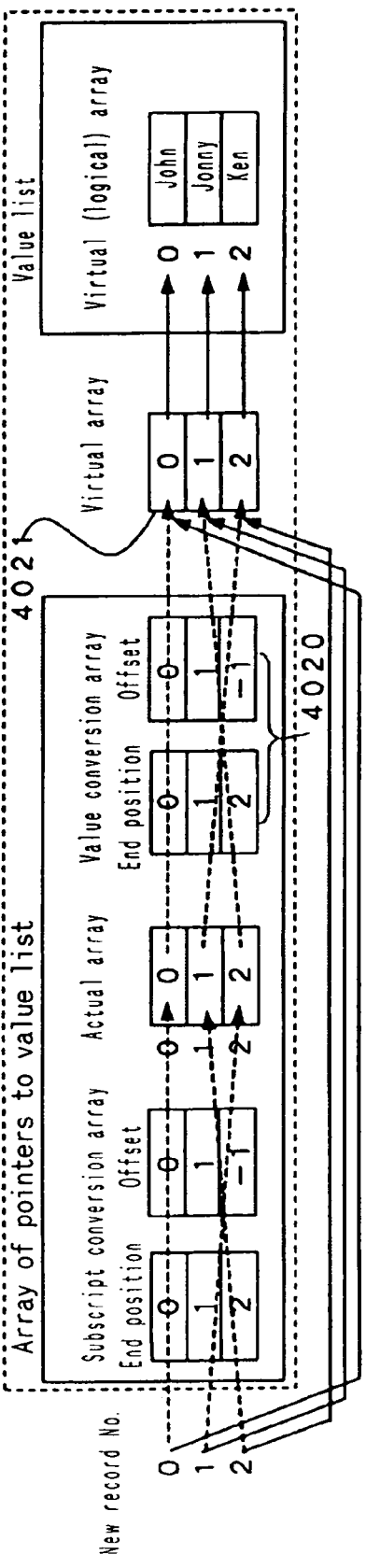
FIG. 40A
FIG. 40B

FIG. 41
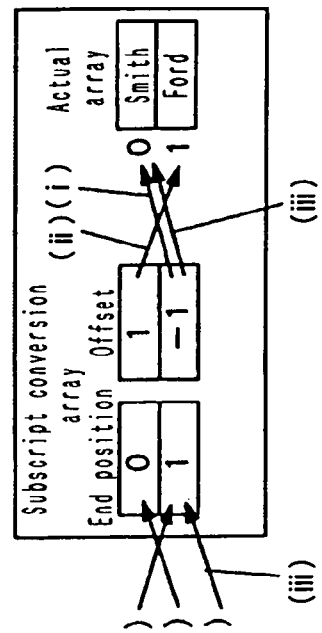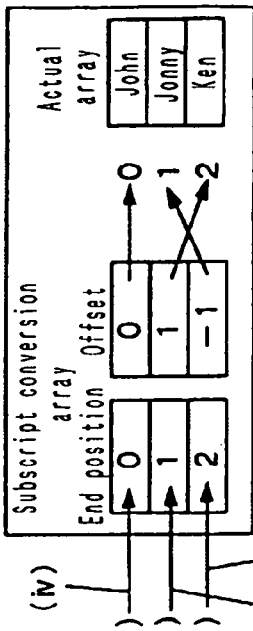
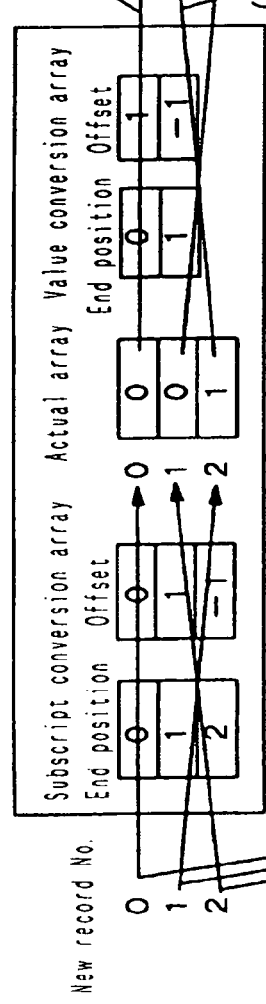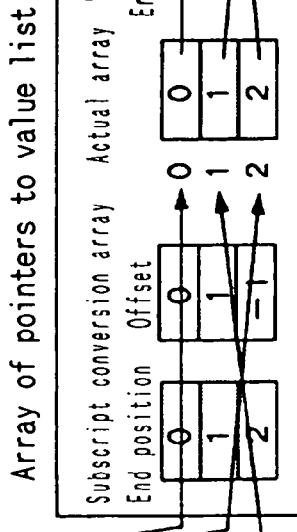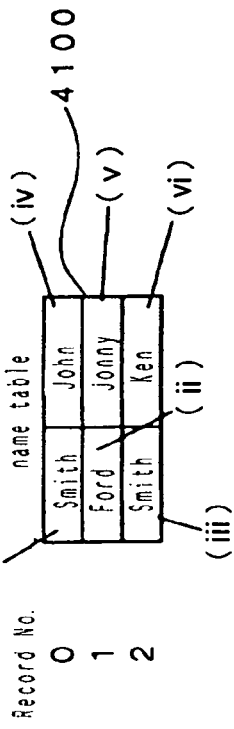

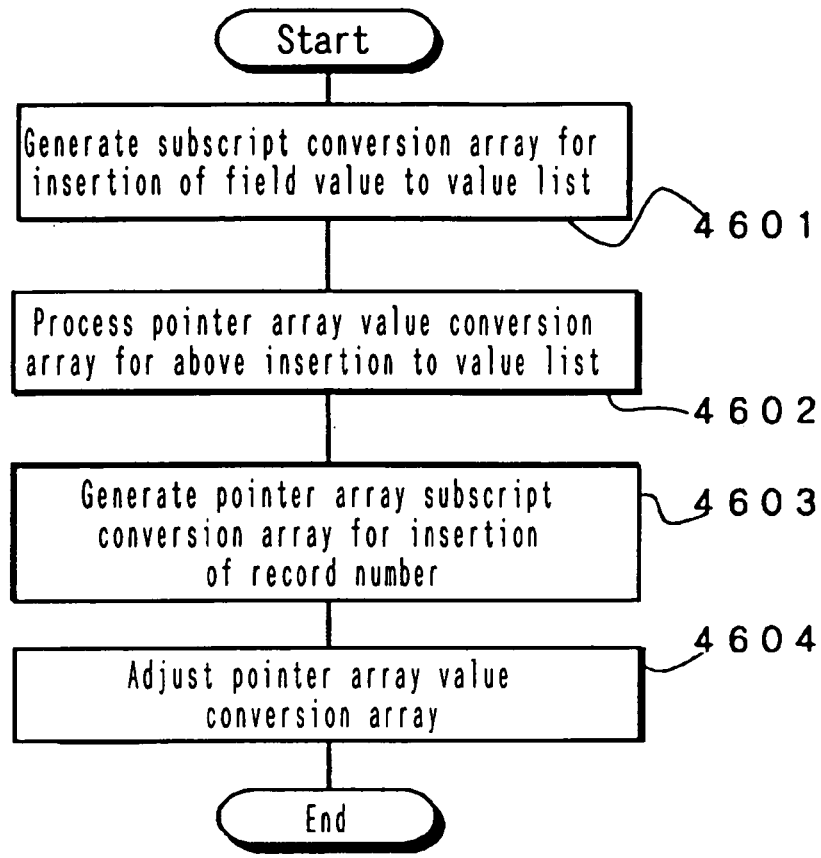
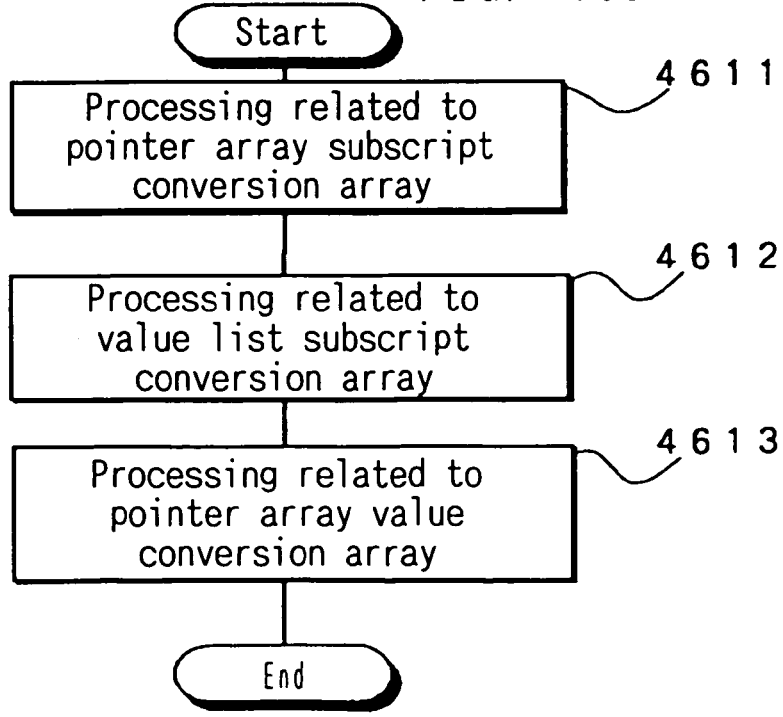

FIG. 47
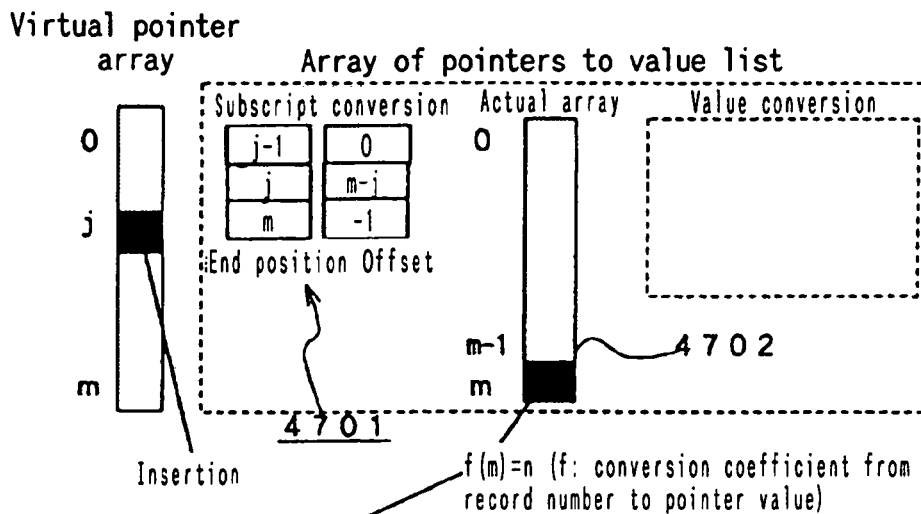
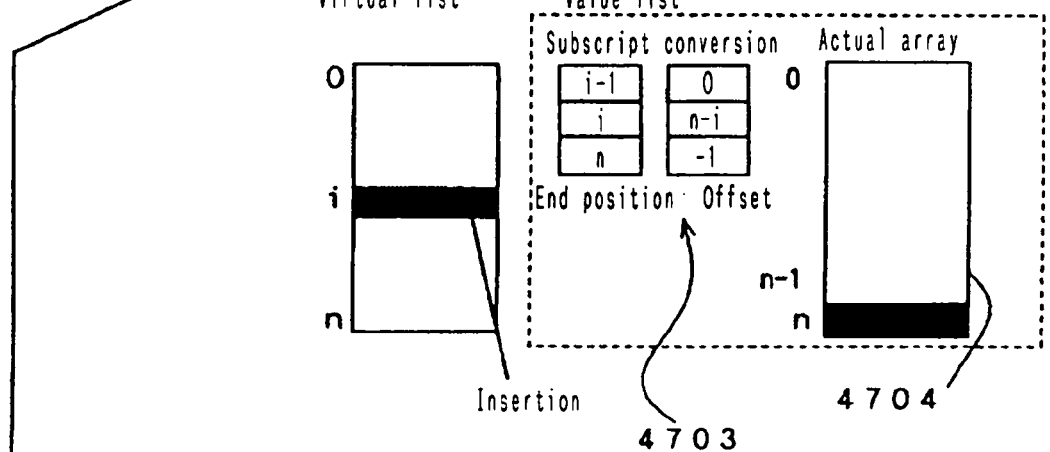

(Pointer array: from m records to m-1 records)

TABLE FORMAT DATA PRESENTING METHOD, INSERTING METHOD, DELETING METHOD, AND UPDATING METHOD

BACKGROUND OF THE INVENTION

1. Field of the Invention

The invention relates to a data processing method and data processing apparatus for processing large amounts of data using a computer or other information processing apparatus, and particularly to the updating, deleting, inserting and transaction processing of table-format data that constitutes a database.

2. Description of the Prior Art

Databases are used for various applications, but the use of a relational database (RDB) which is able to eliminate logical contradictions has become the mainstream in medium-to large-scale systems. For example, an RDB may be used in an airline seat reservation system or the like. In this case, a key field may be specified to perform a quick search for targets (often a single target), or to confirm, cancel or change reservations.

However, in recent years, there has been a conspicuous trend for databases to be used not only for applications involving the simple management of individual data records as described above (mission-critical work), but also analysis (information-based work). For example, the owner of the aforementioned database may try to create cross tabulations in order to analyze how the seat vacancy rate varies depending on the time zone, route, season or the like.

However, with a conventional RDB, local memory is used to commit a transaction and confirm its content, so despite being suited to mission-critical work based mainly on transaction processing, it is not suited to the analysis of large-scale data (information-based work) from a structural standpoint. For example, if one wishes to perform a sort on an arbitrary field, theoretically this will take time on the order of $n*\log(n)$ (with n records), so processing efficiency is reduced the larger the scale of data. (In actual products, the drop in processing performance proceeds more rapidly than according to theory.) Moreover, this limitation (time=$n*\log(n)$) appears not only in sorting but also in all general operations such as the extraction of partial sets (=searching).

Naturally, various methods of avoiding this limitation and increasing speed have been proposed. A good example of this is the bitmap index. A bitmap index is a bitmap wherein information as to whether or not each record satisfies a condition is represented by a single bit. For example, in the case of a "sex" field, a "male" bitmap and a "female" bitmap would be created. At this time, if one wishes to extract (search for) only the records of "females," it is possible to obtain that partial set (the set of records of females) quickly. However, it is not possible to create bitmaps for each value at all times. For example, in the case of a field (e.g. an ID number) that has one billion different values in a database of one billion records, it would be necessary to create one billion bitmaps, each of a size of one billion bits (approximately 125 MB). One can see that a bitmap index is only realistic for fields (e.g. sex) that have an extremely small number of variations. In addition, this method clearly cannot be applied instantly to partial sets, and it cannot be used in cases in which records are frequently inserted or deleted. Other techniques of increasing speed similarly have some kind of limitation. Because of such limitations in the applicable scope of these various technologies for increasing speed, operations that may appear to the user to be completely identical may be completed instantaneously or may take hours, so a serious problem of extreme discontinuity in processing time (difficulty of prediction) occurs.

For example, when times were measured with a currently commercially available RDB using a table having 10 million records in the entire set, it has been reported that hitting all records (=10 million records) took only 1 second, but hitting only 737 records required 61 seconds. Well then, how much processing time do you think it would take to hit 9 million records? It need not be said that the number of hits cannot be known prior to executing the search, so even if a function were known for the correspondence between the number of hits and the time required for a search, the time required cannot be predicted accurately. After all, even the theoretical basis is weak for assuming that the time required to extract 5 million records that satisfy the condition of being males (search time) is the same as the time required to extract 5 million records that satisfy the condition of being females (search time).

Such instability in performance is fatal particularly for real-time control systems. For example, large-scale, complex electrical power supply control systems wherein a plurality of power plants are connected to an extremely large number of electrical power customers via a power line network, or control systems for large-scale chemical plants are two of a large number of examples of systems that manage and use large amounts of data but cannot use databases.

Naturally, it is clear that even if their performance is stable, they are not usable if they are too slow, but what we would like to emphasize here is database systems can become horribly complex as a result of introducing various methods of increasing speed that are applicable only under special limited conditions, or they entail major problems such as the aforementioned extreme discontinuity in processing times.

Now, the aforementioned methods of statistical usage of databases have come into general use as described above, and at the same time, it is a known fact that the amounts of data processed are rapidly becoming larger and larger. In this situation, the data warehouse (DWH) and multidimensional database (MDB) have appeared in order to overcome the aforementioned problems.

The DWH may be thought of as an RDB from which transaction processing functions and the like have been removed and that is tuned to specialize in search and tabulation functions. Accordingly, the fundamental limitation of a processing time of $n*\log(n)$ remains as is, so the performance has not been adequately improved and the problem of discontinuity has also not been solved. Moreover, the unavoidable combination of an existing RDB for mission-critical work and DWH for information-based work results in a large increase in facilities investment and also gives rise to new problems including increased complexity of information management and added operating costs.

On the other hand, an MDB may be thought of as a system wherein foundation cross tabulations are prepared in advance based on a combination of specified fields (called dimensions), and the cross tabulations requested by the user are synthesized from the foundation cross tabulations. MDBs can synthesize cross tabulations with satisfactory response, but they also have many problems. For example, it is not possible to return to the original records (unless special manipulation is performed, because it is not possible to return to the original data from tabulations); it also cannot handle data such as stock prices that are updated over time (because the cross tabulations must be prepared in advance);

and cross tabulations cannot be prepared on fields (dimensions) other than those specified in advance, among other problems. Naturally, the same problems as with a DWH of increased facilities investment and added complexity of information management also occur.

Looking at reality, the DWH and MDB are rarely introduced except for in fields where performance is emphasized regardless of cost, such as the aforementioned control systems and scientific and technical computations, financial engineering and the like. This is evidence that their functions and performance cannot stand up to actual use in the aforementioned fields.

In order to solve these problems, the present inventors have already invented a method of searching for, tabulating, sorting and joining table-format data (the linear filter method) at roughly 100–1000 times the speed as in the prior art, and have applied for a patent thereupon (Japanese Patent Application No. 10-227278) The linear filter method has many superior properties including high, stable processing performance, unity of processing, compactness and divisibility of data, an O(n) architecture, along with direct connectivity of sorts and suitability to pipeline and parallel processing.

Thus, the present invention has as its object to provide a method of inserting, deleting and updating data in table-format data using the aforementioned linear filter method, particularly wherein the insertion, deletion and updating of data is performed quickly and appropriately.

In addition, as is generally understood, actual update operations require the appropriate application of exclusive control whereby simultaneous access to the same data by multiple processes is controlled, and transaction processing wherein multiple processes are committed (or rolled back) as a single significant processing block.

To this end, the present invention has as an additional object to provide a method of inserting, deleting and updating table-format data wherein the aforementioned transaction processing is performed appropriately.

SUMMARY OF THE INVENTION

The object of the present invention is achieved by providing a method of inserting table-format data where field values are inserted at arbitrary positions in table-format data represented by an array of records containing a field and the field values contained therein, wherein said method of inserting table-format data is characterized in comprising the steps of: generating a subscript conversion array constituted such that it accepts a record number as a subscript and gives an offset value corresponding to the range of said subscript, identifying an insertion position that indicates the position of the field value to be inserted, in said subscript conversion array, regarding said insertion position, giving an offset value that defines the range of the corresponding subscript and also identifies a stipulated position after the end of said array, in said subscript conversion array, regarding those records having a record number greater than the record number corresponding to said insertion position, giving an offset value that shifts the corresponding range of subscripts upward and also decrements the accepted subscript, and placing said field value to be inserted at the end of said array, such that an offset value according to the range of subscripts within the subscript conversion array is given as said subscript and the field value with the array is identified by means of the subscript given by said offset value.

By means of the present invention, the subscript conversion array is used to give the stipulated offset to the subscripts and identify the field values of the array. Accordingly, in the case of insertion, by means of the subscript conversion array, the subscript corresponding to the newly inserted position can identify a new field value placed at a stipulated position after the end of the array. Accordingly, data is actually inserted into the array, so there is no need to move other data and thus field values can be logically inserted into the array. In addition, it is thereby possible to perform parallel processing and transaction processing as described later.

A further object of the present invention is achieved by providing a method of deleting table-format data where field values are deleted at arbitrary positions in table-format data represented by an array of records containing a field and the field values contained therein, wherein said method of deleting table-format data is characterized in comprising the steps of: generating a subscript conversion array constituted such that it accepts a record number as a subscript and gives an offset value corresponding to the range of said accepted subscript, identifying a deletion position that indicates the position of the field value to be deleted, and in said subscript conversion array, regarding those records having a record number greater than the record number corresponding to said deletion position, giving an offset value that shifts the corresponding range of subscripts downward and also increments the accepted subscript, such that an offset value according to the range of subscripts within the subscript conversion array is given as said subscript and the field value with the array is identified by means of the subscript given by said offset value.

In the present invention also, the subscript conversion array is used to make the field values corresponding to the position to be deleted not be pointed to by subscripts. Thus, the process of logical data deletion is achieved without deleting actual data and without moving data.

In addition, the method of deleting table-format data may be performed by executing the aforementioned method of updating and method of deleting sequentially or in reverse order.

In addition, in a different embodiment of the present invention, a value conversion method for table-format data that converts the values of field values in table-format data represented by an array of records containing a field and the field values contained therein is characterized in comprising the steps of: generating a value conversion array constituted such that it gives an offset value corresponding to the range of said field value, and being constituted such that it accepts a record number as a subscript and gives an offset value corresponding to the range of said field value to the field value corresponding to said subscript within said array.

A further object of the present invention is achieved by providing a data structure for table-format data constituted such that the field values corresponding to an arbitrary record number are identified in table-format data represented by an array of records containing a field and the field values contained therein, wherein said data structure for table-format data is characterized in that: said table-format data is constituted in a manner such that it is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array.

By means of the present invention, for example, a certain process may form a data stream via the subscript conversion array and value conversion array, while another process may form a data stream that uses only the actual array. In this manner, if necessary, by setting either the passage or non-passage of said conversion array, parallel processing and transaction processing can be achieved appropriately.

For example, each of said subscript conversion arrays may comprise: a start position array consisting of start positions that indicate the minimum value of the subscripts contained within each of the stipulated ranges, and/or an end position array consisting of end positions that indicate the maximum value of the subscripts contained in said stipulated range, and an offset array consisting of the corresponding offset values. In addition, said value conversion array may comprise: a start position array consisting of start positions that indicate the minimum value of the subscripts contained within each of the stipulated ranges, and/or an end position array consisting of end positions that indicate the maximum value of the values contained in said stipulated range, and an offset array consisting of the corresponding offset values.

A still further object of the present invention is achieved by providing a method of inserting table-format data where field values are inserted at arbitrary positions in table-format data represented by the data structure defined above, wherein said method of inserting table-format data is characterized in comprising the steps of:

(1) regarding said value list:
identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array,
identifying an insertion position that indicates the position of the pointer value corresponding to the record number to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, and placing a new pointer value greater than the existing pointer values at the stipulated position after the end of said second actual array, and (3) regarding said pointer array,
in said value conversion array, giving a second offset value that increments those records that have a value greater than the pointer value corresponding to the insertion position in said value list, in said value conversion array, giving a second offset value such that said new pointer value identifies a position corresponding to said insertion position.

In a preferred embodiment of the aforementioned method of inserting table-format data: the table comprises m record numbers and n field values, and when the insertion position for field values within said value list is i (0<=i<=n−1: hereinafter "<=" means the left side is equal to or less than the right side, while ">=" means the left side is equal to or greater than the right side), a field value is placed at the end n of the first actual array, the record number insertion position is j (0<=j<=m−1), and a pointer value is placed at the end m of the second actual array, (1) in the second subscript conversion array of said value list: 0 is given as the third offset value in the case that the value is in the range of (i−1) or less, (n−1) is given as the third offset value in the case that the value is i, and (−1) is given as the third offset value in the case that the value is in the range of (i+1) or greater and n or less, (2) in the first subscript conversion array of said pointer array: 0 is given as the first offset value in the case that the subscript is in the range of (j−1) or less, (m−j) is given as the first offset value in the case that the subscript is j, and (−1) is given as the first offset value in the case that the subscript is in the range of (j+1) or greater and m or less, (3) in the value conversion array of said pointer array: 0 is given as the second offset value in the case that the value is in the range of (i−1), 1 is given as the second offset value in the case that the value is in the range of i or greater and (n−1) or less, and (i-n) is given as the second offset value in the case that the value is n.

Alternately, the table comprises m record numbers and n field values, and when the insertion position for field values within said value list is i (0<=i<=n−1), a field value is placed at a stipulated position z (z>=n) after the end of the first actual array, and the record number insertion position is j (0<=j<=m−1), a pointer value is placed at a stipulated position x (x>=m) after the end of the second actual array, (1) in the second subscript conversion array of said value list:
0 is given as the third offset value in the case that the value is in the range of (i−1) or less, (z−1) is given as the third offset value in the case that the value is i, and (−1) is given as the third offset value in the case that the value is in the range of (i+1) or greater and n or less, (2) in the first subscript conversion array of said pointer array: 0 is given as the first offset value in the case that the subscript is in the range of (j−1) or less, (x-j) is given as the first offset value in the case that the subscript is j, and (−1) is given as the first offset value in the case that the subscript is in the range of (j+1) or greater and m or less, and also (3) in the value conversion array of said pointer array: 0 is given as the second offset value in the case that the value is in the range of (i−1), 1 is given as the second offset value in the case that the value is in the range of i or greater and (n−1) or less, and (i-y) is given as the second offset value in the case that the value is y (where y is the pointer value stored at the position x of the second actual array).

In addition, another object of the present invention is achieved by a method of deleting table-format data where field values are deleted at arbitrary positions in table-format data represented by the data structure defined above, wherein said method of deleting table-format data is characterized in comprising the steps of: regarding said pointer array, identifying a deletion position that indicates the position of the pointer value to be deleted, in said first subscript conversion array, regarding said insertion position, defining the corresponding subscript, in said first subscript conversion array, regarding those records having a record number greater than the record number corresponding to said deletion position, giving a first offset value that shifts the corresponding range of subscripts downward so that the values that define said range become smaller and also increments the accepted subscript.

In a preferred embodiment of the aforementioned method of deleting table-format data: the table comprises m record numbers and n field values, and when the record number deletion position is j ($0<=j<=m-1$), in the first subscript conversion array of said pointer array: 0 is given as the first offset value in the case that the subscript is in the range of $(j-1)$ or less, and 1 is given as the offset value in the case that the subscript is in the range of j or greater and $(m-2)$ or less.

A still further object of the present invention is achieved by providing a method of updating table-format data where field values are updated at arbitrary positions in table-format data represented by the data structure defined above, wherein said method of updating table-format data is characterized in comprising the steps of:

(A) (1) regarding said value list:

assuming the position of the field value to be updated to be the insertion position, identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array, assuming the pointer value to be updated to be the pointer value to be inserted, identifying an insertion position that indicates the position of the pointer value to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, placing a new pointer value greater than the existing pointer values at the stipulated position after the end of said second actual array, and (3) regarding said pointer array, in said value conversion array, giving a second offset value that increments those records that have a value greater than the pointer value corresponding to the insertion position in said value list, in said value conversion array, giving a second offset value such that said new pointer value identifies a position corresponding to said insertion position, (B) regarding said pointer array, identifying the position of the pointer value to be updated as the deletion position, in consideration of said insertion position, in said first subscript conversion array, regarding said deletion position, defining the corresponding subscript, in said first subscript conversion array, regarding those records having a record number greater than the record number corresponding to said deletion position, giving a first offset value that shifts the corresponding range of subscripts downward so that the values that define said range become smaller and also increments the accepted subscript, and either of said (A) and (B) or said (B) and (A) are executed sequentially. In a preferred embodiment of the aforementioned method of updating table-format data: the table comprises m record numbers and n field values, and when the updating position for field values within said value list is i ($0<=i<=n-1$), a field value is placed at the end n of the first actual array, and the record number updating position is j ($0<=j<=m-1$), a pointer value is placed at the end m of the second actual array, (1) in the second subscript conversion array of said value list: 0 is given as the third offset value in the case that the value is in the range of $(i-1)$ or less, $(n-1)$ is given as the third offset value in the case that the value is i, and $(-1)$ is given as the third offset value in the case that the value is in the range of $(i+1)$ or greater and n or less, (2) in the first subscript conversion array of said pointer array: 0 is given as the first offset value in the case that the subscript is in the range of $(j-1)$ or less, $(m-j)$ is given as the first offset value in the case that the subscript is j, and 0 is given as the first offset value in the case that the subscript is in the range of $(m+1)$ or greater and $(m+1)$ or less, (3) in the value conversion array of said pointer array: 0 is given as the second offset value in the case that the value is in the range of $(i-1)$, 1 is given as the second offset value in the case that the value is in the range of i or greater and $(n-1)$ or less, and $(i-n)$ is given as the second offset value in the case that the value is n.

Alternately, the table comprises m record numbers and n field values, and when the insertion position for field values within said value list is i ($0<=i<=n-1$), a field value is placed at a stipulated position z ($z>=n$) after the end of the first actual array, and the record number insertion position is j ($0<=j<=m-1$), a pointer value is placed at a stipulated position x ($x>=m$) after the end of the second actual array, (1) in the second subscript conversion array of said value list: 0 is given as the third offset value in the case that the value is in the range of $(i-1)$ or less, $(z-1)$ is given as the third offset value in the case that the value is i, and $(-1)$ is given as the third offset value in the case that the value is in the range of $(i+1)$ or greater and n or less, (2) in the first subscript conversion array of said pointer array: 0 is given as the first offset value in the case that the subscript is in the range of $(j-1)$ or less, $(x-j)$ is given as the first offset value in the case that the subscript is j, and 0 is given as the first offset value in the case that the subscript is in the range of $(j+1)$ or greater and $(m+1)$ or less, and also (3) in the value conversion array of said pointer array: 0 is given as the second offset value in the case that the value is in the range of $(i-1)$, 1 is given as the second offset value in the case that the value is in the range of i or greater and $(n-1)$ or less, and $(i-y)$ is given as the second offset value in the case that the value is y (where y is the pointer value stored at the position x of the second actual array).

Alternately, the method of deleting table-format data defined above may comprise the steps of: regarding said record number, providing a fourth actual array in which the record numbers themselves are placed, and a third subscript conversion array given stipulated offset values according to the range of subscripts for identifying said record number, identifying a deletion position that indicates the position of said record number to be deleted, in said third subscript conversion array, defining a corresponding subscript regarding said deletion, in said third subscript conversion array, regarding those records having a value greater than the subscript corresponding to said deletion position, giving a fourth offset value that shifts the corresponding range of subscripts downward so that the values that define said range become smaller and also increments the accepted subscript.

This involves forming an information block containing a fourth actual array in which the record numbers themselves are placed, and a subscript conversion array for specifying the record number, and thus more substantial deletion of data is achieved.

In addition, another object of the present invention is achieved by a transaction processing method characterized in that, when the insertion, deletion and/or updating of data in table-format data is performed by means of the above method, and either a rollback or commit is performed, said subscript conversion array and value conversion array are discarded. In this case, said subscript conversion array and value conversion array may be discarded only when a rollback is performed.

In addition, another object of the present invention is achieved by a parallel processing method where a plurality of processes are performed simultaneously on table-format data having the data structure defined above, wherein among the aforementioned processes, those that involve the insertion, deletion and/or updating of data are constituted such that, in said pointer array, they go through a first subscript conversion array, second actual array and value conversion array, and also, in said value list, they go through a second subscript conversion array and a first actual array, and on the other hand, among the aforementioned processes, those that do not involve the insertion, deletion and/or updating of data are constituted such that, in said pointer array, they go through a second subscript conversion array, and also, in said value list, they go through a first actual array.

These processes that involve the insertion, deletion and/or updating of data may utilize one of the aforementioned methods of inserting, deleting or updating table-format data.

Alternately, in still another embodiment of the present invention, a record locking method for table-format data having the aforementioned data structure is such wherein an information block containing an array for controlling locking is provided, and field values corresponding to each of said record numbers that indicate the type of locking are placed within the array of said information block.

In addition, an object of the present invention is also achieved by a computer-readable recording medium recorded with a program for implementing one of the various methods described above.

BRIEF EXPLANATION OF THE DRAWINGS

This and other objects of the present invention will be made clear in reference to the appended drawings and embodiments. Here:

FIGS. 3A–3D are diagrams illustrating an example of table-format data, and an example of an information block based on this table-format data.

FIG. 4 is a diagram illustrating another example of table-format data, and an example of an information block based on this table-format data.

FIGS. 7A and 7B, respectively, are diagrams showing an example of original data used for creating an information block.

FIGS. 10A through 10C are diagrams used to describe the logical input/output relationships related to insertion of elements and the insertion of elements into an array according to Embodiment 1.

FIGS. 15A through 15C are diagrams used to describe the logical input/output relationships related to deletion of elements and the deletion of elements from an array according to Embodiment 1.

FIGS. 16A and 16B are diagrams used to explain the deletion of a certain element at a specified position in Embodiment 1.

FIGS. 18A and 18B are diagrams illustrating how the numerical values within the conversion array change according to the process of FIG. 17.

FIGS. 28A through 28D are diagrams illustrating the structure of various information blocks in Embodiment 5 of the present invention.

FIGS. 30A and 30B are diagrams used to describe the process of deleting a specific record in Embodiment 5 of the present invention.

FIGS. 31A and 31B are diagrams used to describe the process of deleting a specific record in Embodiment 5 of the present invention.

FIG. 32 is a diagram used to describe the process of deleting a specific record in Embodiment 5 of the present invention.

FIGS. 33A and 33B are diagrams used to describe the process of inserting a specific record into a specific position in Embodiment 5 of the present invention.

FIG. 34 is a diagram used to describe the process of inserting a specific record into a specific position in Embodiment 5 of the present invention.

FIGS. 35A and 35B are diagrams used to describe the process of inserting a specific record into a specific position in Embodiment 5 of the present invention.

FIGS. 36A and 36B are diagrams used to describe the process of inserting a specific record into a specific position in Embodiment 5 of the present invention.

FIGS. 38A and 38B are diagrams used to describe the process of inserting a specific record into a specific position in Embodiment 5 of the present invention.

FIGS. 40A and 40B are diagrams used to describe the process of inserting a specific record into a specific position in Embodiment 5 of the present invention.

FIG. 41 is a diagram used to describe the process of inserting a specific record into a specific position in Embodiment 5 of the present invention.

FIGS. 46A and 46B are flowcharts used to describe the data insertion process for table-format data in the form of information blocks in the present invention.

FIG. 47 is a diagram used to describe the data insertion process for table-format data in the form of information blocks in the present invention.

DESCRIPTION OF THE PREFERRED EMBODIMENT

Figure 1:
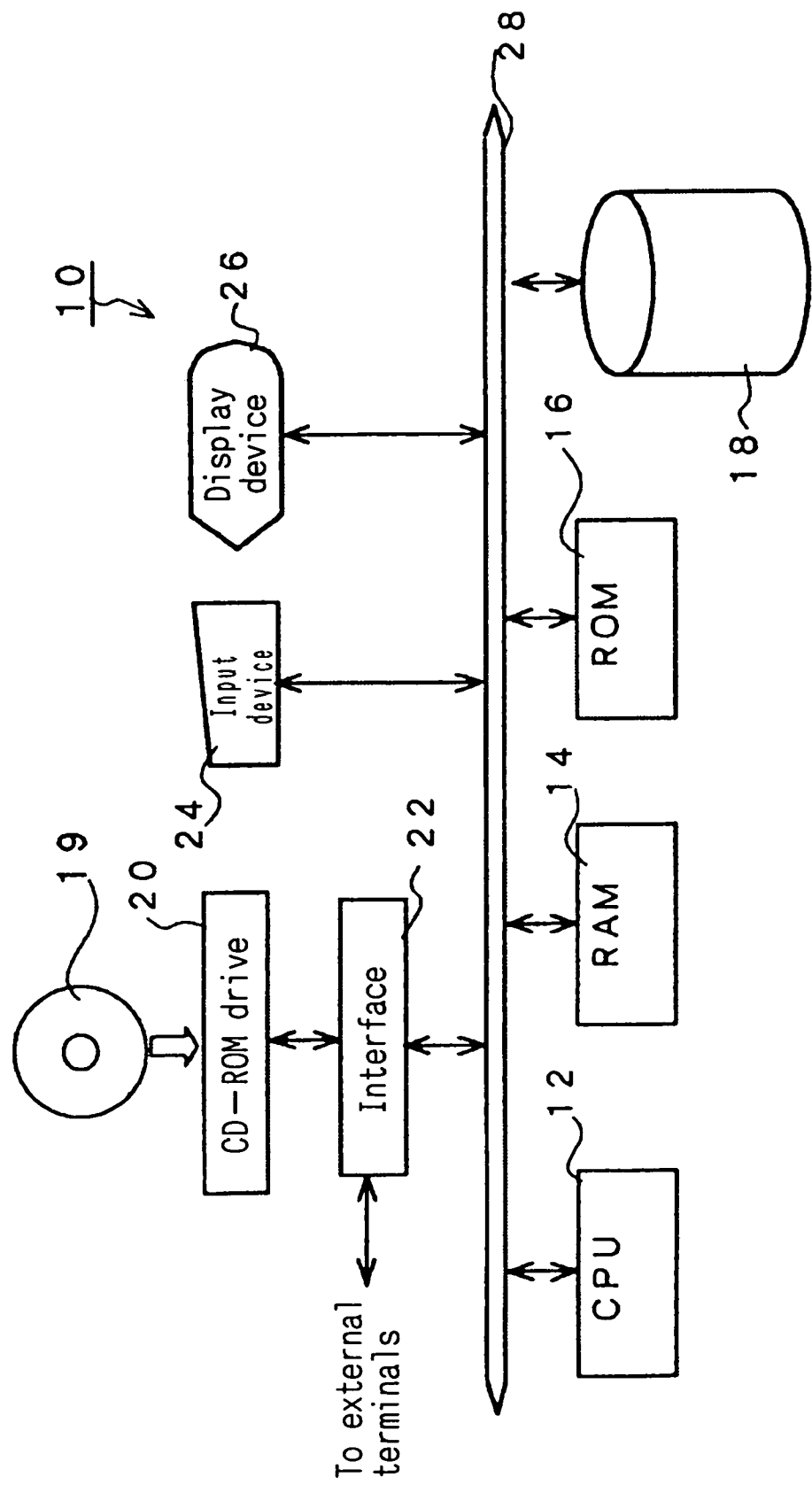
FIG. 1 is a block diagram showing the hardware configuration of a computer system that is able to implement the retrieval, tabulation and search methods according to an embodiment of the present invention.

Here follows a description of the embodiments of the present invention made with reference to the appended drawings. FIG. 1 is a block diagram showing the hardware configuration of a computer system that is able to implement the method of inserting, deleting and updating of the data of a certain field of table-format data according to an embodiment of the present invention. As shown in FIG. 1, this computer system 10 has the same configuration as that of an ordinary computer, consisting of a CPU 12 which controls the entire system and its individual components by executing a program, random access memory (RAM) 14 which stores working data and the like, read only memory (ROM) 16 which stores programs and the like, hard disk or other fixed storage device 18, CD-ROM drive 20 for accessing a CD-ROM 19, interface (I/F) 22 provided for the CD-ROM drive 20 and external terminals connected to an external network (not shown), a keyboard, mouse or other input device 24 and a CRT display device 26. The CPU 12, RAM 14, ROM 16, external storage medium 18, interface 22, input device 24 and CRT display device 26 are connected to each other via a bus 28.

According to the embodiment, the program for inserting data in a certain field of table-format data, program for deleting data in a certain field, program for updating the data in a certain field, program for implementing transaction processing, program that controls parallel processing and program for implementing exclusive control may be contained on the CD-ROM 19 and read by the CD-ROM drive 20, or stored in advance in ROM 16. In addition, once read from the CD-ROM 19, the program may also be stored in a specific area of the external storage medium 18. Alternately, the aforementioned programs may also be supplied from outside via the network (not shown), external terminals or interface 22. Note that in this Specification, the insertion of data is defined to refer to both inserting data between adjacent records and adding new records to the end of the records.

In addition, in this embodiment, in order to implement the insertion, deletion and updating of data, along with transaction processing, parallel processing and exclusive control appropriately and quickly, as described later, it is necessary to generate an information block of a stipulated data format. This information block generation program may be similarly contained on CD-ROM 19, stored in ROM 16, or stored on the external storage medium 18. Alternately, these programs may also naturally be supplied from outside via the network (not shown). In addition, in this embodiment, the data (information blocks) generated by the aforementioned information block generating program that generates the information blocks are stored in RAM 14 or in a specific area of the external storage medium 18.

Next, we shall briefly describe the handling of table-format data prerequisite to the present invention, namely the form in which table-format data is managed. In order to achieve high-speed searching, tabulating and sorting of table-format data, and in order to join a plurality of tables of table-format data in the desired manner, the present inventors thought of the construction of table-format data that has a specific data format (Japanese Patent Application No. 10-227278) and a method of joining table-format data which has said specific data format (Japanese Patent Application No. 11-151156). In the present invention also, fundamentally, table-format data is constructed based on the techniques disclosed in this applications as a stipulated set of information blocks and searching, tabulating and sorting are performed using them.

Figure 2:
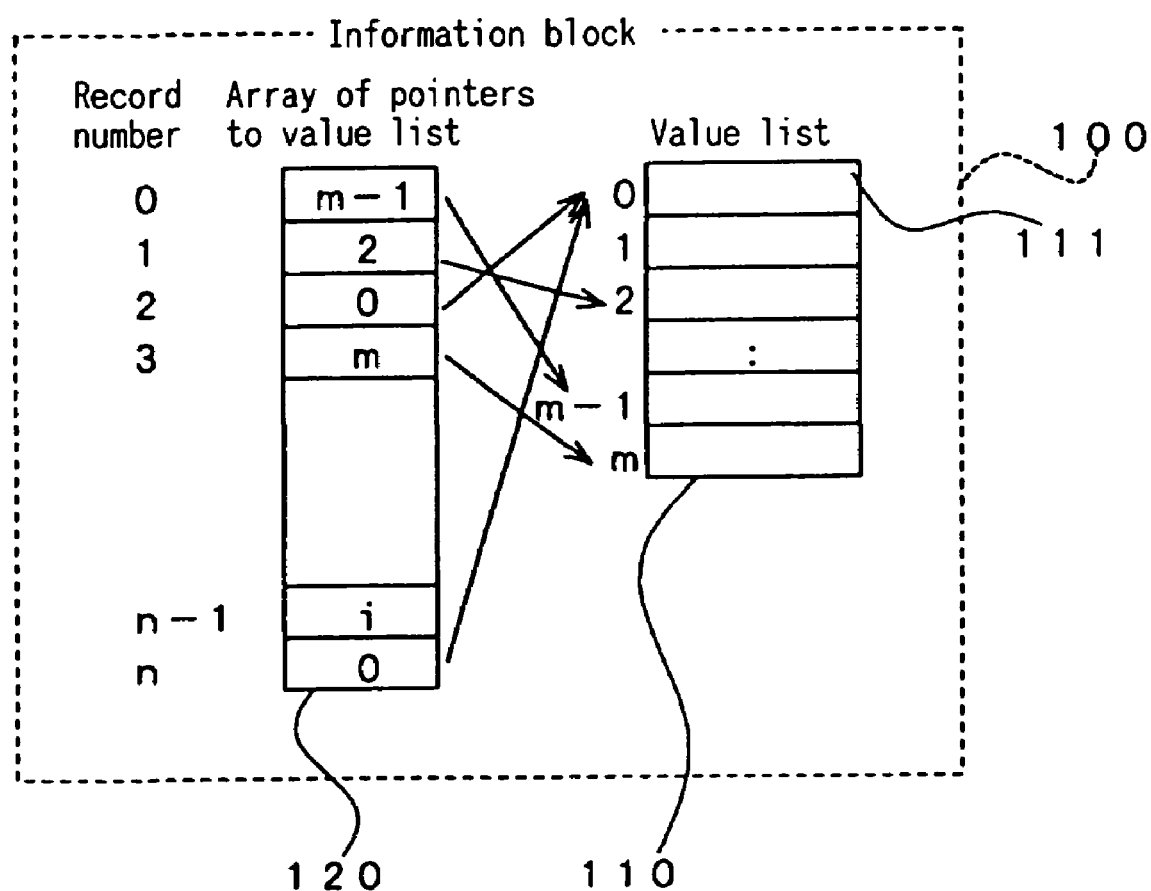
FIG. 2 is a diagram illustrating an information block used in an embodiment of the present invention.

FIG. 2 is a diagram illustrating an information block used in an embodiment of the present invention. As shown in FIG. 2. an information block 100 contains a value list 110 and an array of pointers to the value list 120. The value list 110 is a table containing, for each of the fields of table-format data, field values 111 corresponding to field value numbers in the order of the field value numbers which are assigned (integrally assigned) based on the field values belonging to that field. The array of pointers to the value list 120 is an array containing the field value number of a column (namely a field) in the table-format data, or namely pointers to the value list 110 in the table-format data record number order.

By combining the aforementioned array of pointers to the value list 120 and value list 110, given a certain record number, it is possible to get the field value number stored corresponding to that record number from the array of pointers to the value list 120 for a certain field, and then get the field value stored corresponding to that field value number within the value list 110, and thus obtain the field value from the record number. Accordingly, it is possible to refer to all data (field values) using the record number (row) and field (column) in the same manner as a conventional data table.

For example, consider the table-format data shown in FIG. 3A. In this example, various field values are given to the fields of Customer ID, Customer name and Telephone number. In this embodiment, such table-format data is stored as information blocks of the format indicated in FIGS. 3B through 3D. For example, in FIG. 3B, pointer array 120-1 is associated with value list 110-1 which contains the field values indicating the Customer ID. To wit, the pointer value of the pointer array for the first record (record number "0") is 0, and the corresponding field value of "1" indicating the Customer ID is obtained. In FIG. 3C, pointer array 120-2 is associated with value list 110-2 which contains the field values indicating the Customer name. For example, the pointer value of the pointer array for the first record (record number "0") is 5, and the corresponding field value of "Smith" indicating the Customer name is obtained. In FIG. 3D also, one can see that pointer array 120-3 is similarly associated with value list 110-3 which contains the field values indicating the Telephone number. In addition, one can also see that the field values are applied in sequential order (ascending order in this example) in each value list.

Moreover, in this embodiment, the value control table of information block 100 contains the value list 110 along with a category number flag array used for searches and tabulation, a start position array that indicates the starting address of the memory space to store pointers corresponding to the field values, and the count array. The various flags of the category number flag array and the counts of the count array are each associated to a field value. The flag values of the category number flag array are normally "0" but are set to "1" corresponding to field values to be found at the time of searching and tabulation. In addition, the count corresponds to the number of records that have that field value. Note that the start position corresponds to the one found by adding the count corresponding to the point value smaller than the corresponding pointer value, and need not necessarily be provided.

FIG. 4A is a diagram illustrating another example of table-format data, while FIGS. 4B and 4C are diagrams illustrating information blocks regarding "sex" and "age." As shown in FIG. 4B, the value control table 210-1 of the information block regarding sex 200-1 contains the field values corresponding to the various pointer values ("Male" and "Female") of pointer array 220 and category numbers, start positions and counts corresponding to the various field values. For example, the number of records in which the pointer value is "0" (namely, the field value in the value list is "Male") is 632564, and on the other hand, the number of records in which the pointer value is "1" (namely, the field value in the value list is "Female") is 367436. In addition, the start positions corresponding to the various field values indicate the starting address in the array of pointers to records 230-1 (to be described later). One can see that the same goes for FIG. 4C.

Figure 5:
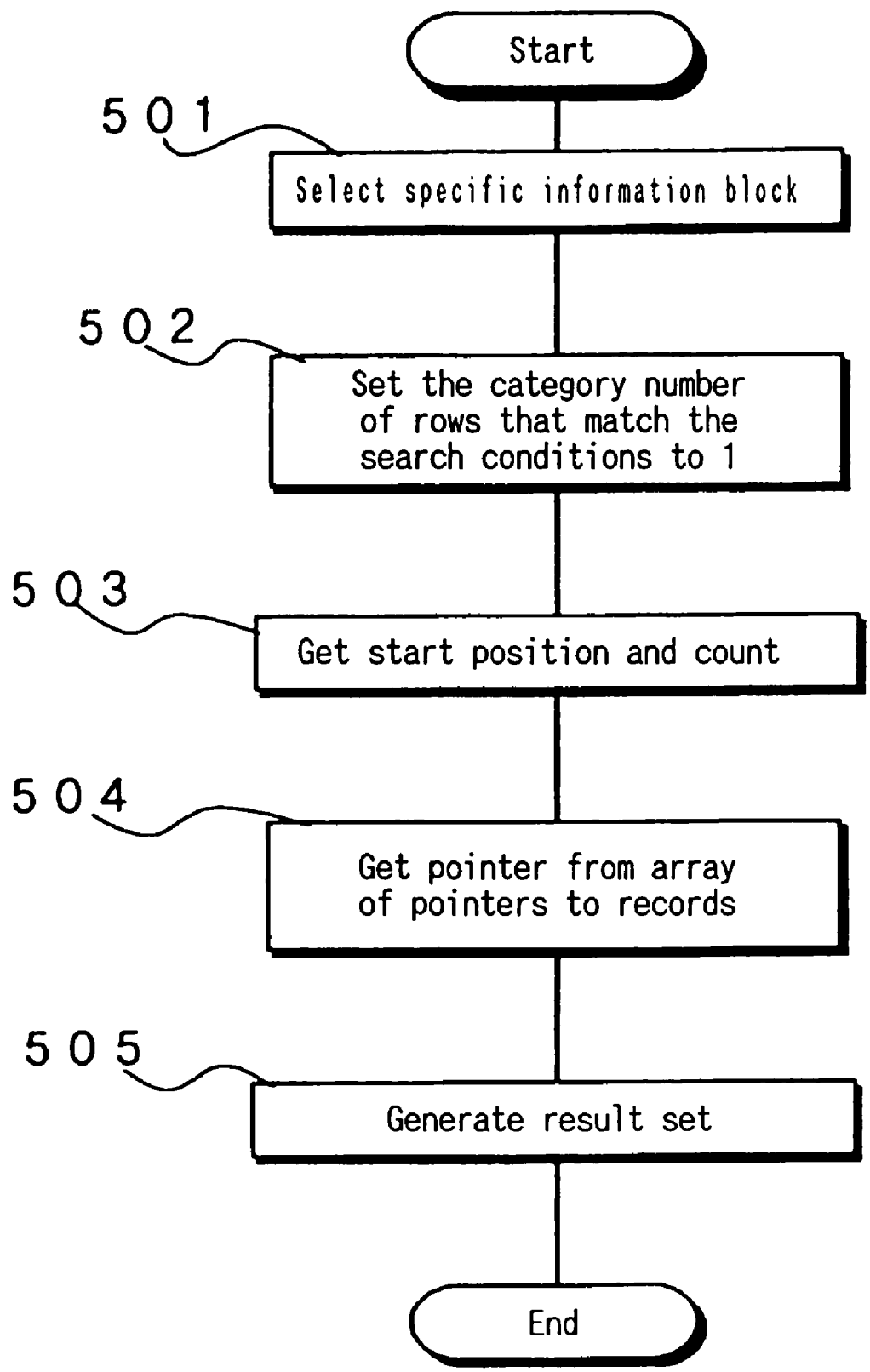
FIG. 5 is a flowchart showing the method of searching on a single field.

Here follows a description of one example of a search using an information block having such a data structure and the process of generating the information block. FIG. 5 is a flowchart showing the method of searching on a single field. This process is implemented by the CPU 12 (see FIG. 1) executing a stipulated search program. In this example, we shall search for records in which the value of the "age" field is 16 or 19. First, among the information blocks regarding table-format data, the information block regarding "age" 200-2 shown in FIG. 4C is specified (Step 501).

Next, in the value list 210-2 of the information block thus specified (hereinafter referred to as the "specified information block"), "1" is set as the category number of rows in which the field value matches the aforementioned search conditions (16 or 19) (Step 502). In the case of this example, "1" is set as the category number of rows corresponding to a field value number of "0" or a field value of "3." Next, the start position and count corresponding to rows in which the category number is set to "1" are obtained (Step 503). This information is called the pointer fetch information. In the array of pointers to records, based on the pointer fetch information obtained in Step 503, record numbers that indicate pointers to records that match the search conditions are obtained (Step 504). In this example, one can see that the record pointers corresponding to the field value number of "0" are stored in a region of the array of pointers to records from the start position of "0," or namely the beginning, to a position sufficient to contain 45898 pointers. On the other hand, the record pointers corresponding to the field value number of "3" are stored in a region of the array of pointers to records from the 2383137$^{th}$ pointer to a position sufficient to contain 189653 pointers. Finally, in order for it to be used in subsequent processing, an array of fetched record numbers is created as a result set and this is saved (Step 505).

In addition, tabulation and sorting can also be implemented by utilizing the category number, start position and count.

Figure 6:
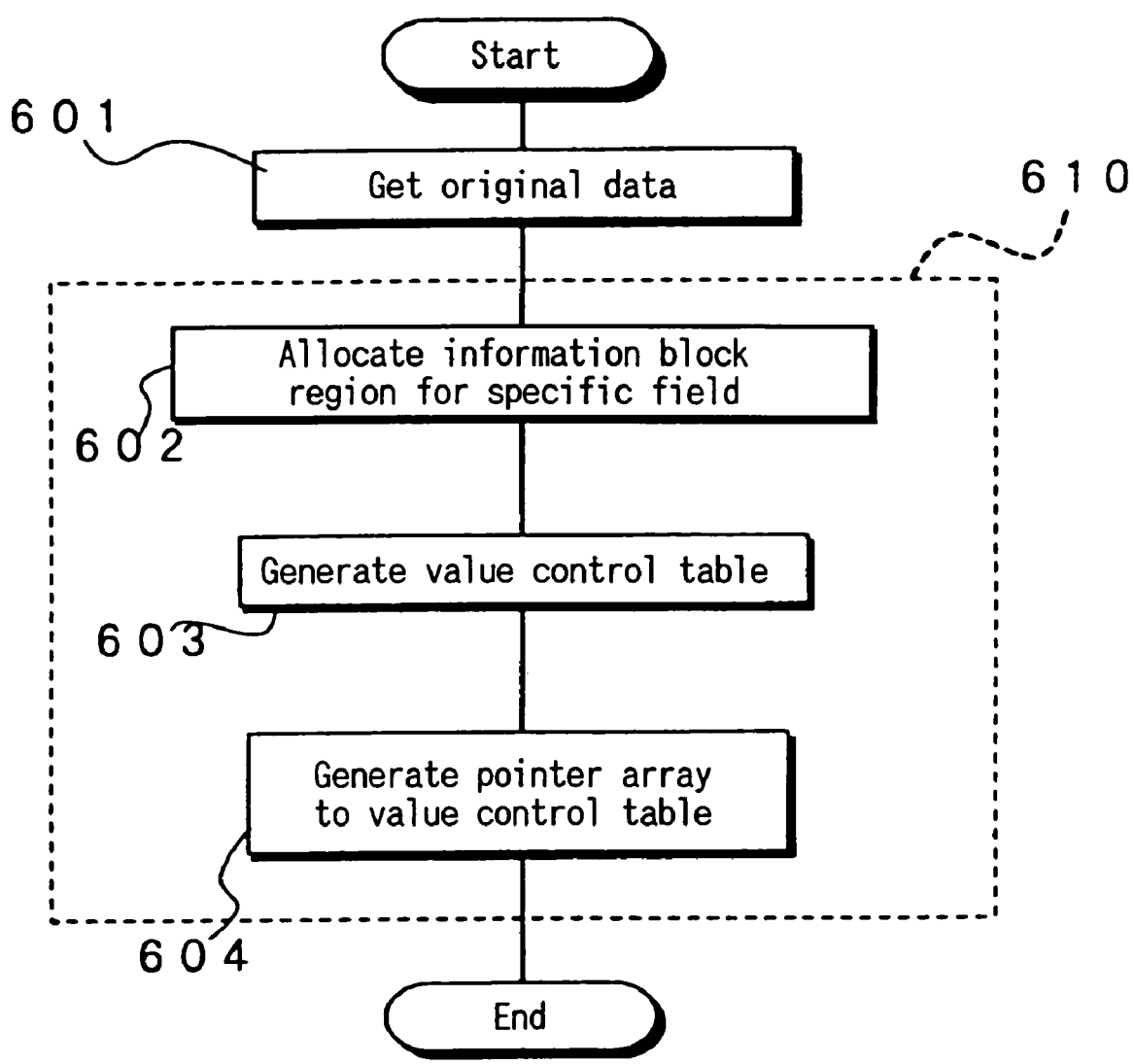
FIG. 6 is a flowchart used to describe the process of creating an information block based on table-format data.

Here follows a description of the process of generating the information blocks used for the aforementioned search processes and the like. FIG. 6 is a flowchart used to describe the process of creating an information block based on table-format data. First, the system 10 gets table-format original data and categorizes this by field (Step 601). This original data may be that as shown in FIG. 7A or that as shown in FIG. 7B. These original data may be supplied from outside or may be stored in the external storage medium 18. A processing block 610 consisting of Step 602 through Step 604, to be described later, generates an information block regarding a single field. Accordingly, when generating information blocks regarding a plurality of fields, the processing corresponding to processing block 610 is executed the same number of times as the number of fields. Here follows a description of the generation of the information block regarding "sex" as an example.

First a region is allocated in RAM 14 for the information block regarding the "sex" field (Step 602). Next, a value control table is generated in this allocated region. To be more specific, the value control table is initialized. Next, within the original data, all data regarding "sex" is operated upon from the start to end to find how many instances of which field names are present. In this example, the field names "Female" and "Male" were found 367436 and 632564 times, respectively. Thus the field values of "Female" and "Male" are set in the value list and the appropriate numbers were also set in the Count column. Thereafter, the field values are sorted according to the appropriate standard. At the time of sorting, the counts are also reordered as the field numbers are reordered. Next, the values of the Start position column are determined. These are found by taking the sum of the Counts in the positions higher than that row in the sort. In addition, the value of the Start position column is assigned to the value of the corresponding Category number column. This value is used in the next step. After the value control table is generated in this manner, the array of pointers to records is generated. The size of the region for this pointer array corresponds to the overall total of the counts.

In this manner, it is possible to create an information block for the appropriate field. By performing this generation of information blocks in advance, the information blocks thus generated are used to perform the processes of searching, tabulation and sorting.

Next, we shall describe the process of inserting, deleting or updating elements in an information block of the aforementioned form.

Figure 8A:
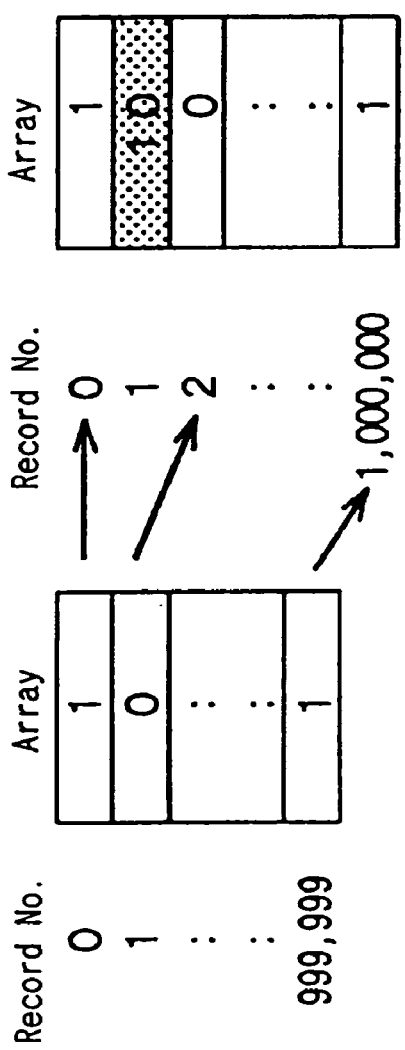
FIGS. 8A and 8B are diagrams showing an example of inserting elements into an array and an example of updating the elements of an array, respectively.
Figure 8B:
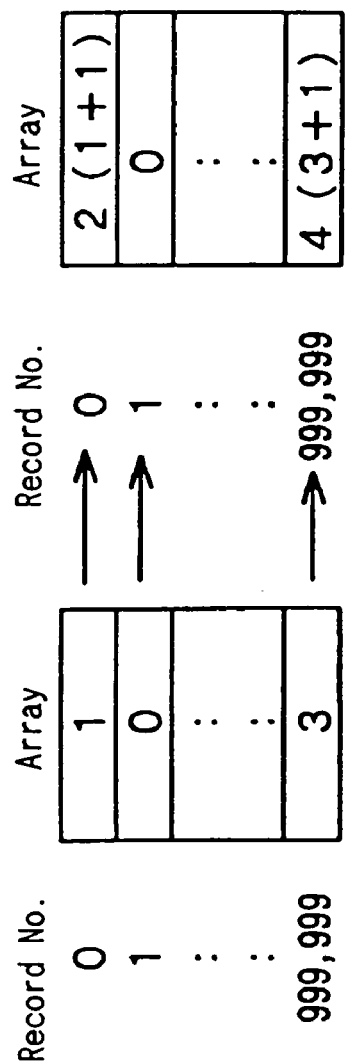

For example, consider the case of inserting one element in a position second from the start of an array of a size of 1 million records (record numbers 0–999,999). For example, there is the case of inserting one new element between record numbers "0" and "1" among the array corresponding to the record numbers 0–999,999 (see FIG. 8A). In this case, a new value (e.g. "10") is inserted in the new record number "1" and the remaining values (namely, a total of 999,999 values) must each be moved one down. In addition, in the case of deleting a specific element also, it is necessary to move a huge number of elements. Alternately, in the case of rewriting elements in the aforementioned array that have a specific value, for example, incrementing those that have a value of I or greater (see FIG. 8B), it is necessary to scan the entire array so processing takes a huge amount of time.

In passing, the aforementioned array has an advantage in that a subscript indicates the position within the array, so it is possible to extract the value stored in the corresponding position (namely, reference the value stored from the subscript). To wit, if the various elements (stored values) are stored in address order in memory, then the address can be calculated immediately from the subscript and obtain the expanded value of the corresponding address. To this end, a technique that minimizes the load required for insertion and deletion of elements (stored values) while still maintaining this advantage is desirable.

Figure 9A:
FIGS. 9A through 9D are diagrams used to describe the subscripts, arrays and values from arrays, and an overview of subscript conversion and value conversion according to the present invention, respectively.
Figure 9B:
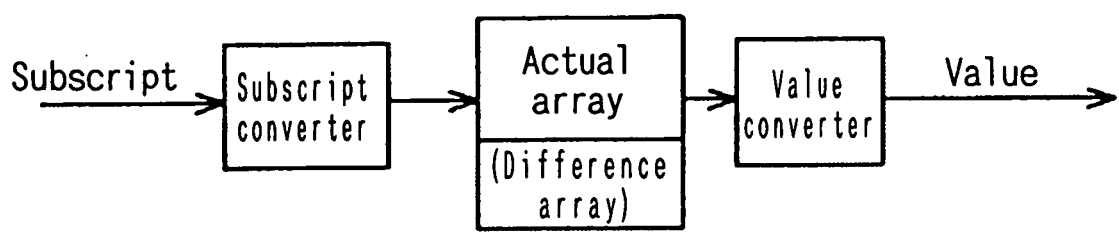
Figure 9C:
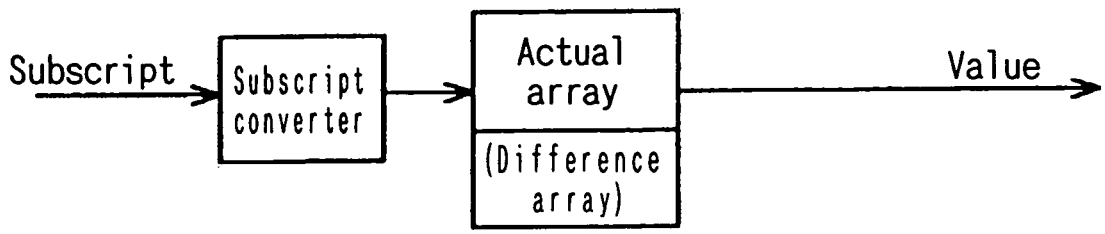
Figure 9D:
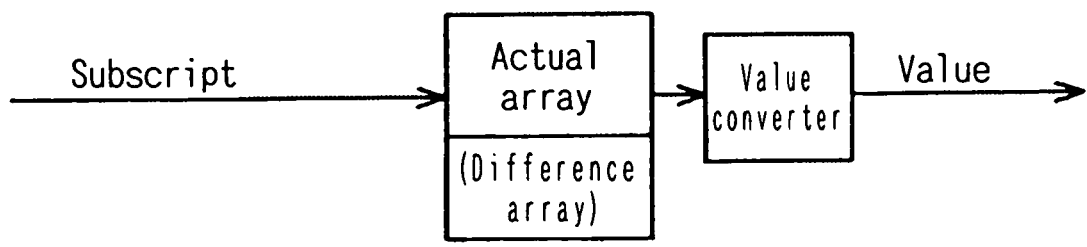

According to the present invention, as shown in FIG. 9A, in a system wherein a subscript is given to an array to fetch the corresponding value (stored value), as shown in FIGS. 9B through 9D, by providing a subscript converter that converts the "subscript" given to the array and/or a value converter that converts the value fetched from the array, and also dividing the array itself into an actual array and difference array, it is possible to perform the insertion, deletion and updating of elements without changing the positions of elements (stored values) contained within the array, and without changing the values themselves.

[Insertion of Elements by Means of a Subscript Conversion Array]

First, we shall describe a subscript conversion array for the insertion of elements, etc. which is used in Embodiment 1 of the present invention. Considering the information block shown in FIGS. 2–4, subscripts may include the record number for specifying elements of the array of pointers to the value list (pointer values), or pointer values within the pointer array for specifying field values of the value list. In addition, the arrays may include arrays of pointers to value lists, value lists, and arrays of pointers to record numbers or the like.

For example, as shown in FIG. 10A, consider the case of inserting the element "$Y_0$" between the $0^{th}$ row (subscript "0") and the $1^{st}$ row (subscript "1"). In this case, after the insertion of the element "$Y_0$," the subscripts and the elements within the array (stored values) have the logical relationship shown in FIG. 10B.

In order to maintain the logical relationship shown in FIG. 10B while minimize the load arising from insertion, consider the subscript conversion array shown in FIG. 10C. In FIG. 10C, the subscript conversion array consists of a starting position array, ending position array and offset array. Among the elements (values) contained within these arrays, those at the same position (e.g., the $0^{th}$ row, $1^{st}$ row, etc.) are associated to each other. The range of subscripts to be associated is defined by the elements within the starting position array and the corresponding elements within the ending position array. To wit, the elements within the starting position array indicate the minimum values of the subscripts to be associated, while the elements within the ending position array indicate the maximum values of the subscripts to be associated. On the other hand, the corresponding elements within the offset array indicate the offset values for obtaining the converted subscript which is added to or subtracted from the subscript to specify the real actual array. Note that in this Specification, a set of corresponding elements within the starting position array, ending position array and offset array (namely, a set of elements positioned on the same rows) is called a "structure array" depending on the case, and the elements within the various arrays are called "structure members."

Here follows a description of the meaning of this subscript conversion array. As described above, the structure members within the structure array determine the range of subscripts and the offset values of subscripts included within this range. Thus, for a certain subscript, by identifying a structure array to be associated to that subscript and adding an offset value, it is possible to obtain converted subscripts, and these can be used to identify the position of arrays (actual arrays) and look up elements (stored values) within the array.

For example, in FIG. 10C, one can see that the subscript "0" is associated with the structure array of row 0 (the first row). In this structure array, the member value (offset value) within the offset array is "0" so the converted subscript is "0+0"=0. Accordingly, one can see that the element within the actual array corresponding to the original subscript of "0" is stored at the position "0." In addition, the subscript "1" is associated with the structure array of row 1 (the second row), and the member value (offset value) within the offset array is "n−1" so the converted subscript is "1+(n−1) =n." Accordingly, one can see that the element within the actual array corresponding to the original subscript of "0" is stored at the position "0." For the subscripts "2" through "n" also, it is clear that the position at which the corresponding element is stored can be identified in the same manner.

Figure 11:
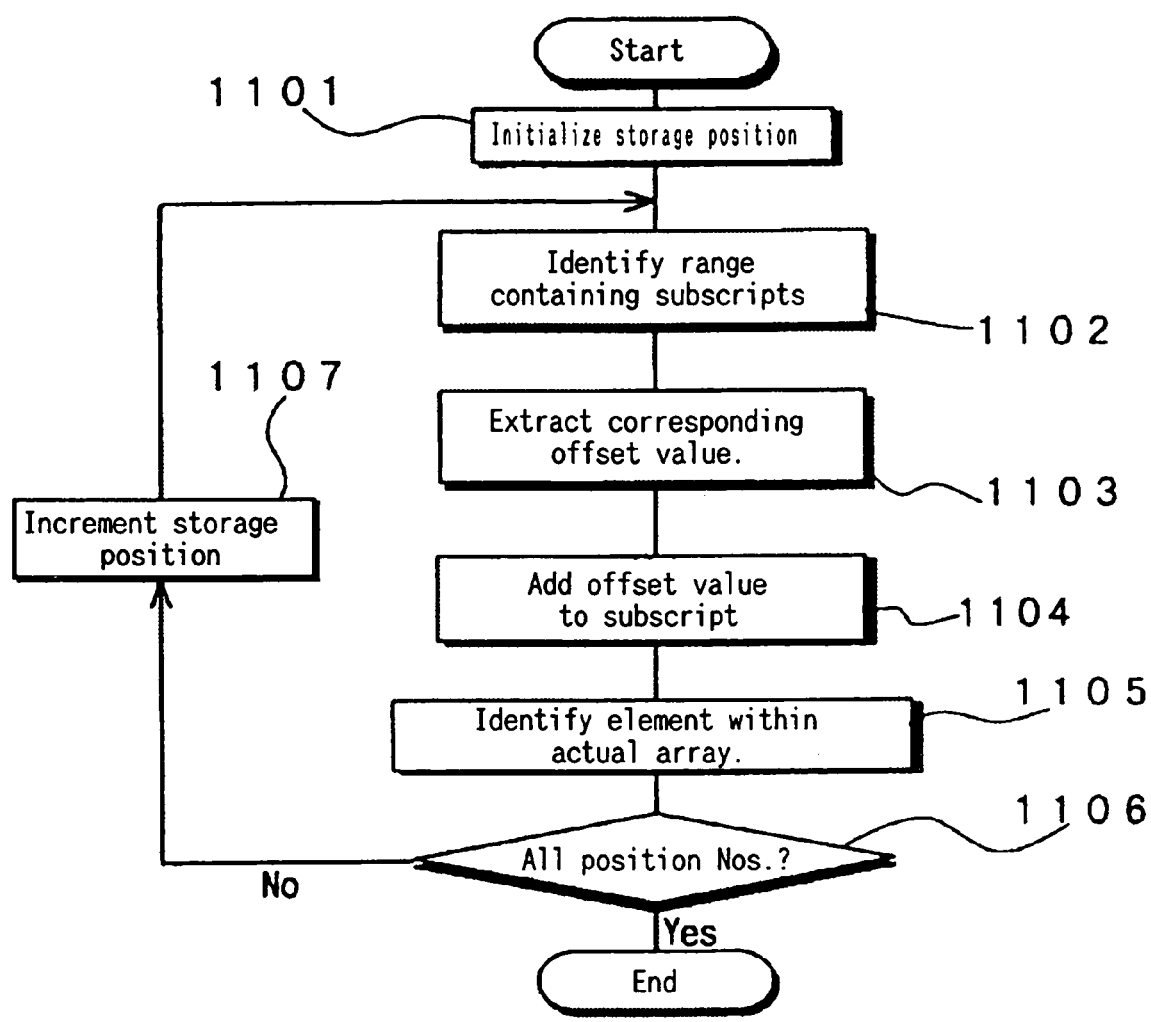
FIG. 11 is a flowchart illustrating the process of specifying an element within an array from the subscript according to Embodiment 1.

More specifically, we shall describe the aforementioned procedure with reference to the flowchart of FIG. 11. First, a number that indicates the position of the subscript (the storage position number) is initialized (Step 1101), and next, the elements of the starting array and ending array are looked up and the range containing the subscript is identified from among the ranges which are demarcated by values of the starting position array and ending position array (Step 1102). To wit, this step identifies the structure array to which the subscript is associated. For example, in the example of FIG. 10C, one can see that the subscript "0" is contained within the range identified by the element "0" within the starting array and the element "0" within the ending array. Also, one sees that the subscript "1" is contained within the range identified by the element "1" within the starting array and the element "1" within the ending array.

Next, based on this range, the corresponding offset value is fetched (Step 1103), and the value found by adding the offset value to the subscript is obtained (Step 1104). This value to which the offset is added becomes the converted subscript, so this value is used to identify an element within the actual array (Step 1105). With regard to subscript "1" for example, this subscript is contained within the range corresponding to row 1 (the second row), so the offset value of row 1 which is "n−1" is added to the subscript "1." Accordingly, the converted subscript becomes "n" so it is possible to obtain "$Y_0$" as the corresponding element (stored value) within the actual array. Also, with regard to subscript "2," this subscript is contained within the range corresponding to row 2 (the third row), so the offset value of row 2 which is "−1" is added to the subscript "2." Accordingly, the converted subscript becomes "1" so it is possible to obtain "$X_1$" as the corresponding element (stored value) within the actual array.

By repeating the process of Steps 1102 through 1105 for the required subscripts (see Steps 1106 and 1107), it is possible to maintain the logical relationship shown in FIG. 10B while obtaining the elements (stored values) within the actual array. Accordingly, with the present invention, at the time of insertion of elements (stored values) within an array, by generating a conversion array as described above, it is possible to achieve the insertion of elements without moving the elements themselves within the arrays, and arrange the elements to be inserted at a stipulated position in the actual array (e.g., a position corresponding to the maximum value of the address) without causing excessive loads.

[Generation of a Subscript Conversion Array for Insertion of Elements]

Figure 12:
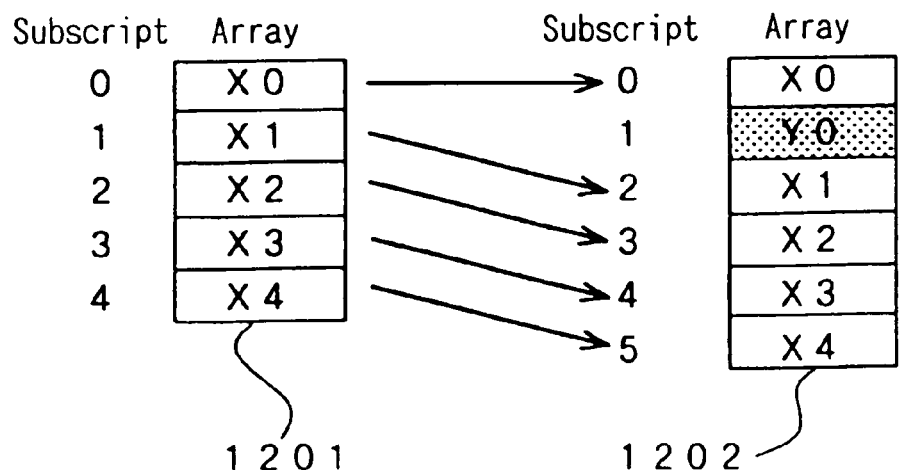
FIG. 12 is a diagram used to explain the insertion of a certain element to a specified position.
Figure 13:
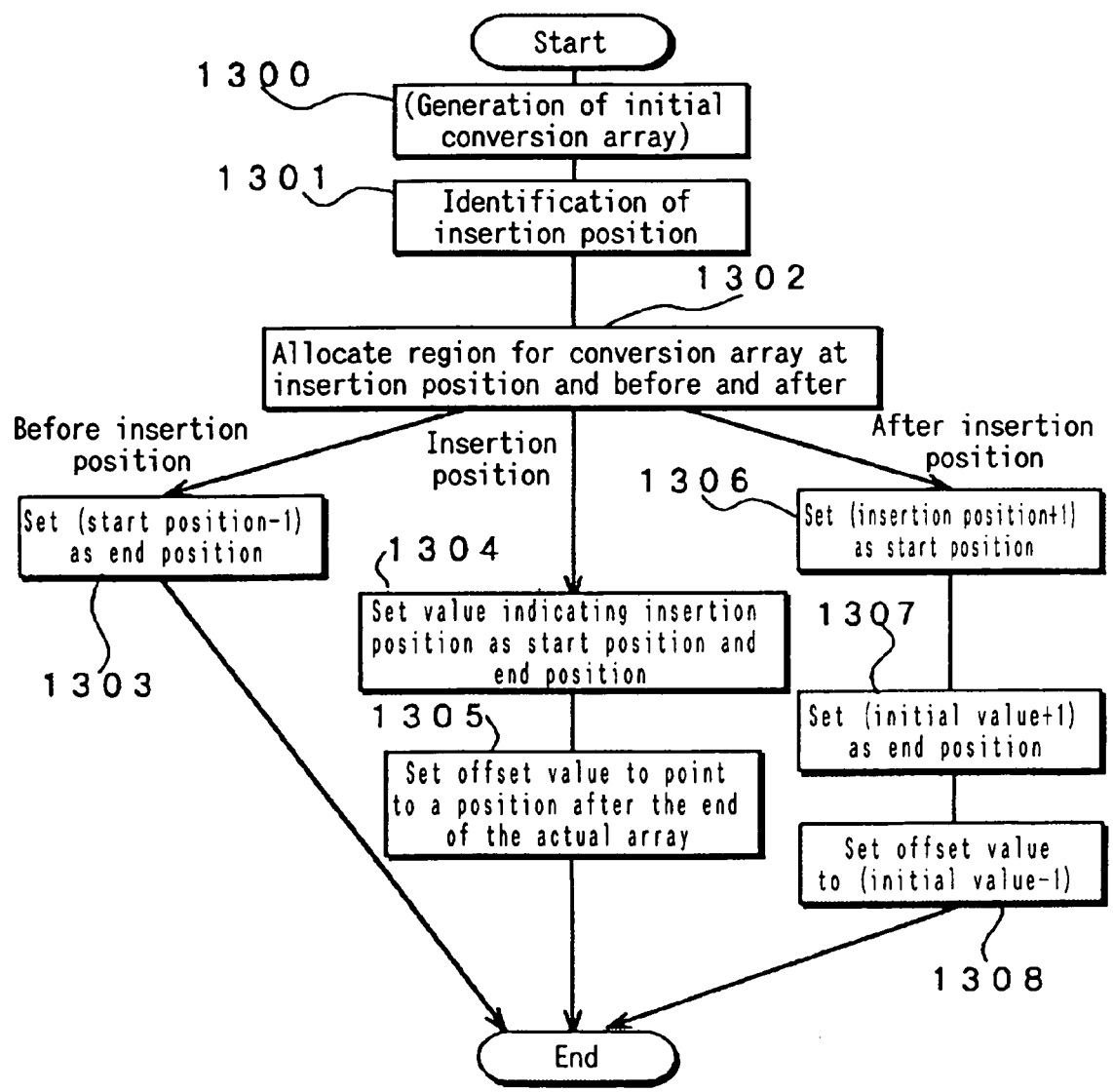
FIG. 13 is a flowchart illustrating the process of generating a subscript conversion array for inserting elements in this embodiment.

Next, we shall describe the procedure for creating the aforementioned subscript conversion array according to Embodiment 1. For example, as shown in FIG. 12, consider an array of 5 elements (symbol 1201), and consider the case of inserting a new element (stored value) "$Y_0$" between row 0 (the first row) and row 1 (the second row) (see symbol 1202). FIG. 13 is a flowchart used to describe the process of generating a conversion array for inserting new elements (stored values) in the array. This process is executed by the CPU 12 in FIG. 1. First, an initialized subscript conversion array is generated (Step 1300). More specifically, the number of elements in the array is examined and the start position and end position are determined. For example, in the example shown in FIG. 12, the number of elements is "5" so in the initial subscript conversion array the start position is "0" and the end position is "4." In addition, in this example, the elements in the array are referenced directly from the substrate, so the initial offset value is "0" (see symbol 1401 of FIG. 14). Note that in the case in which a substrate conversion array had been generated in advance, namely the case in which one or more insertions had already been performed, or in the case in which an initial subscript conversion array is generated at the time of generation of the information block, Step 1300 is omitted.

Next, the position of the element to be inserted is identified (Step 1301), and area is allocated for the insertion position and the subscript conversion array regarding elements before the insertion position and elements after the insertion position. In the example of symbol 1401 of FIG. 14, the various arrays contained within the initial subscript conversion array contain only one element each, but in the processing of Step 1301, area is allocated for an array having three elements (an element for before the insertion position, an element for the insertion position, and an element for after the insertion position) (Step 1302). Note that if an array having a plurality of elements is already provided, an area is allocated for an array in which the number of elements can be increased by 2.

Thereafter, regarding elements before the insertion position, the values of the elements of each array are determined (Step 1303). More specifically, the element value corresponding to the start position array and the element value corresponding to the offset array are not changed, but the "value corresponding to the insertion position−1" is given as the element value of the end position array. In addition, regarding the insertion position also, the values of corresponding elements in each array are determined (Steps 1305 and 1304). In this case, the "value corresponding to the insertion position" is given as the element values of the start position array and end position array, and the "value corresponding to the position of the end of the actual array" is given as the element value of the offset array. Note that as described later, if the element to be inserted is to be set at a different position, the value corresponding to the position where the element to be inserted may be given as the offset value.

In addition, regarding elements after the insertion position also, the element values of the various arrays are determined by the following technique. To wit, "value corresponding to the insertion position+1" is given as the element value corresponding to the start position array (Step 1306), and the initial "value corresponding to the end position+1" is given as the element value corresponding to the end position array (Step 1307). Next, the element value corresponding to the offset array is set in "its initial value (original value)−1" (Step 1308).

Figure 14:
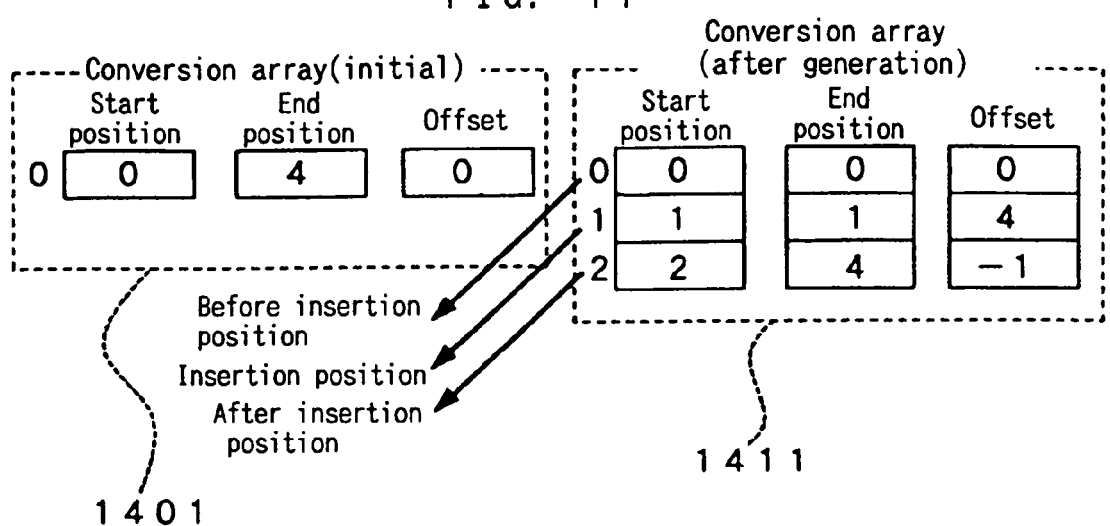
FIG. 14 is a diagram illustrating one example of the subscript conversion array generated by means of the process of FIG. 13.

For example, in the case in which there are a subscript and array as indicated by symbol 1201 of FIG. 12, and the initial subscript conversion array indicated by symbol 1401 of FIG. 14 is generated, one can understand that the subscript conversion array indicated by symbol 1411 is generated by the process of the aforementioned Step 1301 and Step 1307.

After such a subscript conversion array is generated, the CPU 12 stores the element to be inserted at a stipulated position after the end of the actual array set in Step 1304. Thereby, an element can be effectively (logically) inserted at the desired position in the actual array without moving the elements (stored values) of the actual array.

[Deletion of Elements by Means of a Subscript Conversion Array]

Next, we shall describe the method of deleting elements using the aforementioned subscript conversion array. For example, as shown in FIG. 15A, consider the case of deleting the elements of row 1 (the second row) of the array. In this case, after the deletion, the subscripts and the elements within the array (stored values) have the logical relationship shown in FIG. 15B. In the same manner as during insertion, in order to maintain the logical relationship shown in FIG. 15B while minimize the load arising from deletion, consider the subscript conversion array shown in FIG. 15C. In FIG. 15C also, in the same manner as in FIG. 10C, the subscript conversion array defines the range of subscripts and offset values so that the converted subscript may be found. More specifically, for each subscript, one can see that the elements (stored values) within the actual array are identified by performing the process of FIG. 11. For example, one can see that the subscript "1" is associated with the structure array of row 1 (the second row), and the member value (offset value) within the offset array related to this structure array is "1" so the converted subscript is "1+1=2." Accordingly, one can see that the corresponding element is stored at the position corresponding to "2" in the actual array.

[Generation of a Subscript Conversion Array for Deletion of Elements]

For example, as shown in FIG. 16A, consider an array of 5 elements (symbol 1601), and among these consider the case of deleting the element (stored value) $X_0$ in row 1 (the second row) (see symbol 1602). Note that in this example, the actual array is assumed to be the same as array 1601.

Figure 17:
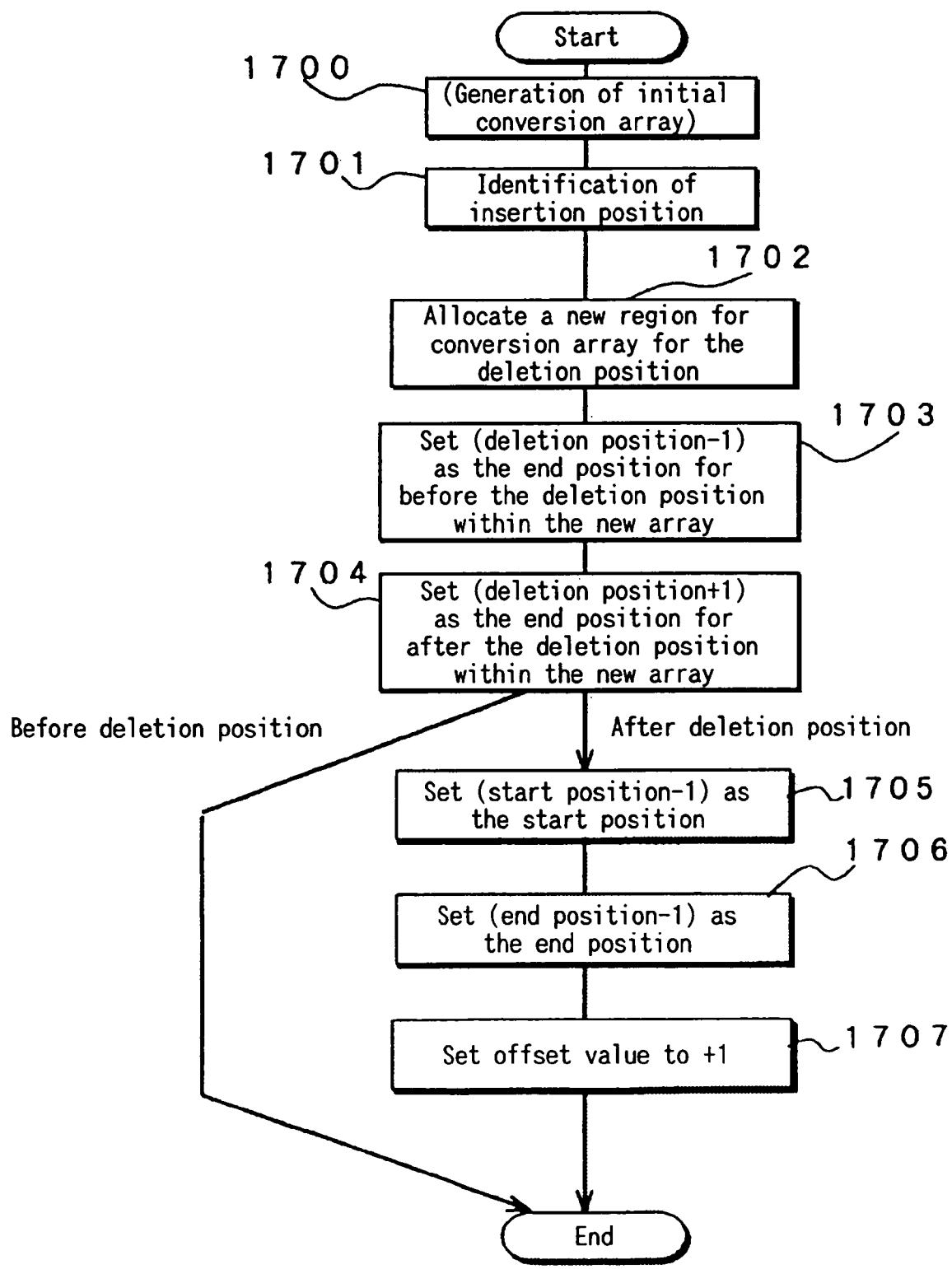
FIG. 17 is a flowchart illustrating the process of generating a subscript conversion array for deleting elements in this embodiment.

FIG. 17 is a flowchart used to describe the process of generating a conversion array for deleting elements (stored values) from the array, while FIG. 18A is a diagram that shows how the values within the conversion array change with processing.

The process of FIG. 17 is also executed by the CPU 12 in FIG. 1. First, if no subscript conversion array has been generated, an initialized subscript conversion array is generated (Step 1700). For example, in the example shown in FIG. 16A, the start position array, end position array and offset array are generated such that the number of elements is "5" so the value indicating the start position is "0," the value indicating the end position is "4," and the offset value is "0" (see symbol 1801 of FIG. 18A).

Next, the position of the element to be deleted is identified (Step 1701), and area is allocated for the subscript conversion array regarding elements before the deletion position (Step 1702). In the example shown in FIG. 18A, as shown by symbol 1802, area is obtained such that the various arrays of the subscript conversion array store elements for before the insertion position, the insertion position, and after the insertion position. In the new area, regarding elements before the deletion position, the "value indicating the deletion position−1" is set as the element of the end position array (Step 1703), while the "value indicating the deletion position+1" is set as the element of the start position array (Step 1704). In this manner, regarding the structure array within the conversion array containing the deletion position, the start position array, end position array and offset array are created as indicated by symbol 1802. Note that the structure array regarding the deletion position is not ultimately used, so while the deletion position itself must be calculated, there is no need to store elements within the array as shown in FIG. 18A.

Next, for the various arrays, regarding the element after the deletion position, the following operation is performed. First, the element of the start position array is set to the "original value−1" (Step 1705) and also the element of the end position array is set to the "original value−1" (Step 1706). In addition, the element of the offset array is set to the "original value+1" (Step 1707). For example, in the example of FIG. 18A, the element "2" within the start position array positioned after the deletion position is decremented, becoming "1" (see symbol 1804), the element "4" within the end position array is decremented, becoming "3" and the element "0" within the offset array is incremented, becoming "1." In this manner, it is possible to obtain a subscript conversion array for deleting elements within the array. Note that the actual array (the array that actually contains the elements identified by subscripts) is not changed even at the time of deletion of elements. To wit, the virtual (logical) deletion of elements within the array is performed only by the subscript conversion array. In addition, the deletion of elements within an array can be achieved by the process of FIG. 17 for the other example shown in FIG. 16B. In this example, the element "$Y_0$" is inserted into row 3 (the fourth row) of the array, and accordingly the actual array takes a form in which the element "$Y_0$" is added to the end (see symbol 1610 of the FIG. 16). In addition, at the time of the aforementioned insertion, the subscript conversion array indicated by symbol 1811 of FIG. 18B is generated. In this case, the generation of the initial conversion array indicated by Step 1700 is omitted. By performing the processing of Step 1701 through Step 1707 for the subscript conversion array indicated by symbol 1811 of FIG. 18B, one can see that the subscript conversion array indicated by symbol 1813 can be obtained. In addition, one can see that by using such a subscript conversion array, it is possible to use the subscripts obtained via the conversion array from subscripts (converted subscripts) to give the logical relationship indicated by symbol 1612 of FIG. 16 without changing the actual array (symbol 1610 of FIG. 16).

[Combination of Insertion and Deletion of Elements]

Figure 19:
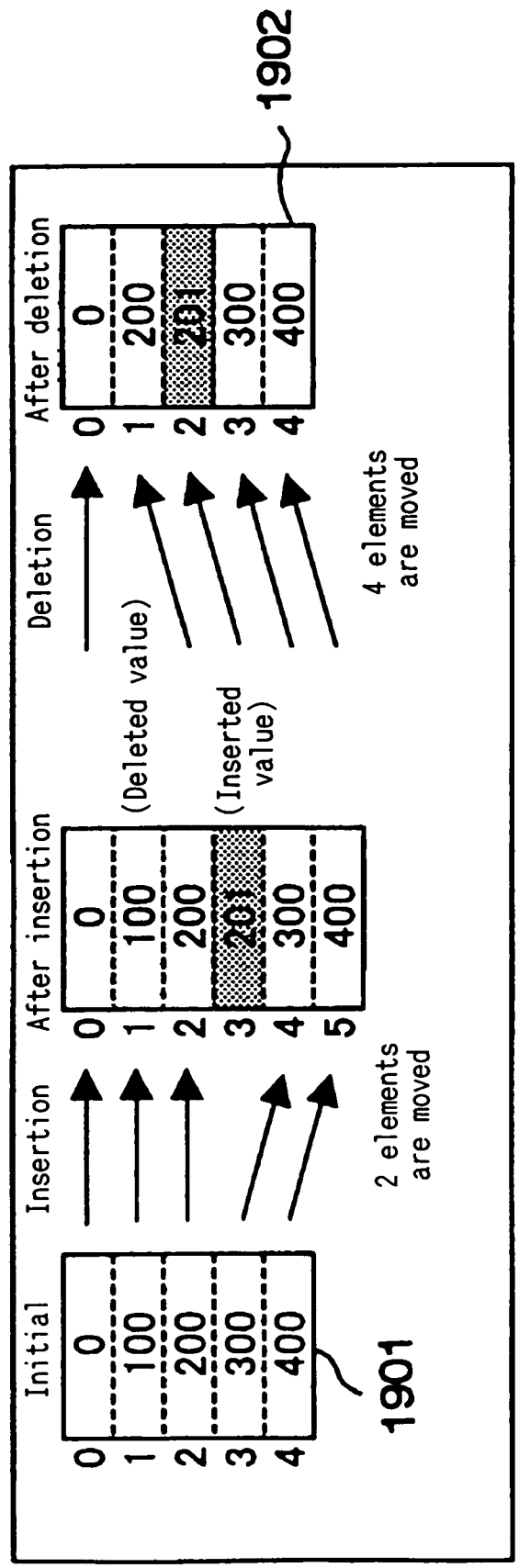
FIG. 19 is a diagram used to describe the state in the case that insertion and deletion are performed sequentially in Embodiment 1.

The insertion and deletion of elements within an array can be achieved by sequentially performing the aforementioned insertion illustrated in FIG. 13 and deletion illustrated in FIG. 17. Naturally, it need not be said that the order of the aforementioned processing may also be reversed. For example, consider array 1901 wherein the elements "0," "100," "200," "300" and "400" are initially defined for the subscripts "0" through "4," respectively, as shown in FIG. 19. Consider the case of inserting the element "201" between row 2 (the third row) and row 3 (the fourth row) of this array and also deleting the elements of row 1 (the second row), to obtain the array indicated by the symbol 1902.

Figure 20:
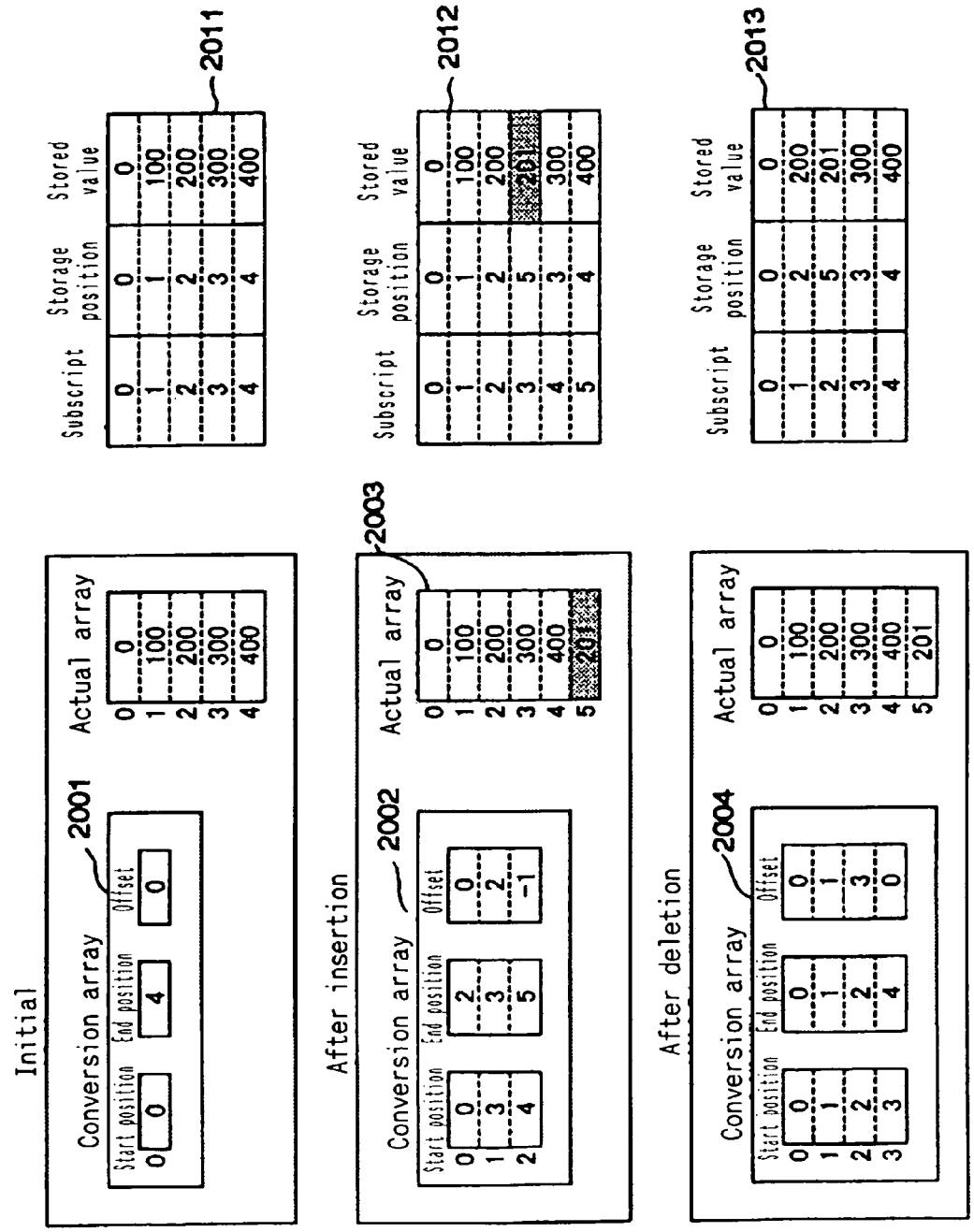
FIG. 20 is a diagram used to describe the state in the case that insertion and deletion are performed sequentially in Embodiment 1.

In this Embodiment, as shown in FIG. 20, first an initial conversion array is created (see symbol 2001), and then a conversion array for insertion (see symbol 2002 of FIG. 20) is created by the process shown in FIG. 13, and also the element to be inserted ("201" in this case) is placed at the end of the actual array (see symbol 2003). Next, a conversion array for deletion (see symbol 2004 of FIG. 20) is created by the process shown in FIG. 17. Thus, the insertion and deletion of elements is implemented by this process.

Note that one can see that the updating of elements can be achieved by sequentially performing the process of deleting an element and inserting a new element at the position of this deleted element. In the table at the right side of FIG. 20 (symbols 2011–2013), the storage positions are the subscripts obtained via the subscript conversion array and the storage positions indicate the virtual (logical) actual array. Initially, the subscripts were identical to the storage positions (see symbol 2011), but through insertion and deletion, the subscript conversion arrays are created or updated, so one can see that the elements are inserted to and deleted from the virtual actual array as desired (see symbols 2012 and 2013).

[Other Examples of Subscript Conversion Arrays]

Here follows a description of an example of reducing the size of the subscript conversion array as Embodiment 2. In the aforementioned Embodiment 1, the start position array and end position array are used to determine the range that contains the subscript or the positions of the elements to be deleted or inserted. However, if the value of an element at a certain element of the end position array is "n," the value of the element of the start position array positioned on the next row is clearly "n+1" and vice versa. Thus, in Embodiment 2, the subscript conversion array consists of only a start position array and offset array or end position array and offset array, so the size of memory required for the subscript conversion array is reduced.

Figure 21A:
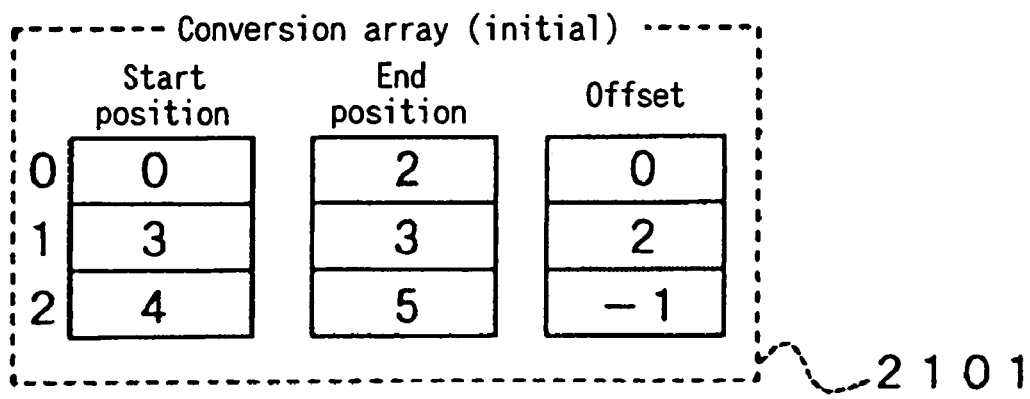
FIGS. 21A through 21C are diagrams used to describe the structure of the conversion array according to Embodiment 2 of the present invention.
Figure 21B:
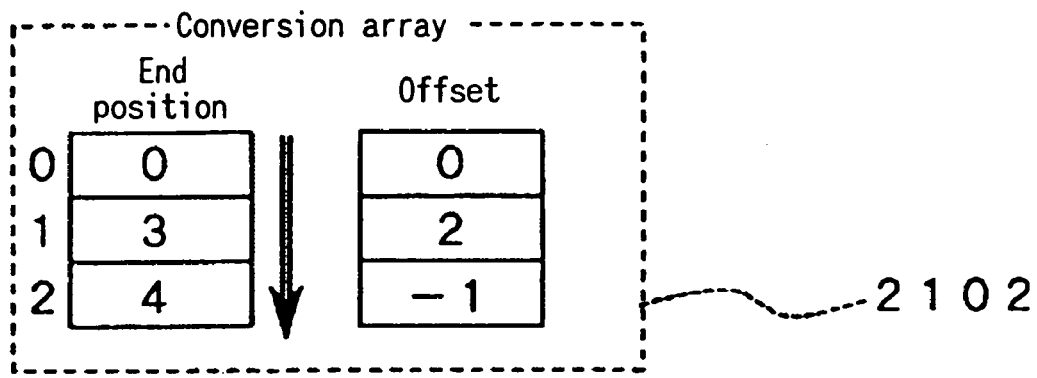

For example, the subscript conversion array 2101 shown in FIG. 21A may also be represented as shown in FIG. 21B. In FIG. 21B, the subscript "i" in the range 0<=i<=(3−1) corresponds to row 0 (the first row), so the offset value of such a subscript becomes "0." In addition, the subscript "i" in the range 3<=i<=(4−1) corresponds to row 1 (the second row), so the subscript "i" where 4<=i corresponds to row 2 (the third row).

Figure 21C:
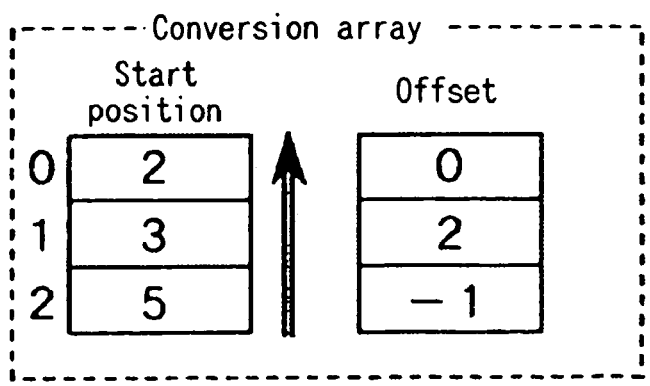

Alternately, it is clear that the subscript conversion array shown in FIG. 21C may also be used. In this case, the subscript "i" in the range 5>=i>=(3+1) corresponds to row 2 (the third row), so the subscript "i" in the range 3>=i>= (2+1) corresponds to row 1 (the second row), and the subscript "i" where 2>=i corresponds to row 0 (the first row).

Note that if a subscript conversion array as shown in FIG. 21B is used, it is possible to determine the total number of subscripts and thus one can determine the size of the array, so it is more preferable to use this subscript conversion array.

[Actual Arrays and Difference Arrays]

In the aforementioned Embodiment 1, when an element is to be inserted into an array, the element to be inserted is placed at the end of the array (e.g., see FIG. 10C). However, it is clear that the element to be inserted can be placed at the desired position by setting the corresponding offset value within the offset array. In Embodiment 3, this inserted element is placed in an arbitrary editing work area. Such a work area used for editing into which elements to be inserted are placed is called a "difference array."

Figure 22:
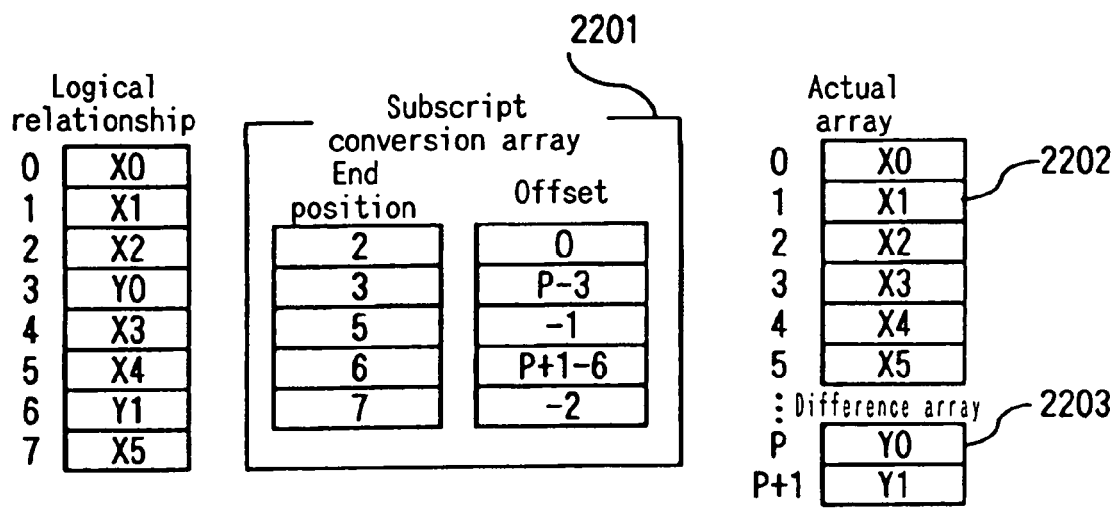
FIG. 22 is a diagram used to describe the actual array and difference array according to Embodiment 3 of the present invention.

FIG. 22 is a diagram showing one example of the subscript conversion array, actual array and difference array. As shown in FIG. 22, in this example, from the subscript conversion array 2201, the inserted elements "$Y_0$" and "$Y_1$" are placed within the difference array 2203 allocated in an area separate from the actual array 2202. After the subscript conversion array is created (see FIG. 13), this can be done by creating a difference array in the area according to the offset values of the elements to be inserted and placing the aforementioned elements in said difference array.

[Value Conversion Array]

Here follows a description of a value conversion array according to Embodiment 4 of the present invention. Regarding the array, it is necessary to perform the aforementioned insertion and deletion of elements and also change (update) the elements (stored values) of the array themselves. In this embodiment, the value conversion array described below is used for the updating of elements of the array.

Figure 23A:
FIGS. 23A and 23B are diagrams used to describe an overview of a value conversion array according to Embodiment 4 of the present invention.

For example, as shown in FIG. 23A, consider the case in which it is necessary to increment those records within a certain array (record number list) that have a value of 1 or greater. With the conventional technique, it is necessary to perform the process of determining whether or not the elements (stored values) within an array are 1 or greater, and incrementing the element (stored value) it is 1 or greater, for every element in the array. In contrast, Embodiment 4 of the present invention uses a technique whereby a value conversion array is placed in the last stage (downstream side) of the array, and the values output from the array are passed through the value conversion array to provide output of the converted values, and the updating of elements (stored values) is implemented in this converted output.

Figure 23B:
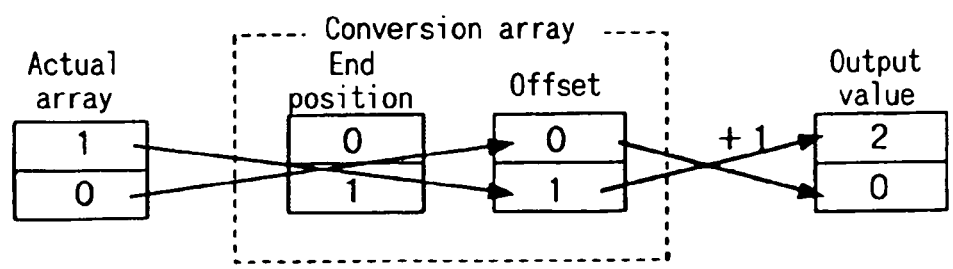

In a case such as that shown in FIG. 23A, a value conversion array such as that shown in FIG. 23B is provided. In this embodiment, in the same manner as in Embodiment 2, the value conversion array consists of an end position array and offset array. Naturally, the value conversion array may also consist of an end position array and offset array as in Embodiment 1.

Figure 24:
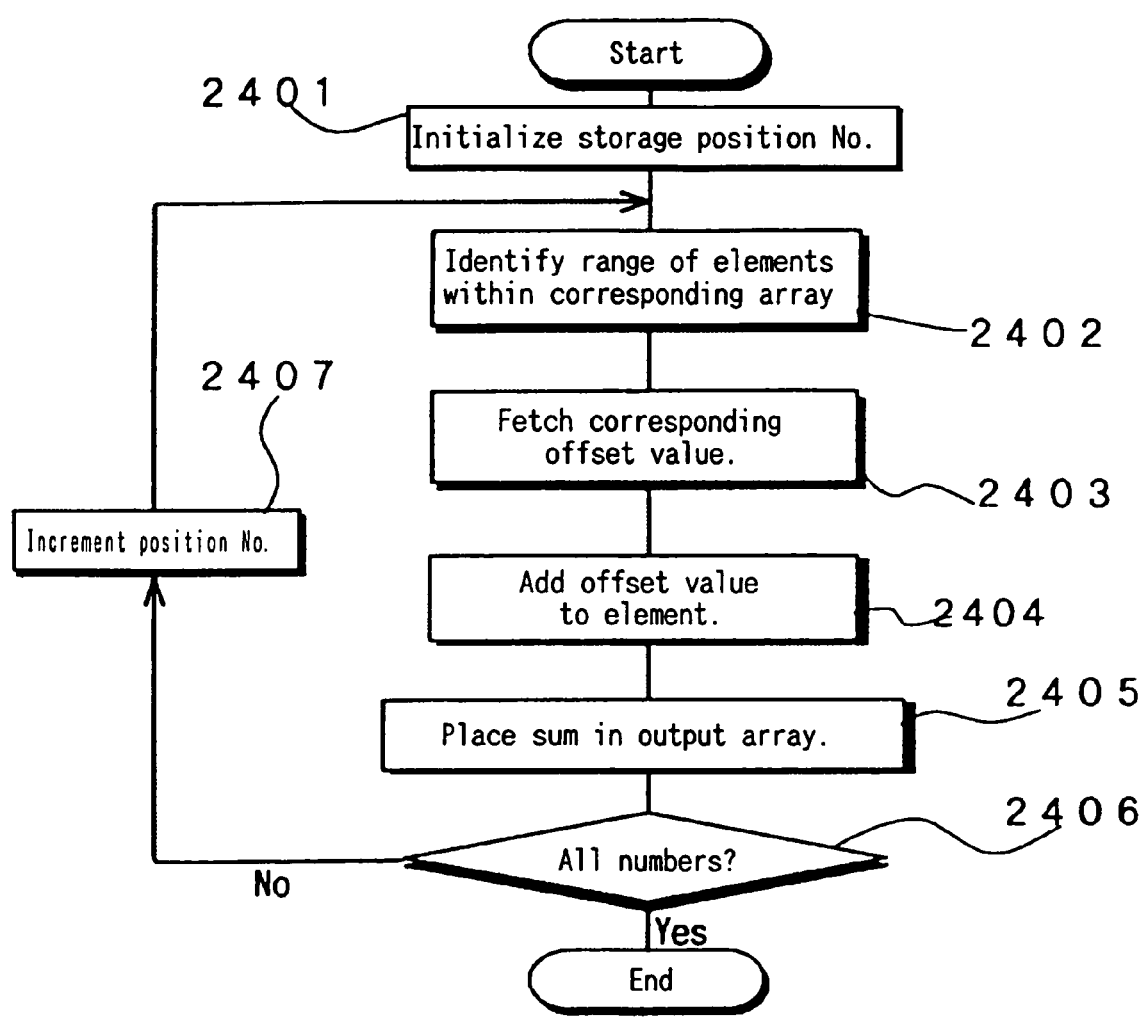
FIG. 24 is a flowchart illustrating the process of value conversion according to Embodiment 4 of the present invention.

Among the elements (values) stored within these arrays, those placed in the same positions (e.g., row 0, row 1) are associated to each other. Accordingly, the structure array consists of elements placed in corresponding positions. In this embodiment, it is possible to determine based on the value of the end position array which structure array is associated to the positions at which the elements (stored values) within the actual array are placed, and the offset for the value may be determined based thereupon. Here follows a detailed description of the processing of the aforementioned example (the example of incrementing one or more elements) using FIG. 24. This process is also executed by the CPU shown in FIG. 1 in the same manner as in the embodiments described above.

First, a number that indicates the storage position of the element (storage position number) is initialized (Step 2401) and then the element (stored value) within the array identified by this storage position number is examined to determine which of the ranges demarcated by the end position array it is included within (Step 2402). This step determines to which of the structure arrays the element is associated. In the example of FIG. 23B, the element with a storage position number of "0" (namely, that of row 0 (the first row)) is "1" so this element is included in the range defined by the value of row 1 (the second row) within the end position array (namely, 1<=element of array<=1), so one can see that the element in question is associated with the structure array of row 1 (the second row).

Next, the offset value within the offset array to which this structure array belongs is fetched (Step 2403), and the value found by adding the offset value to the element is output (Step 2404). In this manner, the value found by way of the value conversion array may be stored in an area corresponding to the storage position number of the output value array (Step 2405). It need not be said that the value found by way of the value conversion array may also be directly utilized by another process. Regarding elements in which the aforementioned storage position number is "0," the corresponding offset value is "1" so "1+1=2" is output as the element (stored value) after the conversion array.

By repeating the processes of Steps 2402 through 2405 for the required values in the actual array, it is possible to maintain the logical relationship as shown in FIG. 23A while updating the elements without changing the elements themselves of the actual array.

[Generation of the Value Conversion Array]

Figure 25:
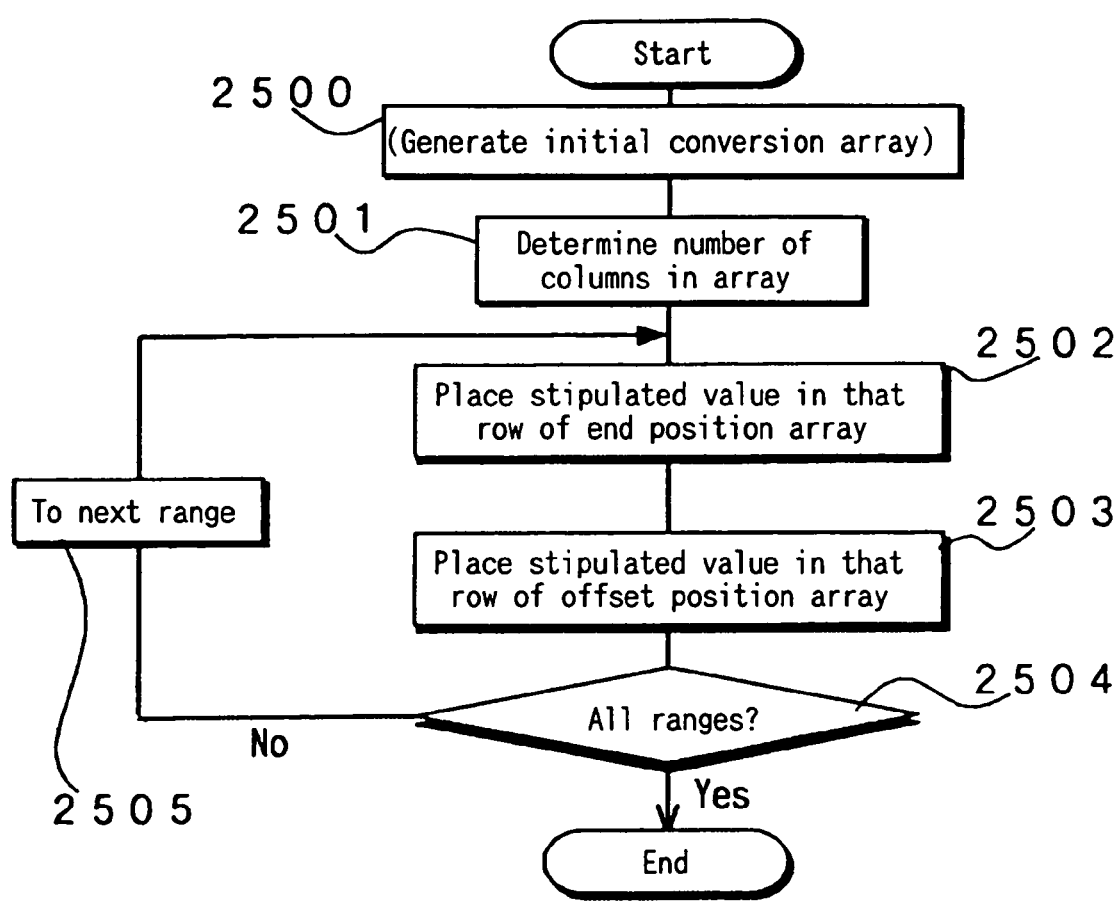
FIG. 25 is a flowchart illustrating the process of generating a value conversion table according to Embodiment 4 of the present invention.

Here follows a description of one example of the procedure for creating the aforementioned value conversion array, using the flowchart of FIG. 25. In the example of FIG. 25, in the same manner as that shown in FIG. 23B, a value conversion array for adding a stipulated number to values equal to a certain number or greater is generated. Note that this process is also executed by the CPU 12 shown in FIG. 1.

Figure 26A:
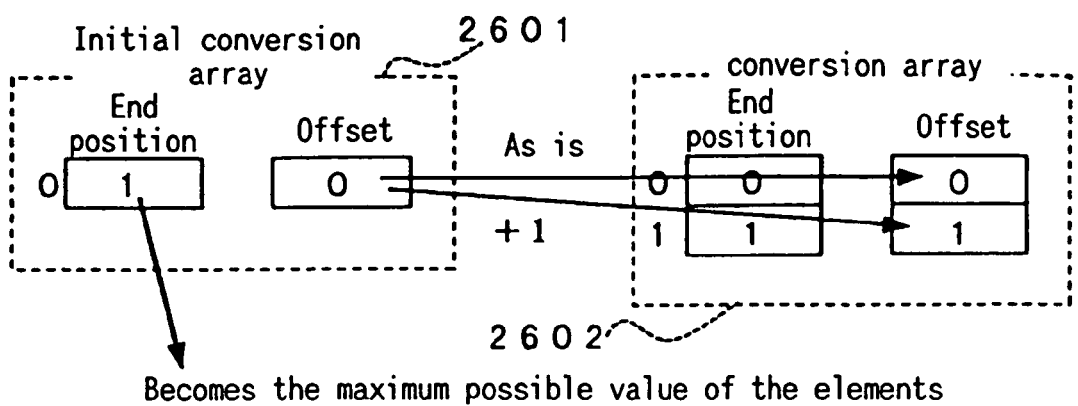
FIGS. 26A and 26B are diagrams used to describe the state in the case that the conversion of values within the actual array is executed in Embodiment 4 of the present invention.

First, if necessary, the initial value conversion array is generated (Step 2500). The processing of this step is executed only in the event that the value conversion array had not been generated. Regarding the actual array 2301 shown in FIG. 23B, as shown in FIG. 26A, an initial value conversion array is obtained. In the initial value conversion array 2601, the maximum value of the elements within the actual array is allocated as the element within the end position array, and "0" is allocated as the element within the offset array.

Next, the number of rows in the array to be created is determined based on the range of elements (stored values) that give a certain offset (Step 2501). For example, as shown in FIG. 23A, when the condition of adding "1" to those elements that have a value of "1" or greater is given, the number of rows in the end position array and offset array becomes "2." This is because a row (or structure array) for elements that have values smaller than "1" and a row (or structure array) for elements that have values greater than "1" are to be generated.

Thereafter, the maximum value within each range is placed on the row corresponding to the end position array and also its offset value is placed on the row corresponding to the offset array (Steps 2502 and 2503). In an actual array such as that shown in FIG. 23A, if "1" is to be added to elements that have values of "1" or greater, "0" which is the maximum value of the values less than 1 is placed on row 0 (the first row) of the end position array and the offset value "0" is placed on row 0 (the first row) of the offset array. To wit, the numerical values of the structure array of row 0 are given. On the other hand, in the end position array, the maximum value "1" of the elements within the actual array is given in row 1 (the second row). This means the initial value of the value conversion array may be used. In addition, the offset value "1" is placed in row 1 (the second row) of the offset array (see symbol 2602 of FIG. 26A).

By performing the processing of the aforementioned Steps 2502 and 2503 over the entire range according to the conditions (see Steps 2504 and 2505), it is possible to obtain a value conversion array in accordance with the value conversion conditions.

Figure 26B:
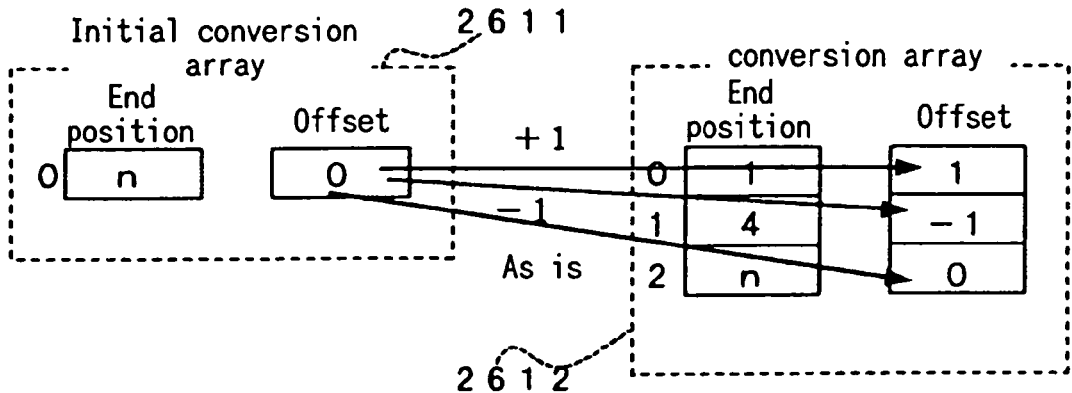

Note that in the aforementioned embodiment, the area for two conversion arrays is formed from a single condition, but this is not a limitation, as it is clear that the value conversion array can be created based on a plurality of conditions (e.g., add "1" to the value if 0<=value<=1 is true, or add "−1" to the value if 1<=value<=4 is true, and give no offset for other elements) (see symbols 2611 and 2612 of FIG. 26B).

Figure 27:
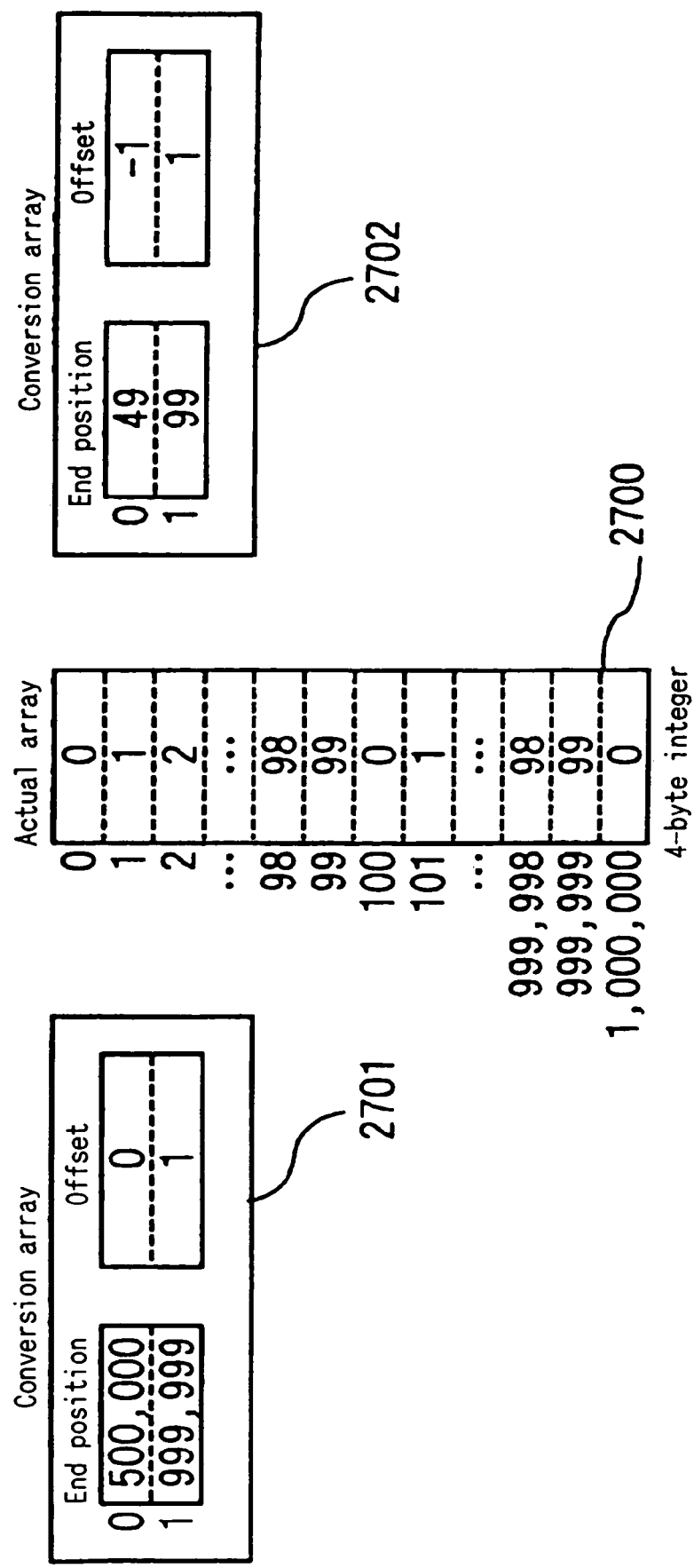
FIG. 27 is a diagram illustrating one example of a data structure that combines a subscript conversion array and value conversion array according to the present invention.

The aforementioned subscript conversion array and value conversion array may be used in combination. For example, in FIG. 27, on the upstream side (input side) of the actual array (see symbol 2700), in which the elements from "0" to "99" appear repeatedly, is provided a subscript conversion array (see symbol 2701) that applies the offset "0" to the subscripts from "0" to "500,000" and applies the offset "1" to the subscripts from "500,000" to "999,999." On the downstream side (output side) of the actual array is provided a value conversion array (symbol 2702) that applies an offset of "−1" if the value is 49 or less or applies an offset of "1" if the value is 50 or greater. Thereby, the subscript can be passed through the subscript conversion array, actual array and value conversion array to obtain an output value.

The aforementioned subscript conversion array may be used to convert the subscript given to the actual array within a certain information block, fetch an element (field value) within the actual array by means of the converted subscript, and also the aforementioned value conversion array may be used to convert the fetched element (field value), so this can be considered to be a virtual (logical) array consisting of input (subscript) and output (converted value) of the information block in question.

[Deletion of Data with Respect to Specific Table-Format Data]

Here follows a description of the specific procedure for performing the insertion, deletion or updating of desired data from actual table-format data. In Embodiment 5, a personal name table consisting of the fields of Member surname and Member given name is modified by performing the insertion or deletion of desired member names, or updating these surnames or given names. Here, we shall use the technique according to Embodiment 2 for insertion. To wit, the subscript conversion array and value conversion array each consists of an end position array and offset array. Note that the process of generating the subscript conversion array and process of generating the value conversion array include generating a new conversion array and updating a preexisting conversion array. Accordingly, in the following, "generating" refers to generating and updating, and this may be called "generating (or updating)" depending on the case.

FIG. 28A is a diagram showing an example of a personal name table. In this embodiment, for this personal name table 2800, a record number list 2810 shown in FIG. 28B, an information block for the "Member surname" field 2820 shown in FIG. 28C and an information block for the "Member given name" field 2830 shown in FIG. 28D are generated. In the array of pointers to the value list 2821 of information block 2820, an initial subscript conversion array 2823 and an initial conversion array 2824 are created in advance. In addition, the actual array 2823 corresponds to the array of pointers to the value list prior to the creation of the conversion array. In the value list 2822 also, an initial subscript conversion array 2826 is prepared in advance.

Note that the actual array 2827 corresponds to the value list containing the original field values.

In the array of pointers to the value list 2831 of information block 2830 also, an initial subscript conversion array and value conversion array are prepared in advance and in the value list 2832 also, an initial subscript conversion array is prepared in advance.

Figure 29A:
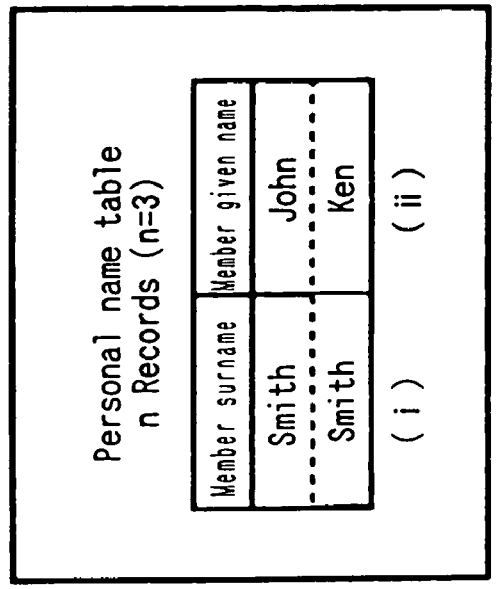
FIGS. 29A and 29B are diagrams used to describe the process of deleting a specific record in Embodiment 5 of the present invention.
Figure 29B:
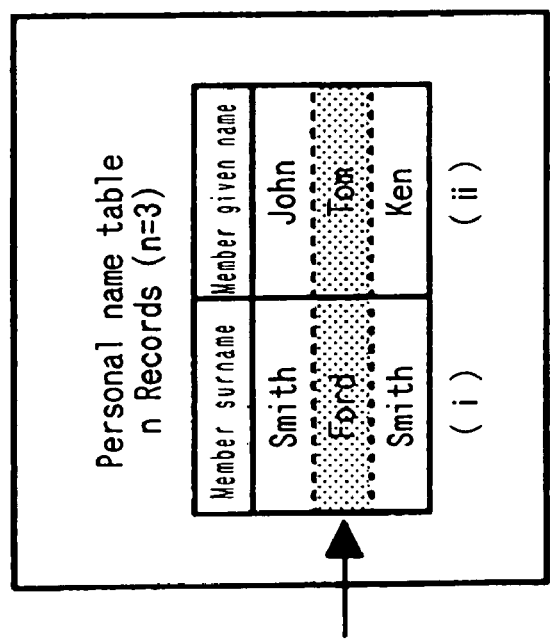

In table-format data consisting of information blocks having such a structure, as shown in FIGS. 29A and 29B, among the three records (see FIG. 29A), consider the case of deleting the record on row 1 (the second row) (see FIG. 29B). In this case, the process described in [Deletion of Elements by Means of a Subscript Conversion Array] is executed on each of the information blocks as described below.

First, consider the information block for "Member surname."

In order to obtain the "Member surname" as shown in FIG. 29A, the input/output relationships for subscripts as shown by symbol 3000 on FIG. 30A is initially established in the array of pointers to the value list. Namely, input of the "record number" which is the subscript gives output of the pointer values of the "array of pointers to the value list," which is the actual array, as shown by symbol 3000.

Now, a process nearly identical to that shown in FIG. 17 is executed by the CPU 12 shown in FIG. 1 on the subscript conversion array within the "array of pointers to the value list." More specifically, first, the position of the element to be deleted in the actual array (pointer array) 3001 is identified (Step 1701 of FIG. 17), and area is allocated for the conversion array regarding elements before the deletion position (Step 1702). Next, regarding elements before the deletion position, the "deletion position" is placed as the element of the end position array (Step 1703). Note that in this example, the start position array is not provided so Step 1704 and Step 1705 are omitted.

Thereafter, regarding elements after the deletion position, the various elements of the end position array are decremented (Step 1706) and also the various elements of the offset array are incremented (Step 1707). By means of this process, it is possible to obtain a subscript conversion array such as that shown in FIG. 30B. In FIG. 30B, one can see that for the record numbers which are subscripts, the pointer values of the "array of pointers to the value list" which is the actual array are output as indicated by symbol 3010.

In addition, the CPU 12 performs a process nearly identical to that shown on FIG. 17 on the information block for "Member given name" (see symbol 2830 of FIG. 28D) in the same manner as on the information block for "Member surname." Thereby, the subscript conversion array 3101 within the information block for "Member given name" becomes the subscript conversion array 3111 as shown in FIG. 31B. Accordingly, the relationship between the input of the "record number" which is the subscript and the pointer values of the "pointers to the value list" which is the actual array changes from that shown by symbol 3100 of FIG. 31A to that shown by symbol 3110 of FIG. 31B.

After the process of generating the subscript conversion arrays is performed in this manner, by obtaining the pointer arrays from record numbers, it is possible to identify the desired element (field value) within the actual array of the value list. As shown in FIG. 32, the CPU 12 uses a new subscript obtained from the new record number (subscript) via the subscript conversion array to identify the element (pointer value) within the actual array. For example, the offset value for the record number "0" is "0" so the element (pointer value) of row 0 (the first row) of the actual array is fetched and this pointer value of "1" is used to identify the field value of the actual array within the value list (see (i) in FIG. 32). The offset value for record number "1" is "1" so the converted subscript of "1+1=2" is obtained. Thereby, the element (pointer value) of row 2 (the third row) within the actual array is fetched. Next, this pointer value "1" is used to identify the field value on row 1 (the second row) in the actual array within the value list (see (ii) in FIG. 32).

Regarding the information block for "Member given name," it is clear that a similar process (see (iii) and (iv)) is used to identify the field value for the actual array within the value list. In this way, it is possible to obtain a table (view) 3200 for the personal name table corresponding to a new record number. In the view 3200, (i) through (iv) each indicates a field value identified in the aforementioned process.

[Insertion of Data for Specific Table-Format Data]

Here follows a description of an example of the insertion of data. For example, consider the case of taking two records (see FIG. 33A) and inserting a certain record between row 0 (the first row) and row 1 (the second row) (see FIG. 33B). In this case, the "insertion of elements by subscript conversion arrays" is executed on each information block, and the "generation of value conversion arrays" is executed for the required information blocks.

FIG. 34 is a diagram that shows the state of the various information blocks prior to the insertion of the record (data). First, consider the updating of the subscript conversion array in the "Member surname" information block" and the updating of the subscript conversion array in the "Member given name" information block.

Regarding the "Member surname," it is necessary to add the element (field value) "Ford" within the actual array of the value list. To do this, the CPU 12 executes the insertion process based on subscript conversion arrays within the value list. More specifically, the insertion position for the element (field value) is determined (see Step 1300 of FIG. 13). In this example, it is necessary to insert the element (field value) "Ford" but in the actual array of the value list, the elements are placed in ascending order (alphabetic order in this case), so the element "Ford" must be placed before the element "Smith." Accordingly, the insertion position is judged to be row 0 (the first row).

To this end, area is allocated for the various conversion arrays according to Step 1301 of FIG. 13. In this example, the insertion position is row 0 (the first row), so there are no elements present before the insertion position and the process of Step 1303 through Step 1307 is performed on elements at the insertion position and after the insertion position. As shown in FIG. 35B, regarding the insertion position (see symbol 3501), an element "0" indicating the insertion position (see symbol 3511) is placed in the end position array and the position "1" indicating the end of the actual array is placed as an element corresponding to the offset array (see symbol 3512). In addition, regarding elements after the insertion position, a value consisting of the original value to which "+1" is added is placed in the end position array (see symbol 3513), and a value consisting of the original offset value of "0" to which "−1" is added is placed as the value corresponding to the offset array (see symbol 3514). In addition, the new element (field value) of "Ford" is placed at the end of the actual array (see symbol 3520). While the new element to be inserted is actually added to the end of the actual array, by means of the subscript conversion array within the value list, the virtual (namely, logical) array appears in ascending order (alphabetic order).

In the same manner, the element (field value) "Jonny" must be added to the actual array of the value list. To this end, the CPU 12 executes the insertion process (FIG. 13) by means of the subscript conversion array within the value list in the information block for "Member given name." More specifically, the element (field value) insertion position is determined to be on row 1 (the second row) (see symbol 3610 of FIG. 36B) and area is allocated for the various conversion arrays. For elements before the insertion position, a value found by taking the insertion position ("1" in this case) and subtracting "1" (or adding "−1") is allocated as the element of that end array (see symbol 3611). On the other hand, the element in the corresponding offset array is kept (see symbol 3612).

In addition, regarding the insertion position (see symbol 3610), the element "1" indicating the insertion position is placed in the end position array (see symbol 3513), and the offset value "1" indicating the position "2" which indicates the end of the actual array is given as the element within the offset array (see symbol 3614).

On the other hand, for elements after the insertion position, a value found by taking the original value and adding "1" is placed in the end position array (see symbol 3615), and a value consisting of the original offset value "0" to which "−1" is added is placed as the corresponding value of the offset array (see symbol 3516). Moreover, the new element (field value) "Jonny" is placed at the end of the actual array (see symbol 3620). Note that while the new element to be inserted is actually added to the end of the actual array, by means of the subscript conversion array within the value list, one can see that, as indicated by symbol 3621, the virtual (namely, logical) array appears in ascending order (alphabetic order).

After the generation (or updating) of value-conversion arrays for the value lists of each information block is implemented, additionally, the generation (or updating) of subscript conversion arrays and value conversion arrays on the pointer array side is also executed.

First, in the array of pointers to the value list, it is necessary to generate (or update) the value conversion array for converting elements of the actual array. For example, regarding the array of pointers to the value list in the information block for "Member surname" shown in FIGS. 37A and B, in the associated value list (namely, the value list for "Member surname"), the aforementioned process inserts the new surname "Ford" at the start of the virtual (logical) array (see symbol 3521 of FIG. 35B). Then, among the pointer values of the array of pointers to the value list (namely, the elements of the actual array 3701), those that have values of 0 or greater must all be incremented. Then, the value conversion array in the aforementioned array of pointers to the value list is generated (or updated) according to the flowchart shown in FIG. 25.

Figure 37A:
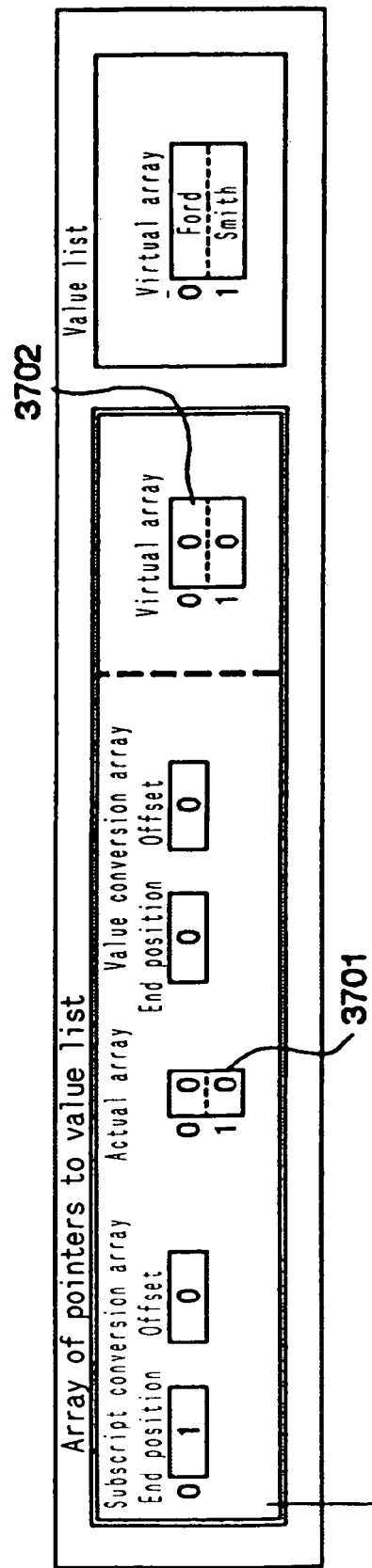
FIGS. 37A and 37B are diagrams used to describe the process of inserting a specific record into a specific position in Embodiment 5 of the present invention.
Figure 37B:
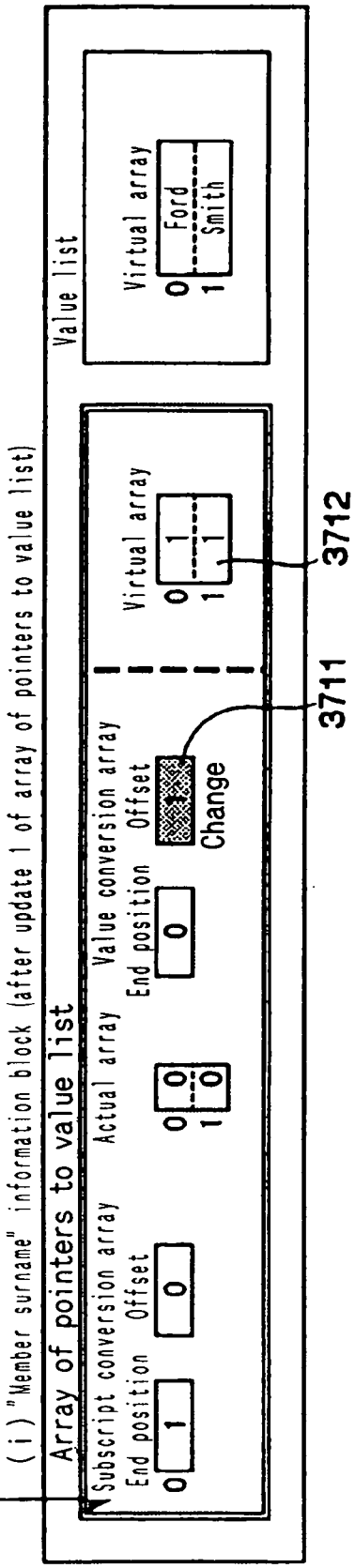

In the array shown in FIG. 37A, the maximum value that a value may take is "0" and values above "0" must be incremented, so as a result "+1" is added to the value "0" within the offset array (see Step 2503 of FIG. 25 and symbol 3711 of FIG. 37B). Initially, the elements (pointer values) actually contained within the actual array are identical to the elements (pointer values) output via the value conversion array as shown by symbol 3702 of FIG. 37A, but after the generation (or updating) of the value conversion array, the elements (pointer values) output via the value conversion array have the original values incremented as shown by symbol 3712 of FIG. 37B.

In addition, with the new surname "Ford" being inserted at record number "1" (namely row 1 or the second row), the process of generating (or updating) the subscript conversion array in the array of pointers to the value list is executed and the surname "Ford" is also inserted into row 0 (the first row) of the virtual (logical) array within the value list, so the process of generating (or updating) the values within the array of pointers to the value list must be executed accompanying the aforementioned changes to the value list. To wit, in the array of pointers to the value list, a pointer value which is the record number (subscript) converted to an integer is extracted, and accordingly, the following generation (or updating) of the subscript conversion array is used to generate a subscript conversion array. Thus, it is possible to show the surname "Ford" corresponding to record number "1" and also, the output (value) from the pointer array can be converted so that the elements "Ford" and "Smith" can be arranged in ascending order to show the virtual (logical) value list appropriately.

First, corresponding to the insertion of a record number which is a subscript, the CPU 12 executes the process shown in FIG. 13 for the subscript conversion array of the aforementioned pointer array.

More specifically, the record number for the new surname "Ford" (and the new given name "Jonny") to be inserted is "1" so the insertion position is judged to be row 1 (the second row) (see Step 1301 of FIG. 13) and area is allocated for the insertion position and the conversion array before and after (Step 1302). Thereafter, the process of Step 1303 through Step 1308 (actually, the process related to the start position is omitted) is used to form a subscript conversion array (see symbol 3810) as shown in FIG. 38A.

Thus, by obtaining a subscript conversion array, the value list pointer array gives the output indicated by symbol 2811 is obtained from input of the record number which is the subscript. In passing, as described in reference to FIGS. 37A and 37B, in the aforementioned example, the virtual (logical) array in the value list is put into ascending order (alphabetic order), so one can see that the element (field value) "Ford" is positioned above the element (field value) "Smith." Accordingly, the value conversion array must be used to perform a conversion of the values in the actual array within the value list pointer array so that the elements (field values) within the value list can be indicated appropriately.

Thus the CPU 12 executes the process according to FIG. 25. In this process, by inserting the surname "Ford," a process is executed such that an offset value such that the output where the value of the actual array is "1" becomes "0," or namely an offset value of "−1" is given, but otherwise the offset value of "1" is given. Thereby, it is possible to obtain the value conversion array (see symbol 3820) as shown in FIG. 38B.

In FIG. 38B, the values output for the new record number (subscript) via the subscript conversion array, actual array and value conversion array are as shown in the virtual (logical) array (see symbol 3821), and thus one can see that the elements (field values) of the value list are identified appropriately.

Figure 39A:
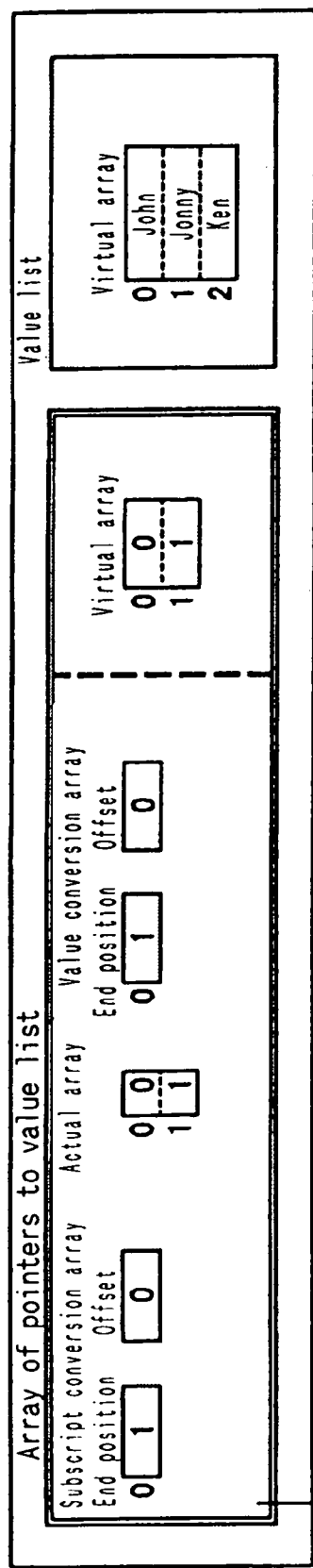
FIGS. 39A and 39B are diagrams used to describe the process of inserting a specific record into a specific position in Embodiment 5 of the present invention.
Figure 39B:
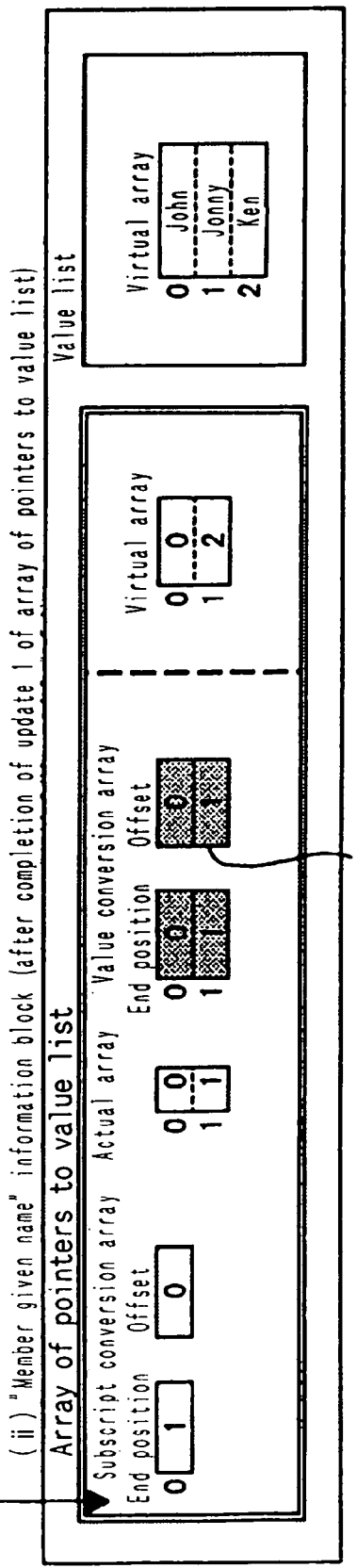

A process similar to that performed on the array of pointers to the value list of the "Member surname" information block is performed for the "Member given name" information block. First, as shown in FIGS. 39A and 39B, within the "Member given name" information block, the generation (or updating) of an array of pointers to the value list is performed accompanying the process related to the value list (generation (update) of the subscript conversion array and insertion of elements (field values) into the actual array: see FIGS. 36A and B). It is clear that it is possible to obtain the value conversion array (see symbol 3910) shown in FIG. 39B by the CPU 12 executing the process shown in FIG. 13.

Next, regarding the aforementioned subscript conversion array of the pointer array, the CPU 12 executes the process shown in FIG. 13 with the insertion of the record number which is the subscript. More specifically, since the new member given name "Jonny" has the record number to be inserted of "1" a process according to FIG. 13 is performed with row 1 (the second row) as the insertion position (see Step 1301 of FIG. 13). Thereby, it is possible to obtain an offset array (see symbol 4010) such as that shown in FIG. 40A.

Moreover, it is necessary to update the value conversion array accompanying the generation (or updating) of the aforementioned subscript conversion array and the insertion of an element to the end of the actual array, so the CPU 12 executes the process shown in FIG. 25, and thus the value conversion array (see symbol 4020) shown in FIG. 40B can be obtained.

In FIG. 40B, the output of the value list pointer array in which the record number is the subscript becomes that shown in the virtual (logical) array (see symbol 4021). One can see that the output from the various record numbers is obtained by the route shown by the broken lines of FIG. 40B.

In this manner, after the process of generating or updating the subscript conversion array and/or value conversion array is performed in each of the information blocks, by passing the record number through the pointer array, it is possible to identify the desired element (field value) within the actual array of the value list. As shown in FIGS. 40A and 40B, in the array of pointers to the value list, the CPU 12 obtains output for identifying an element (field value) within the actual array of the value list from the new record number (subscript) via the subscript conversion array, actual array and value conversion array. For example, regarding the "Member surname" information block, the offset value for record number "0" is "0," so the element (pointer value) of row 0 (the first row) within the actual array is fetched, and moreover, the offset value corresponding to this element (pointer value) is "1" so the output from the array of pointers to the value list becomes "1" (see (i) of FIG. 40). In contrast, for record number "1" the offset value of the subscript conversion array is "1" so the converted subscript of "1+1=2" is obtained, and this is used to fetch the element (pointer value) of row 2 (the third row) within the actual array. Moreover, the offset value corresponding to this element (pointer value) is "−1" so the output from the array of pointers to the value list becomes "0" (see (ii) in FIG. 40). In the same manner, the output of "1" can also be obtained for the record number "3." This output is given to the value list and the output via the subscript conversion array within the value list is used to identify the element (field value) within the actual array. Regarding the "Member given name" also, the element (field value) within the actual array of the value list is identified from the record number via a similar route (see (iv) through (vi) of FIG. 41).

In this manner, it is possible to obtain the personal name table (view) 4100 corresponding to the new record number. In view 4100, (i) through (vi) indicate the field values identified in the aforementioned process.

By means of this embodiment, the input to the actual array is defined to be the subscript, and by converting this subscript and/or converting the value which is the output from the actual array, the insertion or deletion of elements to or from an actual array can be achieved without moving the elements themselves of the actual array. To wit, the structure is such that by performing stipulated functions on the input and output of the actual array, the insertion/deletion/updating of the actual array may be taken to be performed virtually (or logically). Accordingly, the insertion of data can be achieved without the necessity of moving elements within the actual array. Because it does not require the movement of elements, it can contribute to marked increases in processing speed particularly in table-format data in which the number of elements is huge.

[Updating of Data with Respect to Specific Table-Format Data]

As described above, with the present invention, it is possible to achieve the insertion and deletion of data with respect to table-format data without changing the actual array (namely, changing or moving the data itself). The updating of data with respect to table-format data is equivalent to sequentially performing the deletion of data of a certain record number (deleting a record) and the insertion of data with the same record number. For example, in the table-format data (personal name table) shown in FIG. 28, consider the act of updating the record on row 1 (the second row) (for example, the process of changing the "Member surname" of "Ford" to "Truman" and/or the process of changing the "Member given name" of "Jonny" to "Tom"). In this case, it is sufficient first to use the technique described with reference to FIGS. 29A and B through FIG. 32 to execute the process of deleting the record on row 1 (the second row) and then use the technique described with reference to FIGS. 33A and B through FIG. 42 to execute the process of inserting a new record between row 0 (the first row) and row 1 (the second row).

[Discussion of the Insertion of Table-Format Data Represented in the Form of Information Blocks]

We will now present an additional study of the case of acing data to table-format data represented in the form of the aforementioned information blocks.

As described above in the aforementioned example, as shown in FIG. 46A, the CPU 12 executes the processing of subscript conversion arrays accompanying the insertion of field values to a value list, or namely the generation (or updating) of subscript conversion arrays for obtaining a "virtual (logical) array" in the state in which field values are stored in the state when sorted in alphabetical order (Step 4601). Thereafter, since an element (field value) is inserted at a stipulated position in the virtual (logical) actual array (value list), regarding the array of pointers to the value list, accordingly those with a value greater than the value corresponding to the stipulated position are incremented (Step 4602). Next, focusing on the record number and pointer values within the pointer array, the CPU 12 executes the processing of the subscript conversion array of the array of pointers to the value list (Step 4603). After this processing, finally a value conversion array is generated for the newly inserted field value in the actual array of the pointer array (a value one greater than the largest value within the original actual array) (Step 4604).

Looking at this process, Step 4601 and Step 4603 can be executed independently (they may also be executed in parallel, depending on the case), and on the other hand Step 4602 and Step 4604 may be executed as a batch. Accordingly, as shown in FIG. 46B, the insertion process can be considered to consist of: processing related to the subscript conversion array of the pointer array (Step 4611: corresponding to Step 4603 of FIG. 46A), processing related to the subscript conversion array of value lists (Step 4612: corresponding to Step 4601) and processing related to the value conversion of pointer arrays (Step 4613: corresponding to Steps 4602 and 4604).

Now consider an array of pointers to a value list consisting of m elements (pointer values) corresponding to m records and a value list consisting of n elements (field values). Here, assume that an element is to be inserted into the record on row j.

As shown in FIG. 47, one can see that by means of the process of Step 4611, regarding the array of pointers to the value list, a subscript conversion array consisting of an end position array and offset array (see symbol 4701), and an actual array that contains new pointer values at its end (see symbol 4702) are obtained.

On the other hand, regarding the value list with elements (field values) placed in a stipulated order (e.g., alphabetic order), even in the case that an element is judged to be inserted in row i based on a scan of these elements, by means of the process of Step 4612, one can see that the subscript conversion array consisting of the end position array and offset array (see symbol 4703) and actual array where the element (field value) is placed at its end (see symbol 4704) are obtained. Here, in the array of pointers to the value list, this means that the offset value of "0" is added when the subscript (record number) "p" is in the range $0<=p<=(J-1)$; the offset value of "m-j" is added when $j<=p<=j$ (namely, when p=j); and the offset value of "-1" is added when $(0+1)<=p<=m$. In addition, in the value list, this means that the offset value of "0" is added when the input subscript (output of the pointer array) "q" is in the range $0<=q<=(i-1)$; the offset value of "n-i" is added when $1<=q<=i$ (namely, when q=i); and the offset value of "-1" is added when $(i+1)<=q<=m$.

Next, to add a discussion of the value conversion array in the array of pointers to the value list, one can consider there to be no need to add an offset for values of the virtual (logical) insertion position in the value list smaller than "i" (namely, there is no change in the meaning of the pointer value). On the other hand, for values where the aforementioned insertion position is "i" or greater, one can see that this means that they are each shifted one position down (namely in the direction of greater values), so it is necessary to add an offset value of "1" to the values.

Moreover, the value of the point value added to the end of the actual array (namely, the pointer value at the position "m" within the actual array added accompanying the record number insertion process) can be considered to be "n." This is because, in the actual array of the pointer array prior to the insertion process, it can take the value of either "0" or "n-1" so the point value "n" is given by the insertion process. For this reason, one can see that this point value "n" is subjected to value conversion and points to the virtual (logical) insertion position of "i" in the value list, so the offset value need merely be set to "i-n." Naturally, even if the point value at the position "m" within the actual array is allocated another value, it is sufficient for value conversion to give an offset value such that the value is converted to "i." In this manner, it is possible to obtain a value conversion array such as that indicated by symbol 4705 of FIG. 47. Namely, regarding the pointer array value change list, the offset value of "0" is added when the element (pointer value) "r" is within the actual array is in the range $0<=r<=(i-1)$; the offset value of "+1" is added when $1<=r<=(n-1)$; and the offset value of "i-n" is added when $n<=r<=n$ (namely, when r=n).

Figure 48:
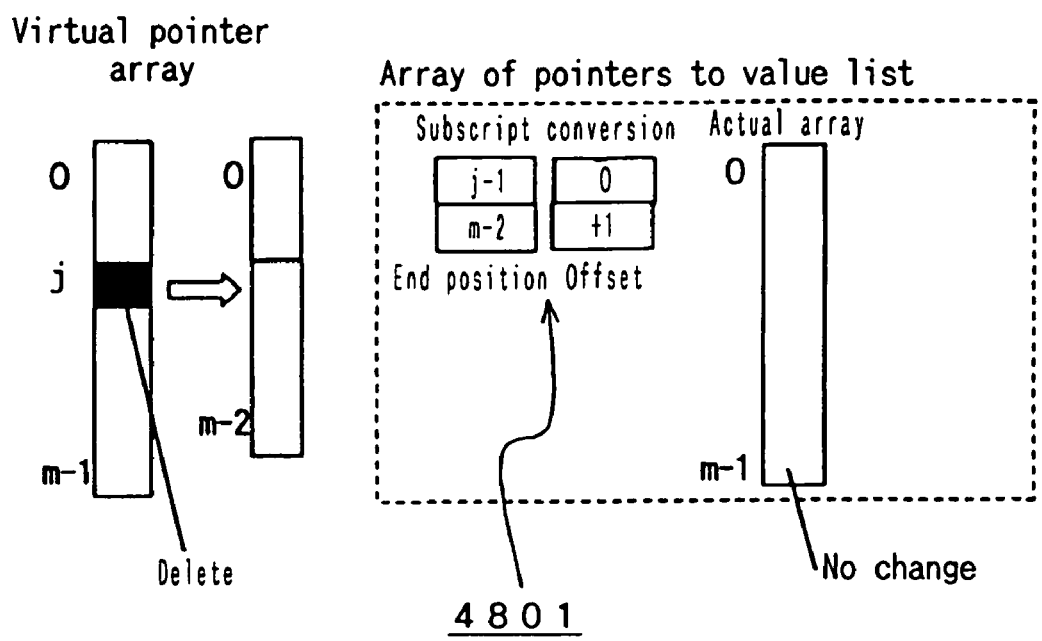
FIG. 48 is a diagram used to describe the data deletion process for table-format data in the form of information blocks in the present invention.

Regarding deletion also, in the same manner as insertion, consider an array of pointers to a value list consisting of m elements (pointer values) corresponding to m records and a value list consisting of n elements (field values), and assume that the record on row j is to be deleted. In this case, as shown in FIG. 48, it is sufficient to look up the subscript conversion array within the pointer array (symbol 4801). As one can see from FIG. 48, it is sufficient to add an offset value of "0" when the subscript (record number) "p" is in the range $0<=p<=(j-1)$ and add an offset value "+1" when $j<=p<=(m-2)$. Thereby, in the converted subscripts, the pointer value corresponding to the original (unconverted) subscript "j" no longer points, and the value lists that are identified thereby are virtually (logically) deleted.

[Deletion of Data from Table-Format Data by another Technique]

Here follows a description of another example of the deletion of data from table-format data according to the present invention. This technique is effective in the case that the insertion of data is not performed. Again, consider the case of table-format data consisting of information blocks having the structure shown in FIGS. 28A–D, where the record at row 1 (the second row) is deleted as shown in FIGS. 29A and 29B.

Figure 42:
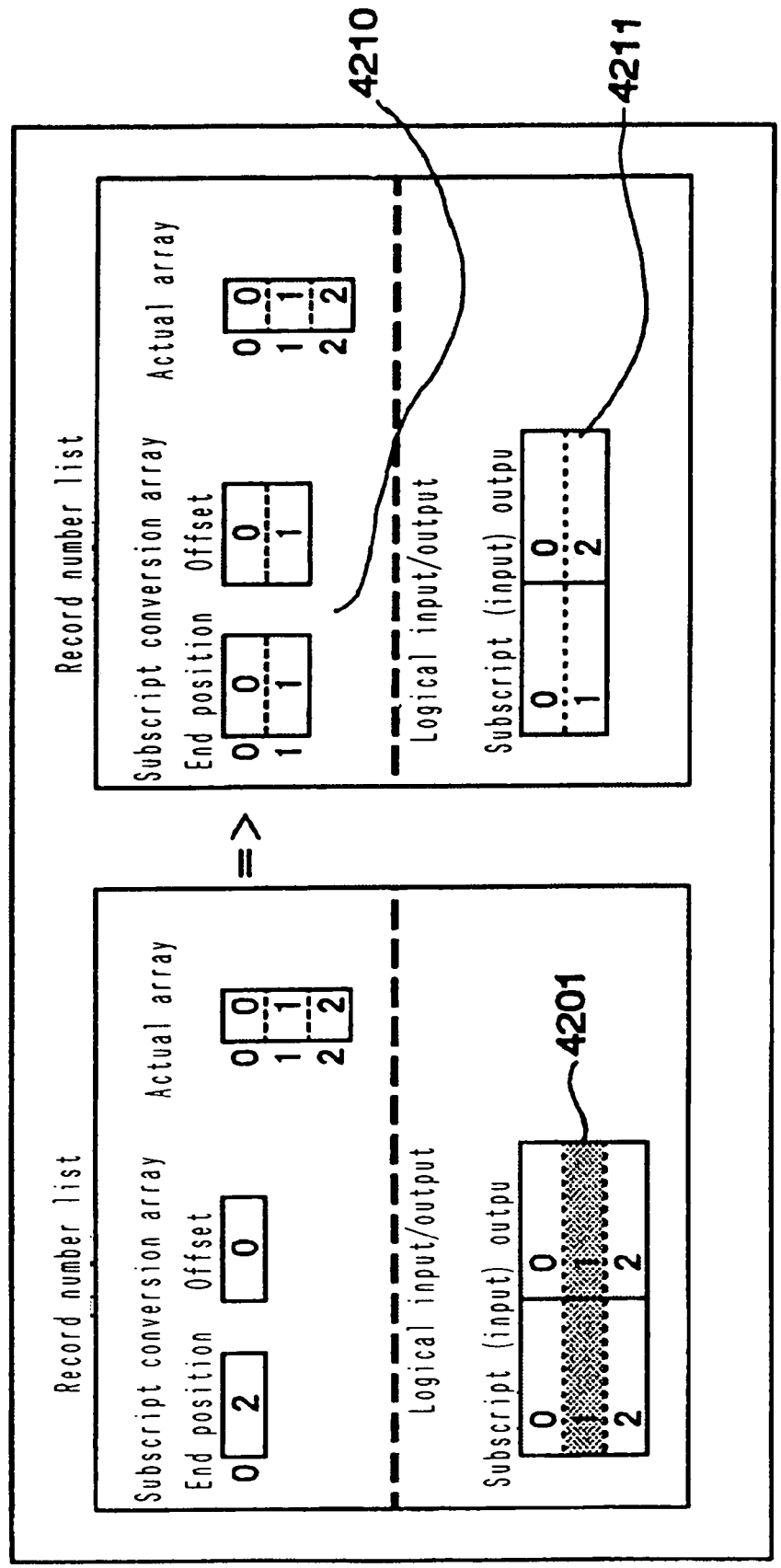
FIG. 42 is a diagram used to describe the process of deleting a specific record in Embodiment 6 of the present invention.

In this example, there is no need to process the "Member surname" and "Member given name" information blocks, but rather the deletion of records is achieved by processing the record number list. More specifically, as shown in FIG. 42, the deletion process is executed on the subscript conversion array of the record number list, so that logical output in the form with the original record number "1" deleted. As shown in FIG. 42, the relationship between the subscript input in the record number list and the record number output is that as shown by symbol 4201. To that end, in order to delete row 1 (the second row), the process shown in FIG. 17 is executed. More specifically, the deletion position (row 1 in this case) is identified (Step 1701), and next the area for the conversion array related to the deletion position is created (Step 1702), and the stipulated processing is performed on the elements within the conversion array (see Steps 1703 through 1707; however, in this example, processing is not performed on the start array). Thereby, a subscript conversion array (see symbol 4210) such as that shown in FIG. 42 is obtained. Upon passing through this subscript conversion array, the relationship between input and output are as indicated by symbol 4211, where one can see that record number "1" is logically deleted and the subsequent record numbers are all shifted by one.

By means of this example, a subscript conversion array for the record number itself is used to achieve the virtual (logical) deletion and shifting of record numbers. Accordingly, it is possible to achieve the deletion of records by an extremely simple technique.

[Application of the Present Invention to Transaction Processing, etc.]

Figure 43:
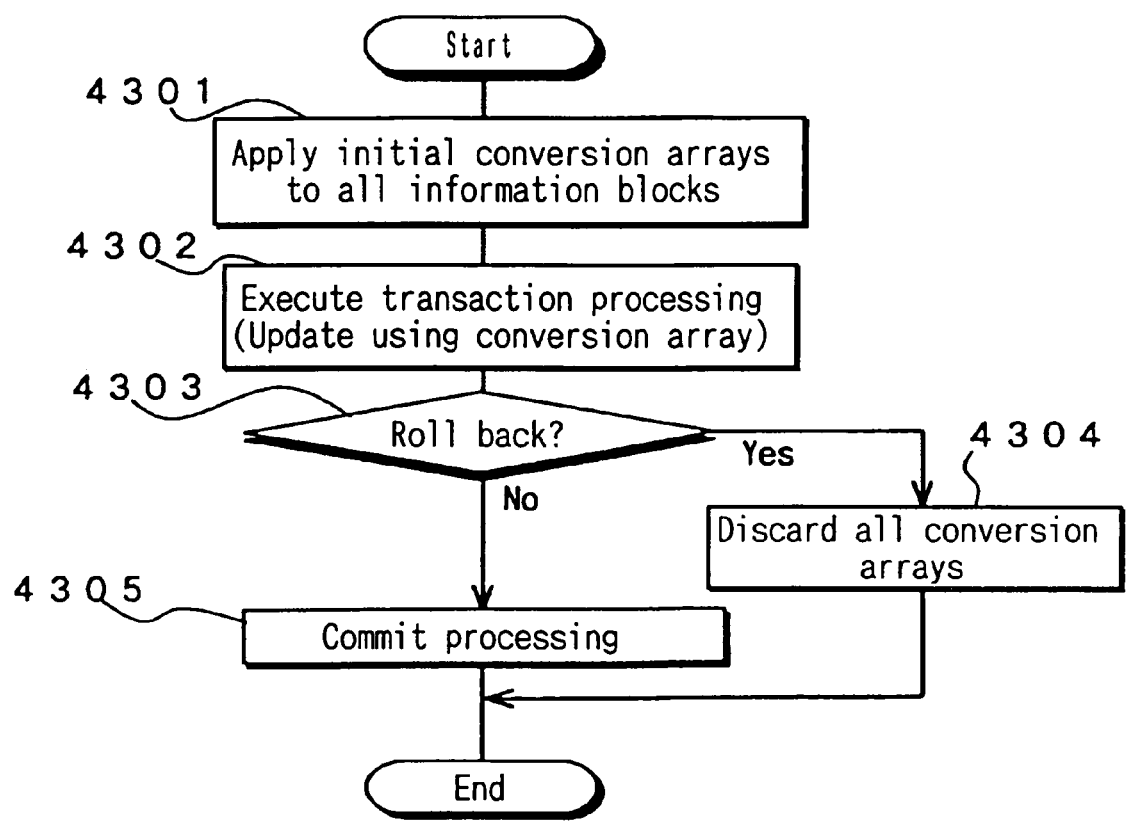
FIG. 43 is a flowchart illustrating transaction processing utilizing the present invention.

Here follows a description of using the aforementioned techniques to perform appropriate transactions. As described above, with the present invention, it is possible to achieve the insertion, deletion, and updating of elements without changing the order of elements in the actual array or moving elements. Thus, this property may be used to implement transactions appropriately. FIG. 43 is a flowchart illustrating transaction processing. This processing is executed by the CPU 12 of FIG. 1. In addition, the process of making table-format data into a set of a plurality of information blocks (e.g., the process shown in FIG. 6) is assumed to have been performed in advance.

The CPU 12 first applies initial conversion arrays to all of the information blocks related to transaction processing (Step 4301). For example, in the record number list, an initial subscript conversion array is generated for the record number array (actual array), or in the array of pointers to the value list of a certain information block, an initial subscript conversion array and value conversion array are generated for the actual array of the pointer array, and also, in the value list for the information block in question, an initial conversion array is generated for the actual array (actual value list).

Next, the CPU 12 performs the stipulated transaction processing (Step 4302). Here, if any of the insertion, deletion or updating of records becomes necessary, as described above, the subscript conversion array and value conversion array are updated and, if necessary, elements are inserted to the end of the actual array (or a difference array is generated in another area). For example, in the event that the operator or the like requests a rollback (the case of Yes in Step 4303), the CPU 12 discards all conversion arrays present at that time (Step 4304).

On the other hand, if there is no request for a rollback (the case of No in Step 4303) and the transaction processing is complete, the CPU 12 commits the processing (Step 4304). At the time of a commit, the CPU 12 may destroy the various conversion arrays or return the various conversion arrays to the state of the initial conversion arrays as generated in Step 4301, so that another process may be performed via the conversion arrays in this state. In addition, another process may also use the conversion arrays at the end of processing as is. Moreover, the conversion arrays may be saved and used where necessary.

Next, consider the case in which the same table-format data is used in a plurality of processes that are executed in parallel. For example, consider the case in which a certain process involves the updating of data (e.g., the process of withdrawing 10,000 yen from an account), and another process performs a lookup on the table-format data (e.g., the process of finding the sum of the account balances of various accounts).

Figure 44:
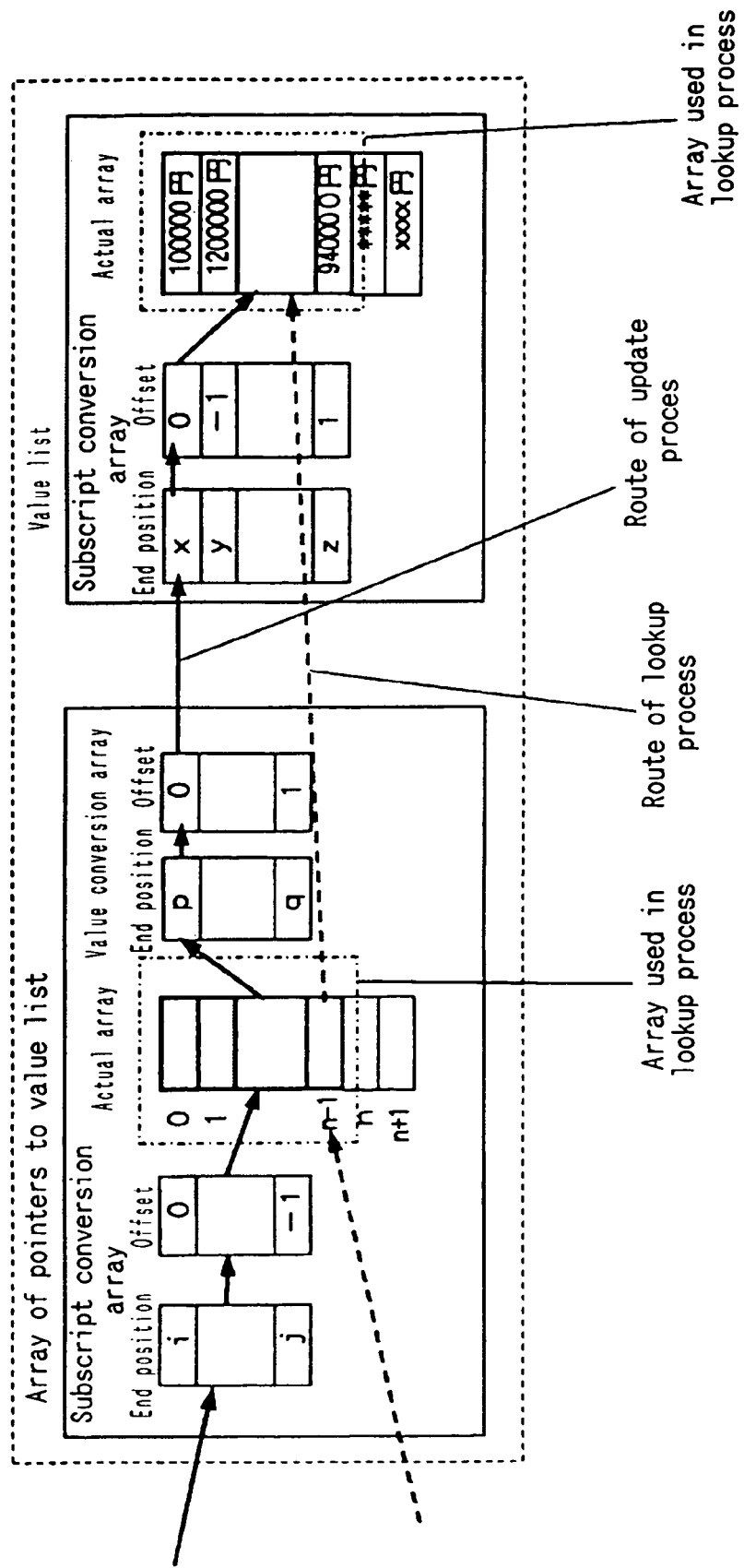
FIG. 44 is a diagram used to describe the parallel processing of a plurality of processes utilizing the present invention.

In the aforementioned process which involves the updating of data (called an "update process"), the 10,000 yen is temporarily withdrawn until the commit occurs. With the present invention, update processes use the subscript conversion arrays and value conversion arrays to perform the deletion and insertion of records (see the solid arrows in FIG. 44). On the other hand, another process (called the "lookup process") performs a lookup of the actual array directly without referring to the aforementioned subscript conversion array or value conversion array (see the dashed arrows of FIG. 44), so even if a plurality of processes are being executed in parallel, the processing can be performed appropriately without each interfering with the other.

Figure 45:
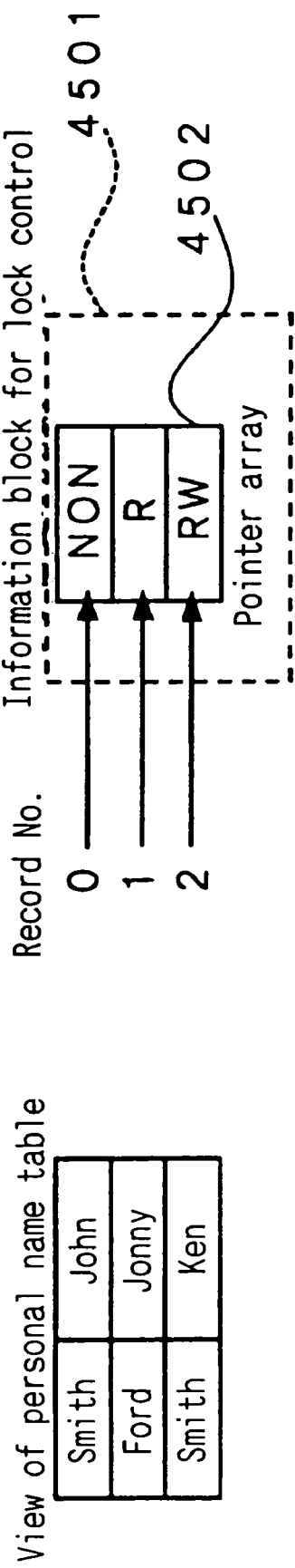
FIG. 45 is a diagram used to describe exclusive control utilizing the present invention.

Here follows a brief discussion of a technique of locking records. In this case, it is sufficient to provide an information block that controls locking with correspondence to each record number. FIG. 45 is a diagram used to describe the locking of records. As shown in FIG. 45, an information block for locking control (symbol 4501) is provided in the table-format data, and a pointer array (symbol 4502) in which the same number of elements as the record number can be placed is provided. This pointer array may contain the elements (stored values) of "NON" which indicates not readable or writeable, "R" which indicates read only (updating and deletion not possible), "RW" which indicates reading and writing are possible. Naturally, there is no need to use these letters, so of course numerical values may be allocated to indicate the status (e.g., "0" for not readable or writeable, "1" for read only, etc.). In this manner, by performing a lookup on the pointer array corresponding to the record number, the process can determine the possibility of reading various data corresponding to the record number in question, and also, at the time of the actual processing, the process can update the pointer array corresponding to a certain record number and thus achieve exclusive control.

In this manner, by providing an array with field values containing lock attributes (types) corresponding to each record, first of all, it is possible to perform locking quickly. For example, records having a specific field value in a certain field (e.g., records that have the field value "Female" in the sex field) may be locked quickly. To wit, where in the prior art it is necessary to use an OS call to register each of the records to be locked individually with the OS, with the present invention, it is possible to perform locking without involving OS calls by simply changing the field value within an array of the information block.

In addition, with the aforementioned constitution, the locking can be propagated even in the case of joining table-format data. For example, consider the case of achieving a join according to Japanese Patent Application No. 11-151156, where among a plurality of tables of table-format data in which each consists of a set of a plurality of information blocks, the join is performed by sharing field values of information blocks that have a common meaning. First, an information block containing an array to store information related to locking is generated for each table of table-format data. Here, the arrays within the information blocks of table-format data prior to the join process are called the original tables. Next, the join process is performed, but in this case, the pointer arrays of the original tables are fundamentally stored, so from the table created by the join it is possible to look up or rewrite the information blocks containing arrays storing the lock information for the original table.

Accordingly, the joined table can be created and it is possible to accept data modification requests from users while displaying the joined table. More specifically, this procedure is described below.

(1) First, a joined table is created and displayed.
(2) Next, when a user makes a request to modify records within the joined table, the program confirms that there is no lock applied to the record requested record. At this time, no information block which controls locking information is present in the table generated by the join, so in fact, the locking information related to the record in question in the original table is examined.
(3) Next, the program locks that record within the joined table. In fact, the corresponding record in the original table is locked.
(4) Thereafter, the program executes the rewriting of data according to the user's request.
(5) Finally, the program commits the modifications and releases the lock.

In this manner, with the aforementioned structure, locking can be propagated to the joined table, so it is possible to rewrite the joined table.

The present invention is in no way limited to the aforementioned embodiments, as various modifications are possible within the scope of the invention recited in the claims, so it need not be said that these too may be included within the scope of the present invention.

Figure 49:
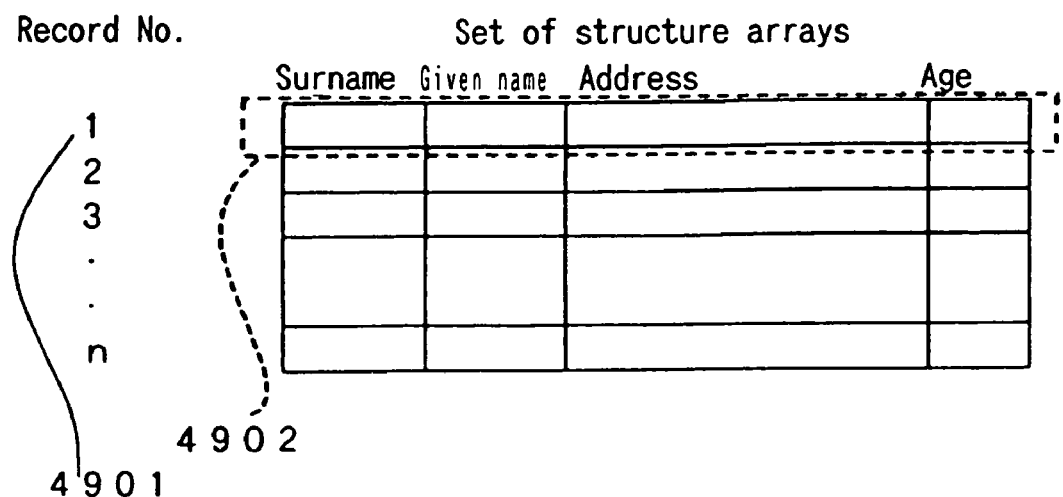
FIG. 49 is a diagram used to describe another practical example of a subscript conversion array according to the present invention.

For example, the present invention is not limited to the insertion, deletion and updating of data with regard to table-format data constructed of a set of a plurality of information blocks as described in Embodiments 5 through 7 above. As shown in FIG. 49, it is possible to perform the insertion, deletion and updating of data with regard to table-format data of the form wherein the record number (see symbol 4901) is associated with a structure (see symbol 4902) consisting of character strings for the surname (4 characters), given name (4 characters), address (20 characters), and the like.

For example, in the case of insertion, considering the set of the structure arrays consisting of the names, addresses and the like as an actual array, and considering the record number to be the subscript, it is possible to execute a process nearly identical to that shown in FIG. 13. In the case of deletion also, it is similarly possible to consider the set of structure arrays to be the actual array and the record number to be the subscript and thus execute a process nearly identical to that shown in FIG. 17.

Figure 50:
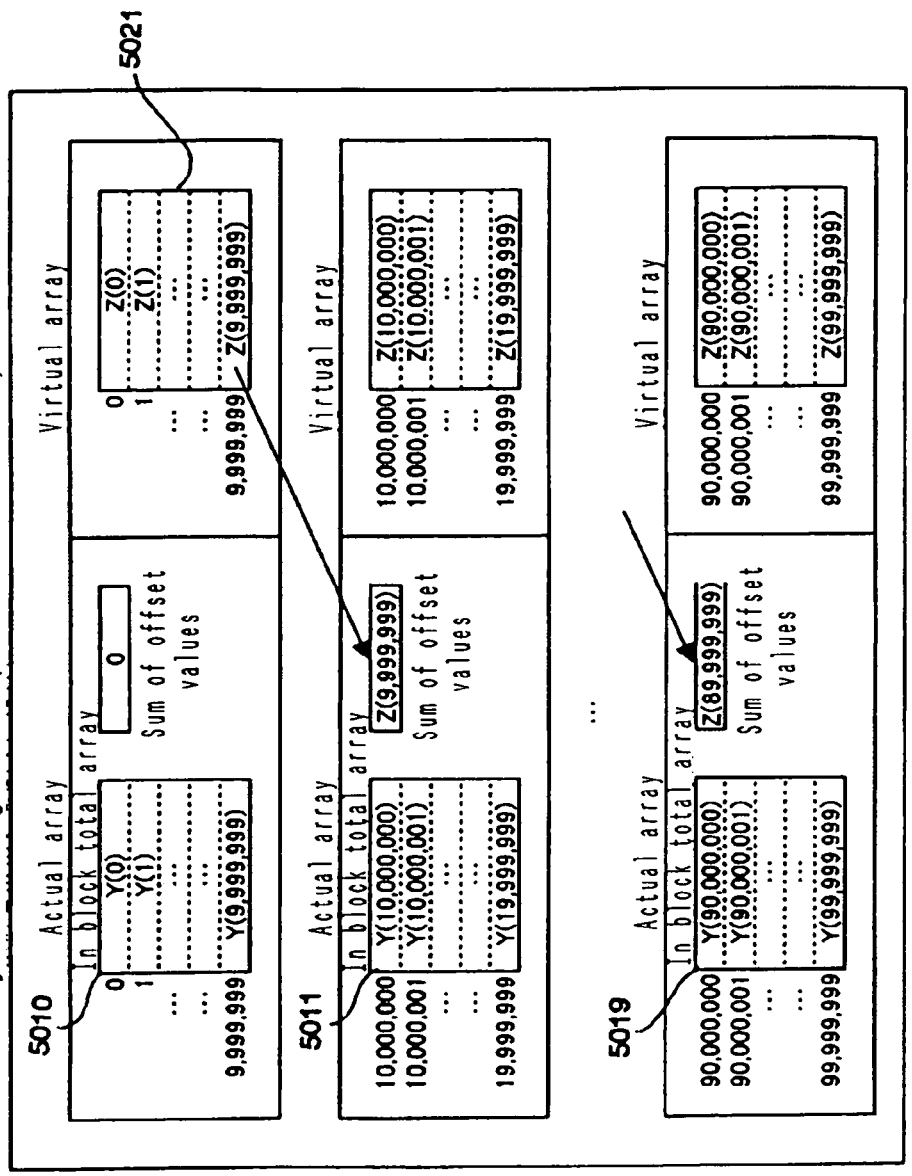
FIG. 50 is a diagram used to describe a further practical example of a value conversion array according to the present invention.

In addition, the value conversion array according to the present invention can be used alone. For example, consider the case in which 100 million samples of measurement data are sequentially supplied from a digital-to-analog converter (not shown). Normally, 100 million samples of data are not easily contained in a single memory (as this would require a data capacity of 200 million bytes (more than 100 megabytes) even if the samples were of a size of 2 bytes/sample), so consider the case of storing the data divided among 10 memories. In FIG. 50, 10 million samples of measurement data (sample data) are stored in each of the memory blocks from the first (No. 0) memory block 5000 through the last (No. 9) memory block 5009.

In this situation, consider the case of finding and storing total values for the measurement data. This can be executed by the following procedure according to the present invention.

The data values for measurement data are added from the start to the end of each memory block. This may be performed in parallel by a plurality of CPUs (10 CPUs are preferable in this case), so the totaling process can be executed on the memory block that each performs operations upon. Thereby, it is possible to calculate a total value for each of the blocks indicated by the symbols 5010, 5011, . . . , 5019 of FIG. 50.

Next, the logical total value corresponding to the last address within the memory block of the adjacent memory block above is fetched, and this becomes the offset value within the offset array in the value conversion array of the memory block in question. In this example, the same offset value is used within a single memory block, so there is no need to create an end position array or other array. For example, regarding memory block 5021, the offset value is Z(9,999,999) (where z is the logical total value), and by adding the offset value of Z(9,999,999) to the total value of Y(10,000,000) corresponding to the starting address of this memory block 5021, it is possible to find the logical total value Z(10,000,000). In addition, by adding the offset value of Z(9,999,999) to the total value of Y(19,999,999) corresponding to the ending address of this memory block 5021, it is possible to find the logical total value Z(19,999,999). This total value Z(19,999,999) can be seen to become the offset value used in the adjacent memory block below.

Here, to add a discussion of the time required for calculating totals, if parallel processing of the calculation of totals is performed on the ten memory blocks as described above, finding the total values for each of the memory blocks requires 10 million steps, and roughly 8 steps are required to set the addition offset values. In contrast, one can see that 100 million steps would be required to obtain a total value using the conventional technique. This is because even if it is divided into memory blocks, the total value of the memory block positioned above must first be calculated and only then can the calculation of the memory block in question can start, so parallel processing of the various memory blocks is in fact impossible. In this manner, by using the value conversion array according to the present invention, it is possible to speed up scientific and technical computations and the like.

Figure 51:
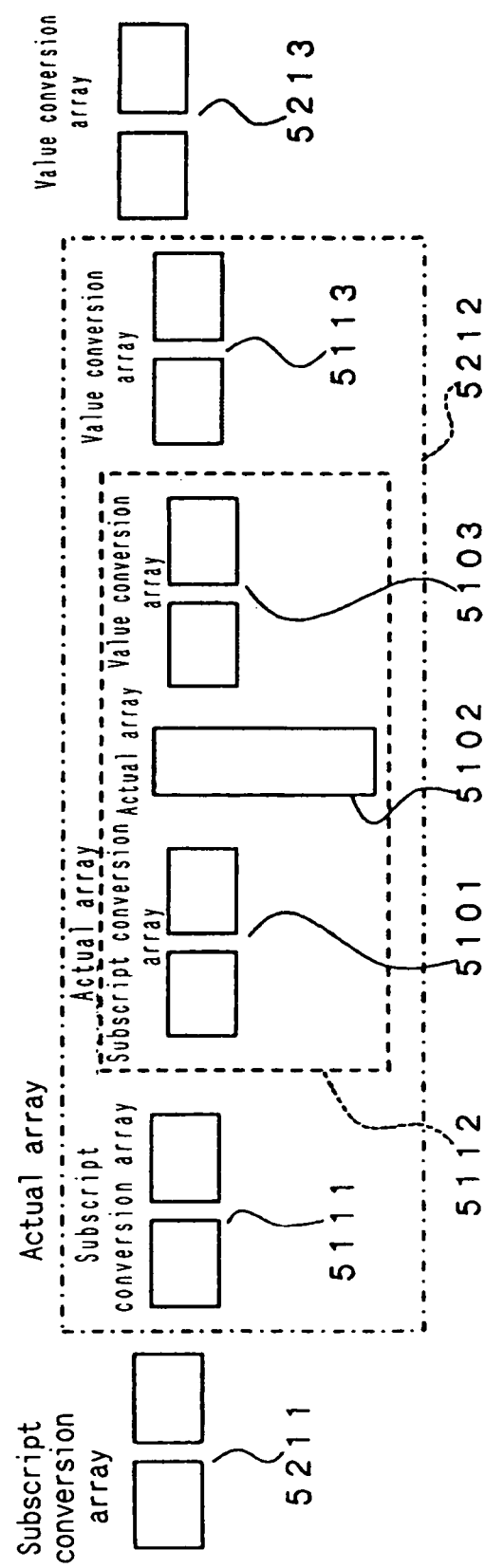
FIG. 51 is a diagram used to describe a further practical example of a subscript conversion array and value conversion array according to the present invention.

In addition, according to the present invention, it is possible to adopt a nested structure as shown in FIG. 51. In FIG. 51, a subscript conversion array (see symbol 5101), actual array (see symbol 5102) and value conversion array (see symbol 5103) are provided in the innermost nest. On the other hand, in the nests positioned outside, sets consisting of the aforementioned subscript conversion array, actual array and value conversion array are considered to be the second actual array (see symbol 5112), and a subscript conversion array (see symbol 5111) is placed on its input side and also a value conversion array (see symbol 5113) is placed on its output side. In the same manner, in the nests further outside, the inside nest is considered to be a third actual array (see symbol 5212) and a subscript conversion array (see symbol 5211) is placed on its input side while a value conversion array (see symbol 5213) is placed on its output side. By adopting such a structure, processes for the insertion, deletion and updating of hierarchical structures can be performed. For example, in the case that the insertion of a value is executed several times and thereafter an update transaction is committed, the aforementioned structure is useful.

Figure 52:
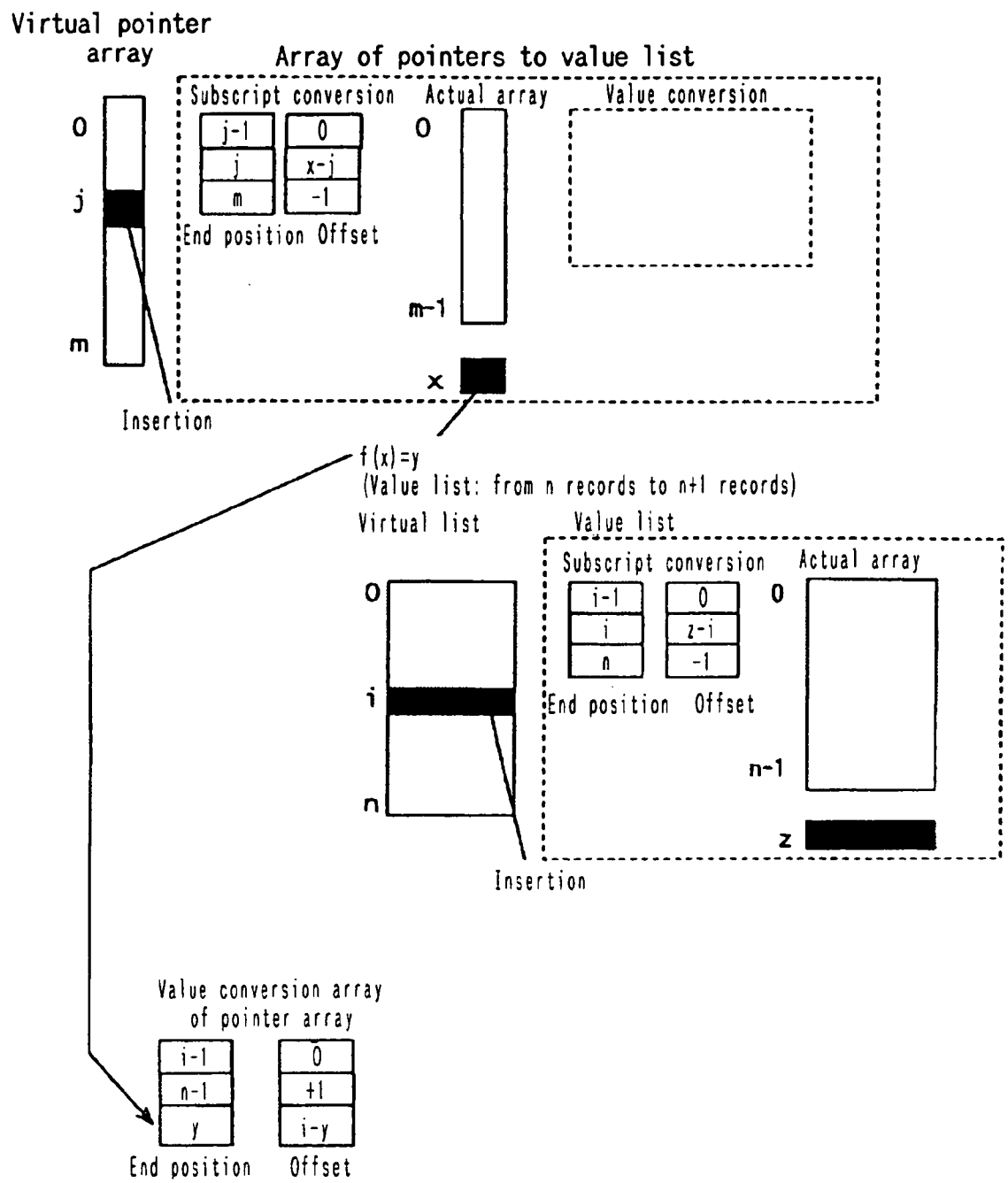
FIG. 52 is a diagram used to describe another example of the data insertion process in table-format data in the form of information blocks according to the present invention.

In addition, in the example shown in FIG. 47 above, in the value list pointer array, a pointer value is placed at the end of the actual array and its pointer value is set to f(m)=n (where n is 1 larger than the maximum value of "n−1" that the pointer value can take up until now). In the value list also, a field value is placed at the end of the actual array, but the present invention is not limited to such a structure. To wit, regarding the array of pointers to the value list, it is possible to place the pointer values in another area (a difference array) that is not adjacent to the actual array, or the pointer value f(m) may also be set to another value y (where y>=n). Moreover, regarding the value list also, the field values may be placed in another area (a difference array) that is not adjacent to the actual array. FIG. 52 shows an example of placing the pointer values (f(m)=y) in area "x" for the pointer array and placing the field values in area "z" for the value list. In this case also, it is possible to find the subscript conversion array and value conversion array in nearly the same manner as described in FIG. 47.

Moreover, the aforementioned embodiments described how data update processes, insertion processes and deletion processes for table-format data in the form of information blocks, or the deletion processes and update processes can be executed sequentially. The subscript conversion array and value conversion array can be found as described below for such an update process also.

For example, consider the case of table-format data having m record numbers and n field values, where the field value for record number "j" is to be updated. Here, consider that the insertion position in the case that the field value to be updated is inserted (the logical insertion position) is "i."

Figure 53:
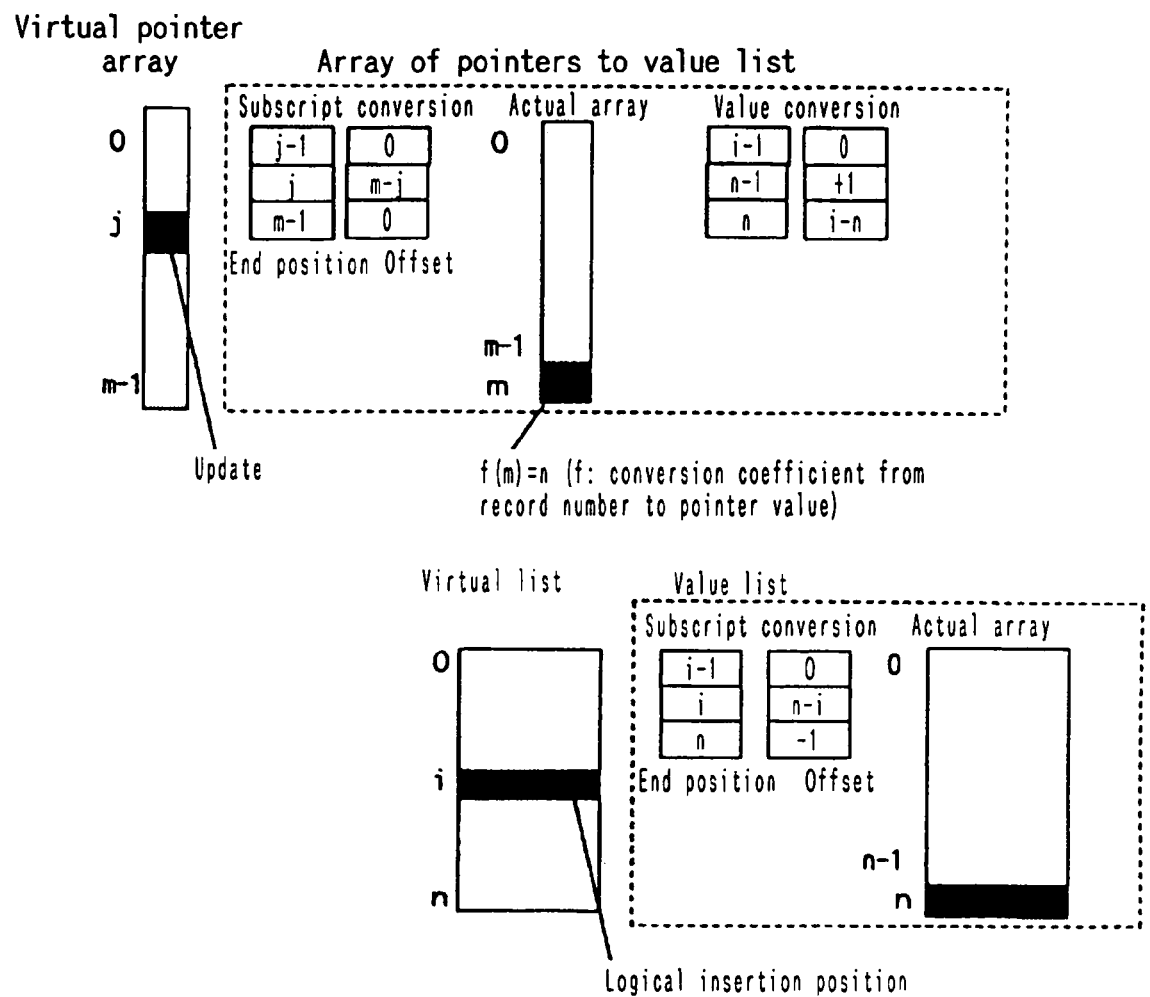
FIG. 53 is a diagram used to describe the data updating process in table-format data in the form of information blocks according to the present invention.

First, we shall describe the case in which, in the value list pointer array, a pointer value is placed at the end of the actual array and its pointer value is set to f(m)=n (where n is 1 larger than the maximum value of "n−1" that the pointer value can take up until now), and in the value list also, a field value used for updating is placed at the end of the actual array. In this case, as shown in FIG. 53, regarding the subscript "p" of the pointer array, an offset value of "0" is given when 0<=p<=(j−1), an offset value of "m-j" is given when p=j, and an offset value of "0" is given when j+1<=p<=m−1. In addition, one can see that the value conversion array of the pointer array and the subscript conversion array of the value list are the same as those shown in FIG. 47 (in the deletion process, these were not touched so those for the insertion process are kept).

Figure 54:
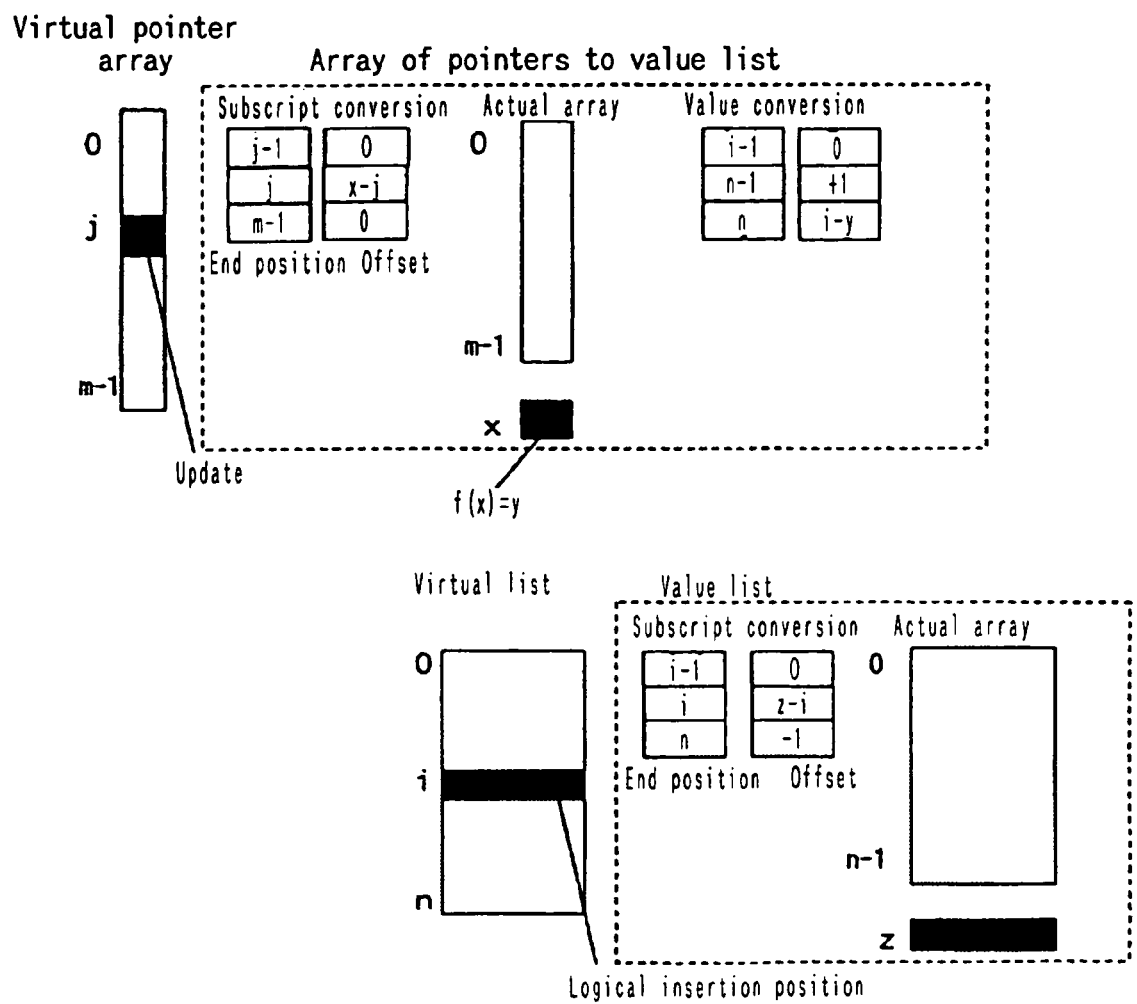
FIG. 54 is a diagram used to describe another example of the data updating process in table-format data in the form of information blocks according to the present invention.

Alternately, in the update process, in the case of placing the pointer values (f(m)=y) in area "x" for the pointer array and placing the field values in area "z" for the value list, it is possible to find the subscript conversion array and value conversion array in nearly the same manner as described in regard to FIG. 52 (see FIG. 54).

Moreover, in the aforementioned embodiments, the processes of performing the generation, updating of subscript conversion arrays, value conversion arrays and the like are implemented by loading a stipulated program into a typical computer system 10 and executing this program, but the present invention is in no way limited to this, but rather it need not be said that it may also be implemented by connecting a board computer specialized for database processing to a personal computer or other ordinary computer system and having the aforementioned processing be performed by said board computer. Accordingly, in this Specification, a means does not necessarily refer to a physical means, but rather it also includes the case in which the functions of the various means are implemented in software. Moreover, the functions of one means may be implemented in two or more physical means or the functions of two or more means may be implemented by one physical means.

FIELD OF THE INVENTION

The present invention is usable in systems that handle large amounts of data, for example, databases and data warehouses. More specifically, it is usable in large-scale scientific and technical calculation, control systems for plants and power supply and the like, and to order management and the management of mission-critical clerical work such as securities trading.

What is claimed is:

1. A method of inserting table-format data where field values are inserted at arbitrary positions in table-format data represented by an array of records containing a field and the field values contained therein, wherein the array of records is stored in a computer readable medium of a computer system, wherein said method of inserting table-format data comprises the steps of:

generating a subscript conversion array constituted such that the subscript conversion array accepts a storage position number specifying the position of the array of records as a subscript and gives an offset value corresponding to the range of said subscript, identifying an insertion position that indicates the position of the field value to be inserted, in said subscript conversion array, regarding said insertion position, giving an offset value that defines the range of the corresponding subscript and also identifies a stipulated position after the end of said array, in said subscript conversion array, regarding those records having a storage position number greater than the storage position number corresponding to said insertion position, giving an offset value that shifts the corresponding range of subscripts upward and also decrements the accepted subscript, and placing said field value to be inserted at the stipulated position after the end of said array, such that an offset value according to the range of subscripts within the subscript conversion array is given as said subscript and the field value with the array is identified by means of the subscript given by said offset value.

2. A method of deleting table-format data where field values are deleted at arbitrary positions in table-format data represented by an array of records containing a field and the field values contained therein, wherein the array of records is stored in a computer readable medium of a computer system, wherein said method of deleting table-format data comprises the steps of:

generating a subscript conversion array constituted such that the subscript conversion array accepts a storage position number array specifying the position of the array of records as a subscript and gives an offset value corresponding to the range of said accepted subscript, identifying a deletion position that indicates the position of the field value to be deleted, and in said subscript conversion array, regarding those records having a storage position number greater than the storage position number corresponding to said deletion position, giving an offset value that shifts the corresponding range of subscripts downward and also increments the accepted subscript, such that an offset value according to the range of subscripts within the subscript conversion array is given as said subscript and the field value with the array is identified by means of the subscript given by said offset value.

3. A method of updating table-format data where field values are updated at arbitrary positions in table-format data represented by an array of records containing a field and the field values contained therein, wherein the array of records is stored in a computer readable medium of a computer system, wherein said method of updating table-format data comprises the steps of:

generating a subscript conversion array constituted such that subscript conversion array accepts a storage position number specifying the position of the array of records as a subscript and gives an offset value corresponding to the range of said accepted subscript, (1) assuming the position of the field value to be updated to be the deletion position, in said subscript conversion array, regarding those records having a storage position number greater than the storage position number corresponding to said deletion position, giving an offset value that shifts the corresponding range of subscripts downward and also increments the accepted subscript, and (2) assuming the position of the field value to be updated to be the insertion position, in said subscript conversion array, regarding said insertion position, giving an offset value that defines the range of the corresponding subscript and also identifies a stipulated position after the end of said array, in said subscript conversion array, regarding those records having a storage position number greater than the storage position number corresponding to said insertion position, giving an offset value that shifts the corresponding range of subscripts upward and also decrements the accepted subscript, and placing said field value to be updated at the stipulated position after the end of said array, and said (1) and (2) or (2) and (1) are executed sequentially, such that an offset value according to the range of subscripts within the subscript conversion array is given as said subscript and the field value with the array is identified by means of the subscript given by said offset value.

4. A data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array.

5. The data structure according to claim 4 characterized in that each of said subscript conversion arrays comprises: a start position array consisting of start positions that indicate the minimum value of the subscripts contained within each of the stipulated ranges, and optionally an end position array consisting of end positions that indicate the maximum value of the subscripts contained in said stipulated range, and an offset array consisting of the corresponding offset values.

6. The data structure according to claim 4 characterized in that said value conversion array comprises: a start position array consisting of start positions that indicate the minimum value of the subscripts contained within each of the stipulated ranges, and optionally an end position array consisting of end positions that indicate the maximum value of the values contained in said stipulated range, and an offset array consisting of the corresponding offset values.

7. A method of inserting table-format data where field values are inserted at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array wherein said method of inserting table-format data comprises the steps of:

(1) regarding said value list, identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array, identifying an insertion position that indicates the position of the pointer value corresponding to the record number to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, and placing a new pointer value greater than the existing pointer values at the stipulated position after the end of said second actual array, and (3) regarding said pointer array, in said value conversion array, giving a second offset value that increments those records that have a value greater than the pointer value corresponding to the insertion position in said value list, in said value conversion array, giving a second offset value such that said new pointer value identifies a position corresponding to said insertion position.

8. The method of inserting table-format data according to claim 7 characterized in that:

the table comprises m record numbers and n field values, when the insertion position for field values within said value list is i (0<=i<=n−1), a field value is placed at the end n of the first actual array, and the record number insertion position is j (0<=j<=m−1), a pointer value is placed at the end m of the second actual array, (1) in the second subscript conversion array of said value list, 0 is given as the third offset value in the case that the value is in the range of (i−1) or less, (n−1) is given as the third offset value in the case that the value is i, and −1 is given as the third offset value in the case that the value is in the range of (i+1) or greater and n or less, (2) in the first subscript conversion array of said pointer array, 0 is given as the first offset value in the case that the subscript is in the range of (j−1) or less, (m−j) is given as the first offset value in the case that the subscript is j, and (−1) is given as the first offset value in the case that the subscript is in the range of (j+1) or greater and m or less, (3) in the value conversion array of said pointer array, 0 is given as the second offset value in the case that the value is in the range of (i−1), 1 is given as the second offset value in the case that the value is in the range of i or greater and (n−1) or less, and (i−n) is given as the second offset value in the case that the value is n.

9. The method of inserting table-format data according to claim 7 characterized in that:

the table comprises m record numbers and n field values, when the insertion position for field values within said value list is i (0<=i<=n−1), a field value is placed at a stipulated position z (z>=n) after the end of the first actual array, and the record number insertion position is j (0<=j<=m−1), a pointer value is placed at a stipulated position x (x>=m) after the end of the second actual array, (1) in the second subscript conversion array of said value list, 0 is given as the third offset value in the case that the value is in the range of (i−1) or less, (z−1) is given as the third offset value in the case that the value is i, and (−1) is given as the third offset value in the case that the value is in the range of (i+1) or greater and n or less, (2) in the first subscript conversion array of said pointer array, 0 is given as the first offset value in the case that the subscript is in the range of (j−1) or less, (x−j) is given as the first offset value in the case that the subscript is j, and (−1) is given as the first offset value in the case that the subscript is in the range of (j+1) or greater and m or less, and also (3) in the value conversion array of said pointer array, 0 is given as the second offset value in the case that the value is in the range of (i−1), 1 is given as the second offset value in the case that the value is in the range of i or greater and (n−1) or less, and (i−y) is given as the second offset value in the case that the value is y (where y is the pointer value stored at the position x of the second actual array).

10. A transaction processing method characterized in that, when the insertion, deletion and/or updating of data in table-format data is performed by means of a method according to claim 7, and either a rollback or commit is performed, said subscript conversion array and value conversion array are discarded.

11. A transaction processing method characterized in that, when the insertion, deletion and/or updating of data in table-format data is performed by means of a method according to claim 7, and a rollback is performed, said subscript conversion array and value conversion array are discarded.

12. A method of deleting table-format data where field values are deleted at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array wherein said method of deleting table-format data comprises the steps of:

regarding said pointer array, identifying a deletion position that indicates the position of the pointer value to be deleted, in said first subscript conversion array, regarding said insertion position, defining the corresponding subscript, in said first subscript conversion array, regarding those records having a record number greater than the record number corresponding to said deletion position, giving a first offset value that shifts the corresponding range of subscripts downward so that the values that define said range become smaller and also increments the accepted subscript.

13. The method of deleting table-format data according to claim 12 characterized in that:

the table comprises m record numbers and n field values, when the record number deletion position is j (0<=j<=m−1), in the first subscript conversion array of said pointer array, 0 is given as the first offset value in the case that the subscript is in the range of (j−1) or less, and 1 is given as the offset value in the case that the subscript is in the range of j or greater and (m−2) or less.

14. A method of updating table-format data where field values are updated at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array wherein said method of updating table-format data comprises the steps of:

(A) (1) regarding said value list, assuming the position of the field value to be updated to be the insertion position, identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array, assuming the pointer value to be updated to be the pointer value to be inserted, identifying an insertion position that indicates the position of the pointer value to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, placing a new pointer value greater than the existing pointer values at the stipulated position after the end of said second actual array, and (3) regarding said pointer array, in said value conversion array, giving a second offset value that increments those records that have a value greater than the pointer value corresponding to the insertion position in said value list, in said value conversion array, giving a second offset value such that said new pointer value identifies a position corresponding to said insertion position, (B) regarding said pointer array, identifying the position of the pointer value to be updated as the deletion position, in consideration of said insertion position, in said first subscript conversion array, regarding said deletion position, defining the corresponding subscript, in said first subscript conversion array, regarding those records having a record number greater than the record number corresponding to said deletion position, giving a first offset value that shifts the corresponding range of subscripts downward so that the values that define said range become smaller and also increments the accepted subscript, and either of said (A) and (B) or said (B) and (A) are executed sequentially.

15. The method of updating table-format data according to claim 14 characterized in that:

the table comprises m record numbers and n field values, when the updating position for field values within said value list is i ($0<=i<=n-1$), a field value is placed at the end n of the first actual array, and the record number updating position is j ($0<=j<=m-1$), a pointer value is placed at the end m of the second actual array, (1) in the second subscript conversion array of said value list, 0 is given as the third offset value in the case that the value is in the range of (i−1) or less, (n−1) is given as the third offset value in the case that the value is i, and (−1) is given as the third offset value in the case that the value is in the range of (i+1) or greater and n or less, (2) in the first subscript conversion array of said pointer array, 0 is given as the first offset value in the case that the subscript is in the range of (j−1) or less, (m-j) is given as the first offset value in the case that the subscript is j, and 0 is given as the first offset value in the case that the subscript is in the range of (j+1) or greater and (m+1) or less, (3) in the value conversion array of said pointer array, 0 is given as the second offset value in the case that the value is in the range of (i−1), 1 is given as the second offset value in the case that the value is in the range of i or greater and (n−1) or less, and (i-n) is given as the second offset value in the case that the value is n.

16. The method of updating table-format data according to claim 14 characterized in that:

the table comprises m record numbers and n field values, when the insertion position for field values within said value list is i ($0<=i<=n-1$), a field value is placed at a stipulated position z ($z>=n$) after the end of the first actual array, and the record number insertion position is j($0<=j<=m-1$), a pointer value is placed at a stipulated position x ($x>=m$) after the end of the second actual array, (1) in the second subscript conversion array of said value list, 0 is given as the third offset value in the case that the value is in the range of (i−1) or less, (z−1) is given as the third offset value in the case that the value is i, and (−1) is given as the third offset value in the case that the value is in the range of (i+1) or greater and n or less, (2) in the first subscript conversion array of said pointer array,
0 is given as the first offset value in the case that the subscript is in the range of (j−1) or less,
(x−j) is given as the first offset value in the case that the subscript is j, and
0 is given as the first offset value in the case that the subscript is in the range of (j+1) or greater and (m+1) or less, and also
(3) in the value conversion array of said pointer array,
0 is given as the second offset value in the case that the value is in the range of (i−1),
1 is given as the second offset value in the case that the value is in the range of i or greater and (n−1) or less, and
(i−y) is given as the second offset value in the case that the value is y (where y is the pointer value stored at the position x of the second actual array).

17. A method of deleting table-format data where field values are deleted at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein
said data structure for table-format data comprises:
said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order,
a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array
wherein
said method of deleting table-format data comprises the steps of:
regarding said record number, providing a fourth actual array in which the record numbers themselves are placed, and a third subscript conversion array given stipulated offset values according to the range of subscripts for identifying said record number,
identifying a deletion position that indicates the position of said record number to be deleted,
in said third subscript conversion array, defining a corresponding subscript regarding said deletion,
in said third subscript conversion array, regarding those records having a value greater than the subscript corresponding to said deletion position, giving a fourth offset value that shifts the corresponding range of subscripts downward so that the values that define said range become smaller and also increments the accepted subscript.

18. A method of deleting table-format data where field values are deleted at arbitrary positions in table-format data represented by an array of records containing a field and the field values contained therein, wherein the array of records is stored in a computer readable medium of a computer system, wherein
said method of deleting table-format data comprises the steps of:
regarding said record number, providing an array in which the record numbers themselves are placed, and a subscript conversion array given stipulated offset values according to the range of subscripts for identifying said record number,
identifying a deletion position that indicates the position of said record number to be deleted,
in said subscript conversion array, defining a corresponding subscript regarding said deletion, and
in said subscript conversion array, regarding those records having a value greater than the subscript corresponding to said deletion position, giving an offset value that shifts the corresponding range of subscripts downward so that the values that define said range become smaller and also increments the accepted subscript.

19. A parallel processing method where a plurality of processes are performed simultaneously on table-format data having a data structure for table-format data constituted such that the field values corresponding to an arbitrary record number are identified in table-format data represented by an array of records containing a field and the field values contained therein, wherein the array of records is stored in a computer readable medium of a computer system, wherein
said data structure for table-format data comprises:
said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order,
a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array
wherein
among the aforementioned processes, those that involve the insertion, deletion and/or updating of data are constituted such that, in said pointer array, they go through a first subscript conversion array, second actual array and value conversion array, and also, in said value list, they go through a second subscript conversion array and a first actual array, and
on the other hand, among the aforementioned processes, those that do not involve the insertion, deletion and/or updating of data are constituted such that, in said pointer array, they go through a second subscript conversion array, and also, in said value list, they go through a first actual array.

20. The parallel processing method according to claim 19 characterized in that said processes that involve the insertion, deletion and/or updating of data utilize a method of inserting table-format data where field values are inserted at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array, wherein said method of inserting table-format data comprises the steps of:

(1) regarding said value list, identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array, identifying an insertion position that indicates the position of the pointer value corresponding to the record number to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, and placing a new pointer value greater than the existing pointer values at the stipulated position after the end of said second actual array, and (3) regarding said pointer array, in said value conversion array, giving a second offset value that increments those records that have a value greater than the pointer value corresponding to the insertion position in said value list, in said value conversion array, giving a second offset value such that said new pointer value identifies a position corresponding to said insertion position.

21. A record locking method for table-format data having a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array wherein an information block containing an array for controlling locking is provided, and field values corresponding to each of said record numbers that indicate the type of locking are placed within the array of said information block.

22. A computer-readable recording medium recorded with a data insertion program for table-format data where field values are inserted at arbitrary positions in table-format data represented by an array of records containing a field and the field values contained therein, wherein said data insertion program for table-format data comprises the steps of:

generating a subscript conversion array constituted such that the subscript conversion array accepts a storage position number specifying the position of the array of records as a subscript and gives an offset value corresponding to the range of said subscript, identifying an insertion position that indicates the position of the field value to be inserted, in said subscript conversion array, regarding said insertion position, giving an offset value that defines the range of the corresponding subscript and also identifies the end of said array, in said subscript conversion array, regarding those records having a storage position number greater than the storage position number corresponding to said insertion position, giving an offset value that shifts the corresponding range of subscripts upward and also decrements the accepted subscript, and placing said field value to be inserted at the stipulated position after the end of said array, such that an offset value according to the range of subscripts within the subscript conversion array is given as said subscript and the field value with the array is identified by means of the subscript given by said offset value.

23. A computer-readable recording medium recorded with a data deletion program for table-format data where field values are deleted at arbitrary positions in table-format data represented by an array of records containing a field and the field values contained therein, wherein said data deletion program for table-format data comprises the steps of:

generating a subscript conversion array constituted such that the subscript conversion array accepts a storage position number specifying the position of the array of records as a subscript and gives an offset value corresponding to the range of said accepted subscript, identifying a deletion position that indicates the position of the field value to be deleted, and in said subscript conversion array, regarding those records having a storage position number greater than the storage position number corresponding to said deletion position, giving an offset value that shifts the corresponding range of subscripts downward and also increments the accepted subscript, such that an offset value according to the range of subscripts within the subscript conversion array is given as said subscript and the field value with the array is identified by means of the subscript given by said offset value.

24. A computer-readable recording medium recorded with a data updating program for table-format data where field values are updated at arbitrary positions in table-format data represented by an array of records containing a field and the field values contained therein, wherein said data updating program for table-format data comprises the steps of:

generating a subscript conversion array constituted such that the subscript conversion array accepts a storage position number specifying the position of the array of records as a subscript and gives an offset value corresponding to the range of said accepted subscript, (1) assuming the position of the field value to be updated to be the deletion position, in said subscript conversion array, regarding those records having a storage position number greater than the storage position number corresponding to said deletion position, giving an offset value that shifts the corresponding range of subscripts downward and also increments the accepted subscript, and (2) assuming the position of the field value to be updated to be the insertion position, in said subscript conversion array, regarding said insertion position, giving an offset value that defines the range of the corresponding subscript and also identifies the end of said array, in said subscript conversion array, regarding those records having a storage position number greater than the storage position number corresponding to said insertion position, giving an offset value that shifts the corresponding range of subscripts upward and also decrements the accepted subscript, and placing said field value to be updated at the stipulated position after the end of said array, and said (1) and (2) or (2) and (1) are executed sequentially, such that an offset value according to the range of subscripts within the subscript conversion array is given as said subscript and the field value with the array is identified by means of the subscript given by said offset value.

25. A computer-readable recording medium recorded with a data insertion program for table-format data where field values are inserted at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array, wherein said data insertion program for table-format data comprises the steps of:

(1) regarding said value list, identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array, identifying an insertion position that indicates the position of the pointer value corresponding to the record number to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, and placing a new pointer value greater than the existing pointer values at the stipulated position after the end of said second actual array, and (3) regarding said pointer array, in said value conversion array, giving a second offset value that increments those records that have a value greater than the pointer value corresponding to the insertion position in said value list, in said value conversion array, giving a second offset value such that said new pointer value identifies a position corresponding to said insertion position.

26. A computer-readable recording medium recorded with a data deletion program for table-format data where field values are deleted at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array wherein said data deletion program for table-format data comprises the steps of:

regarding said pointer array, identifying a deletion position that indicates the position of the pointer value to be deleted, in said first subscript conversion array, regarding said insertion position, defining the corresponding subscript, in said first subscript conversion array, regarding those records having a record number greater than the record number corresponding to said deletion position, giving a first offset value that shifts the corresponding range of subscripts downward so that the values that define said range become smaller and also increments the accepted subscript.

27. A computer-readable recording medium recorded with a data updating program for table-format data where field values are updated at arbitrary positions in table-format data represented by a data structure for table-format data constituted such that the field values corresponding to an arbitrary record number are identified in table-format data represented by an array of records containing a field and the field values contained therein, wherein the array of records is stored in a computer readable medium of a computer system, wherein said data structure for table-format data comprises:

said table-format data constituted in a manner such that said table-format data is divided into one or more information blocks consisting of: a value list containing a first actual array in which the field values are stored in the order of a field value number corresponding to the field value belonging to a specified field, and a pointer array containing a second actual array in which pointer values for pointing to said field value numbers are stored in a unique record number order, a second subscript conversion array constituted such that an input, output of the pointer array is given as the subscript in said value list, and a third offset corresponding to the range of said subscript is given is formed and field value within the first actual array is identified by means of the output of the pointer array given by an offset via said second subscription conversion array, wherein said data updating program for table-format data comprises the steps of:

(A) (1) regarding said value list, assuming the position of the field value to be updated to be the insertion position, identifying an insertion position that indicates the position of the field value to be inserted, in said second subscript conversion array, regarding said insertion position, giving a third offset value that defines the range of the corresponding subscript and also identifies a stipulated position after the end of said first array, in said second subscript conversion array, regarding those records having a value greater than the subscript corresponding to said insertion position, giving a third offset value that shifts the corresponding range of subscripts upward so that the values that define said range become larger and also decrements the accepted subscript, and placing said field value to be inserted at the stipulated position after the end of said first actual array, (2) regarding said pointer array, assuming the pointer value to be updated to be the pointer value to be inserted, identifying an insertion position that indicates the position of the pointer value to be inserted, in said first subscript conversion array, regarding said insertion position, giving a first offset value that defines the corresponding subscript and also identifies a stipulated position after the end of said first actual array, in said first subscript conversion array, regarding those records having a record number greater than the record number corresponding to said insertion position, giving a first offset value that shifts the corresponding range of subscripts upward so that the values that define said range become larger and also decrements the accepted subscript, placing a new pointer value greater than the existing pointer values at the stipulated position after the end of said second actual array, and (3) regarding said pointer array, in said value conversion array, giving a second offset value that increments those records that have a value greater than the pointer value corresponding to the insertion position in said value list, in said value conversion array, giving a second offset value such that said new pointer value identifies a position corresponding to said insertion position, (B) regarding said pointer array, identifying the position of the pointer value to be updated as the deletion position, in consideration of said insertion position, in said first subscript conversion array, regarding said deletion position, defining the corresponding subscript, in said first subscript conversion array, regarding those records having a record number greater than the record number corresponding to said deletion position, giving a first offset value that shifts the corresponding range of subscripts downward so that the values that define said range become smaller and also increments the accepted subscript, and either of said (A) and (B) or said (B) and (A) are executed sequentially.

* * * * *